United States Patent [19]
Proffitt et al.

[11] Patent Number: 5,844,593
[45] Date of Patent: Dec. 1, 1998

[54] DIGITAL COMPACT DISC SLEEVING AND DISC AND SLEEVE SERIALIZING METHOD AND APPARATUS

[75] Inventors: Ed Proffitt, Brazil; Bob DeWitt, Terre Haute, both of Ind.

[73] Assignees: Sony Corporation, Tokyo, Japan; Digital Audio Disc Corporation, Terre Huate, Ind.

[21] Appl. No.: 375,929

[22] Filed: Jan. 20, 1995

[51] Int. Cl.$^6$ .................................................. G01D 9/00
[52] U.S. Cl. .......................................................... 347/262
[58] Field of Search .................................. 347/255, 256, 347/257, 262, 110, 264; 219/121.6

[56] References Cited

U.S. PATENT DOCUMENTS

| | | | |
|---|---|---|---|
| 4,655,129 | 4/1987 | Wirth et al. | 101/35 |
| 5,309,178 | 5/1994 | Gross | 346/108 |
| 5,400,319 | 3/1995 | Fite et al. | 369/275.5 |
| 5,459,505 | 10/1995 | Ballegaard et al. | 342/260 |

OTHER PUBLICATIONS

Brochure: Digital Audio Disc Corporation "High–Tech Etch–A–Sketch".

*Primary Examiner*—Adolf Berhane
*Attorney, Agent, or Firm*—Wood, Herron & Evans, L.L.P.

[57] ABSTRACT

A method and apparatus are provided for serializing compact discs on which is optically readable digital information for corresponding serializing disc sleeves, and for inserting each of the serialized discs into correspondingly serialized sleeves. A laser printing device marks with a unique serial marking, each of the compact discs and a sleeve labeling device marks each of the sleeves with one of the unique serial markings. A sleeve conveyor formed of a pair of opposed endless belts of generally fixed lengths maintained under tension and in proximity to each other holds sleeves in place as the belts move along a path extending through the sleeve labeling device and a loading station. A sleeve feeder feeds unmarked sleeves onto the conveyor while a belt drive steps the belts to shift sleeves through a series of fixed sleeve positions along the path from the sleeve feeder to the sleeve labeling device and from the sleeve labeling device to the loading station, at which the belts are separated, the sleeves are opened, and discs, transported from the laser printing device are rotated above and dropped edgewise into the opened sleeves. A controller is programmed to coordinate the marking of the sleeves and discs and the operation of the sleeve conveying the disc transport, the sleeve opening and the disc inserting operations.

59 Claims, 19 Drawing Sheets

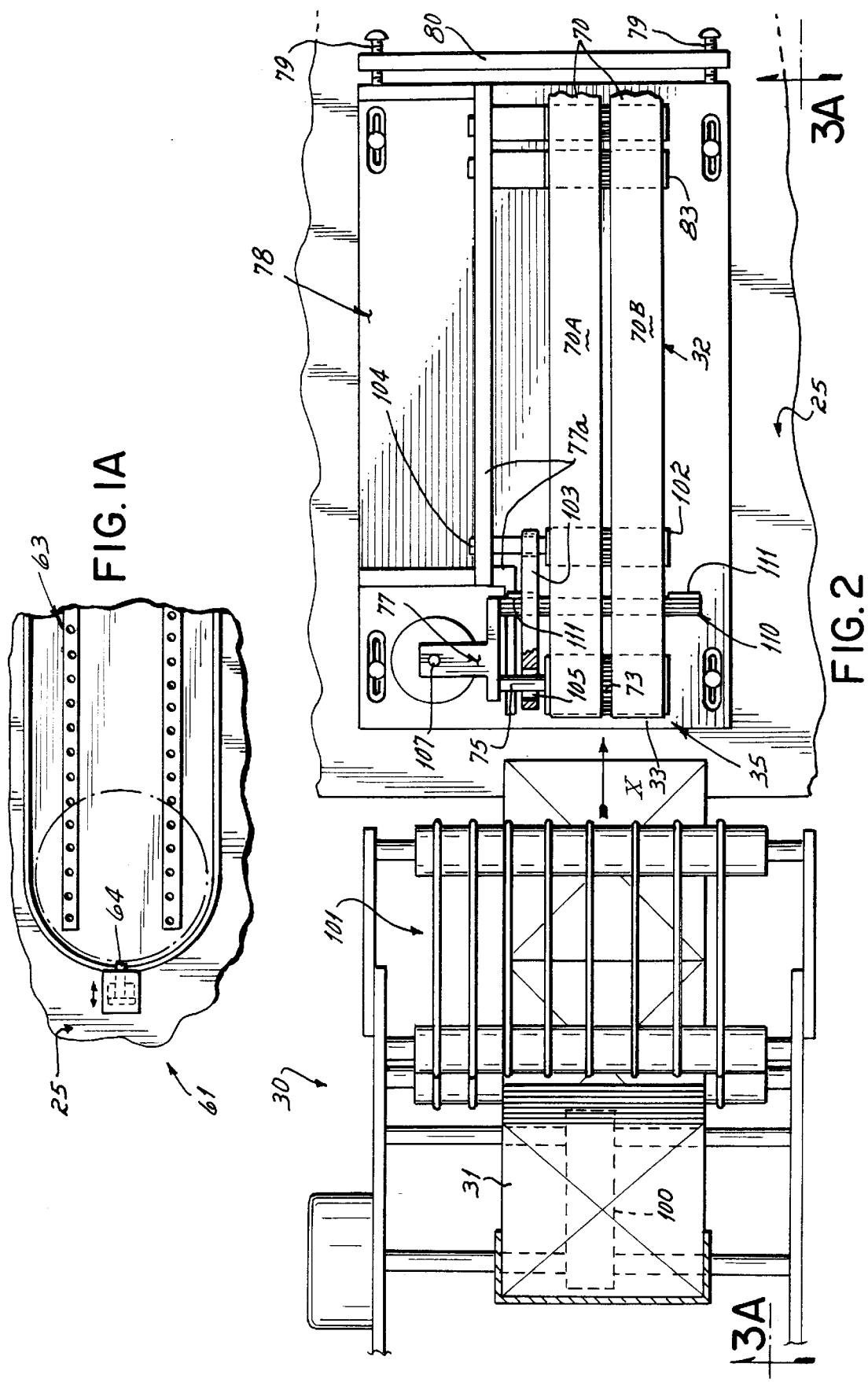

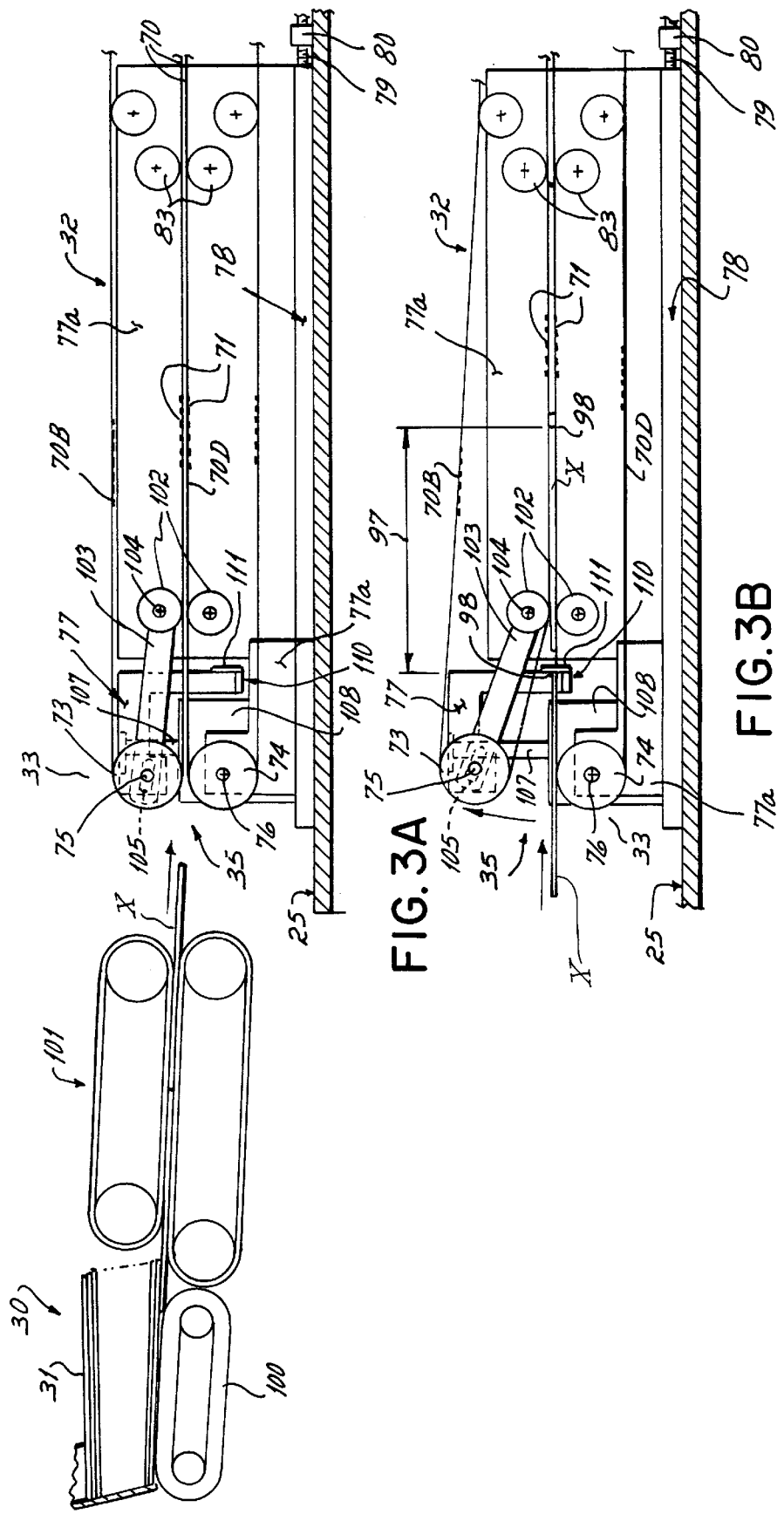

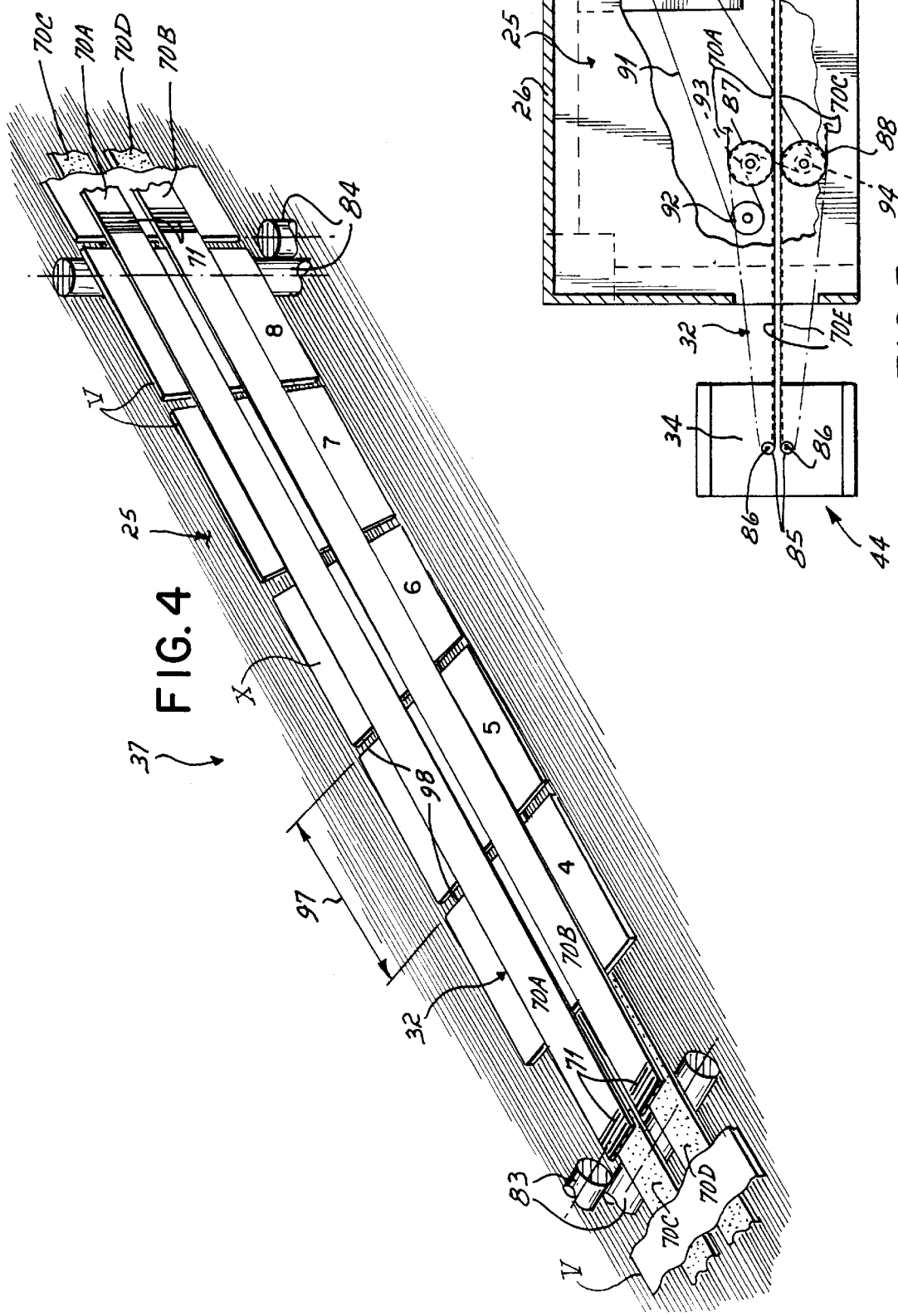

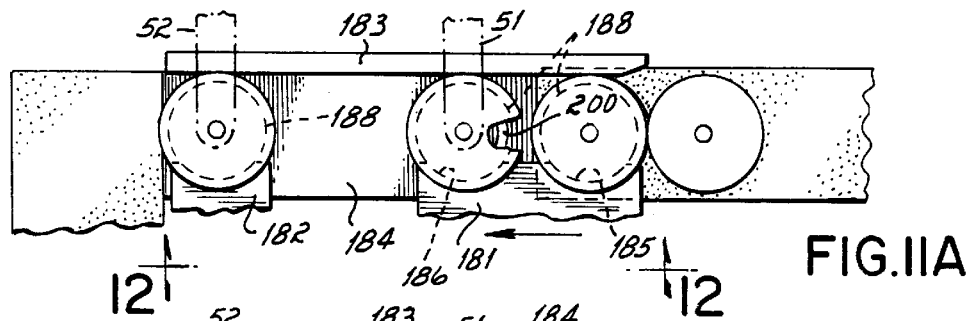
FIG.11A
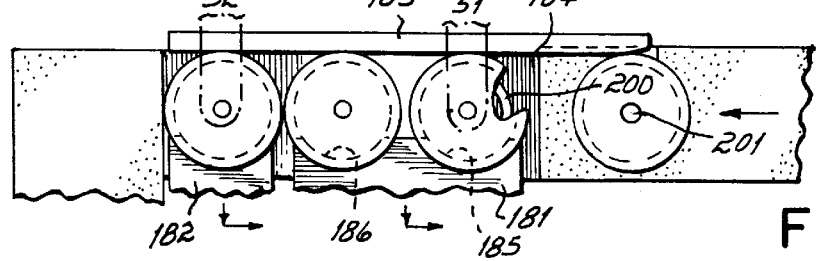
FIG.11B
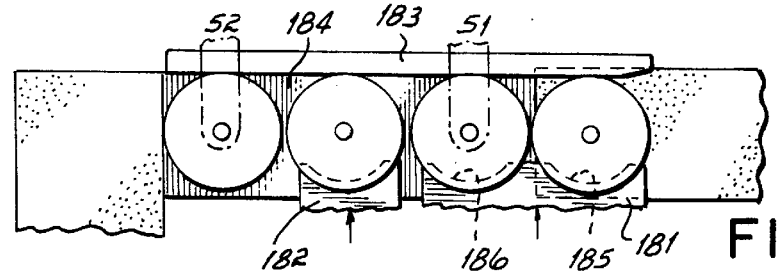
FIG.11C
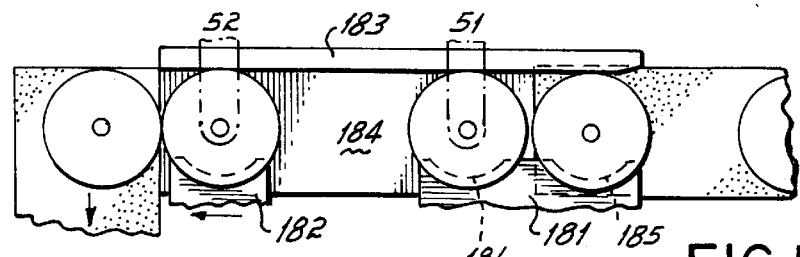
FIG.11D
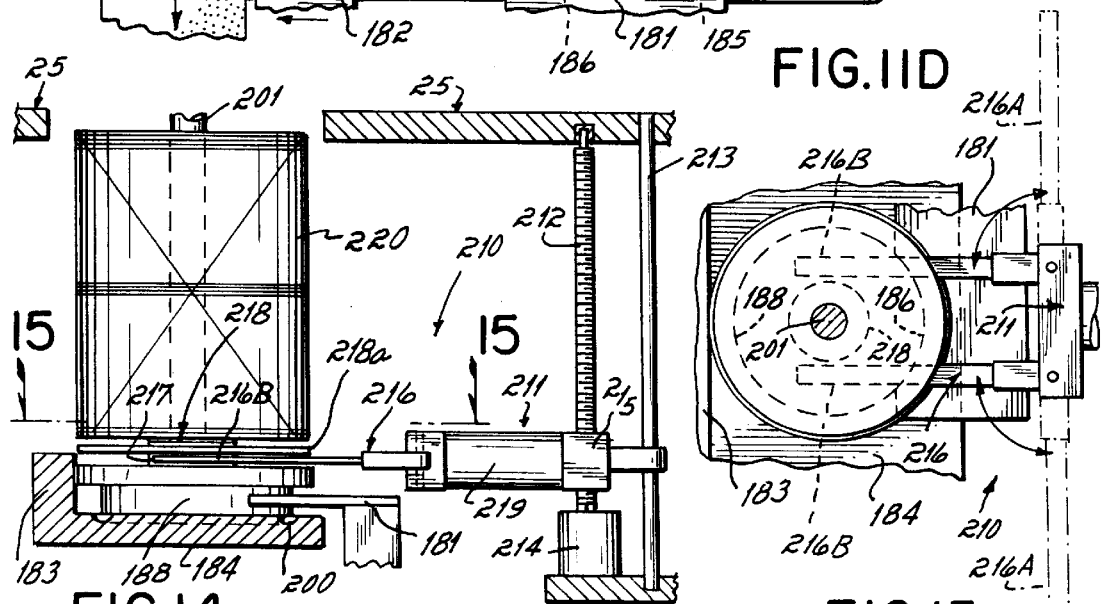
FIG.14
FIG.15

DIGITAL COMPACT DISC SLEEVING AND DISC AND SLEEVE SERIALIZING METHOD AND APPARATUS

The present invention relates to compact disc packaging and identification and more particularly to a method and apparatus for applying corresponding unique identification or serial markings to compact discs, particularly of the CD-ROM type, and to the sleeves or other packaging containing them.

BACKGROUND OF THE INVENTION

An important medium for digital recordings has become the compact disc, or CD. Such discs are typically in the form of circular wafers of transparent plastic material on which information is recorded in several billion optically readable bits that can be read with laser CD player devices. Such discs are in widespread use for digital sound recording, and are referred to as audio CDs. In addition, such discs are being increasingly used for storing digital text, graphical or other information which may be used to represent data, program code or the like, which discs are generally referred to as CD-ROMs. Typical conventional configurations of compact discs are described in U.S. Pat. No. 4,961,077 and European patents nos. 0 329 122 and 0 549 488, for example, which are expressly incorporated herein by reference.

Most CDs, and particularly CD-ROMs, are produced in quantity as copies of a particular work, often a software program or data volume. For several reasons, the manufacturers and sellers of such copies prefer to be able to uniquely identify and distinguish one such copy from another. Typically, such unique copy identification takes the form of an unique serial number assigned to each copy. This serial number is provided to the purchaser or licensee of the product in some tangible form with the copy. Such serial number assignments are useful in registration of the copy with the manufacturer for the purpose of identifying the purchaser as one entitled to customer or technical support or to upgrades or revisions of the work. The serial numbers are also useful in deterring, preventing or tracing unauthorized duplication or piracy of the work from the copies.

Initially, the most practical form of serial number identification was to provide a serialized registration or license card or document packaged with the disc. Serial numbers on such cards do not, however, provide an effective way for identifying the copy of the disc itself. Serial numbers have also been affixed to the disc hub by special devices designed for the purpose of sequentially numbering the discs. Serial numbers have also been associated with copies of such discs by sequential numbering of the packages in which the discs are contained.

Several shortcomings have been encountered in prior art CD serial numbering systems. Most notable is the inability of prior art systems to efficiently serialize the CD and apply the same serial number identification to the package. Generally, this has involved the manual process of matching a number on the disc with a number written on or applied to the package. In addition, the manner of applying serial identification on the smooth transparent optical grade plastic disc material has not been satisfactory. Such markings have been superficial and capable of obliteration or removal, making unauthorized copying or piracy less traceable, as well as unattractive and difficult to read. Furthermore, the idea of automatic serialization of compact discs coupled with the automatic serialization of the packaging has presented the problem of serial number mis-coordination between the disc and the package.

Many of the problems that have prevented advancement of the prior art in the serialization of CDs has been due to the particularly delicate nature of the CD itself. The handling of such discs must be done in such a way that scratching or unwanted marking is avoided, and the exposure to dirt, dust or other contamination is prevented. Such contamination or damage to such discs can prevent the accurate reading of the data from the discs by the laser CD readers, which can result in a partially or wholly defective product.

For these and other reasons, there has been a need for efficient and effectively coordinated permanent serial marking or serialization of compact discs with corresponding serialization of the package.

SUMMARY OF THE INVENTION

An objective of the present invention is to provide efficient and effective application of serial markings to compact discs and to do so in an automated manner with the application of corresponding serialization to the package in which the CD is supplied.

A more particular objective of the present invention is to automatically apply unique or serial identification to compact discs at the time of or immediately following their manufacture and to automatically apply a corresponding unique identification to the container at the time the CD is packaged.

A still further objective of the present invention is to provide a method and apparatus whereby unique and permanent serial number identification is applied to the discs, and the discs are loaded into correspondingly serial numbered sleeves or other such containers, quickly and efficiently, without subjecting the discs to damage.

An additional objective of the present invention is to provide a CD with a superior, clear, readable and permanent unique identifying mark.

In accordance with the principles of the present invention, a method and apparatus are provided to apply serialization to compact discs, or to several sets of discs, by laser imposed unique identifying markings, in the packaging process. The serial or other unique identifying markings are coordinated between the laser applying the marks to the CD and a labeler or printer that applies corresponding unique markings to the package for the disc. Then, under computer control, the serialized discs are matched with and loaded into the correspondingly serialized sleeves or other packages therefor.

In accordance with the preferred embodiment of the present invention, an apparatus is provided for serially marking compact discs having optically readable digital information recorded thereon, for correspondingly marking containers for such discs and for inserting the serially marked discs into respective and corresponding ones of the correspondingly marked containers. The preferred apparatus comprises a control system that includes a controller programmed to define a sequence of unique serial markings corresponding to a quantity of copies of a digital information product, a laser printing device that is responsive to a signal from the controller for marking, with one of the unique serial markings of the sequence, each of a plurality of compact discs having recorded thereon a copy of the digital information product, and a container labeling device that is responsive to a signal from the controller for marking each of a plurality of compact disc containers with a serial marking corresponding the unique serial marking made by the laser printing device on the disc to be packaged in the container. Further, the preferred apparatus includes a loading station that includes elements responsive to a signal from the controller for receiving discs marked by the laser printing device, for receiving containers marked by the container labeling device and for inserting the received discs into the received containers. The preferred apparatus is also provided with a container transport system that includes a container feeder and a conveyor for conveying containers received from the feeder to the container labeling device and for stepping the marked containers through a plurality of container positions from the container labeling device to the loading station. It is also provided with a disc transport system that includes a spindle transport for receiving spindles stacked with a plurality of discs and one or more transfer devices for sequentially transferring discs from received spindles to the laser printing device and for stepping the marked discs, independent of the timing of the stepping of containers through the plurality of container positions, through a plurality of disc positions from the laser feeding device to the loading station. Furthermore, the controller of the apparatus is programmed to track each of the unique serial markings on containers and on discs through each of the respective container and disc positions by the respective transport systems, and to correlate operation of the loading station with the tracked markings such that each uniquely marked disc is inserted into a correspondingly uniquely marked container.

In accordance with the preferred embodiment of the present invention, a disc serializing apparatus is provided that unloads sets of discs from spindles or other carriers therefor and applies a unique identifying marking with a laser to the disc, preferably upon the hub of the disc.

Further, in the preferred embodiment of the invention, the markings are imposed through the entire thickness of the transparent disc with a laser that is particularly selected to penetrate and apply a black continuous permanent three-dimensional mark through the entire thickness of the disc. Preferably, the laser is a neodymium YAG (yttrium-aluminum-garnet) laser, galvanometer steered and computer programmed and controlled to not only form, but to keep track of the serialization markings for various disc products being produced.

Also in accordance with the preferred embodiment of the invention, packaging in the form of disc sleeves are serialized in synchronism with the serialization of the discs by the laser, with markings printed on the sleeves or on labels affixed to the sleeves. Computer controls coordinate the movement of the discs and the sleeves through a packaging apparatus that matches the sleeves with the respective discs. To optimize the throughput of the packaging apparatus, the sleeves are moved consecutively along a belt conveyor that positively holds the sleeves between bands in precisely definable positions on the conveyor, and then presents the sleeves, preferably two consecutive ones at a time, for simultaneous loading with two consecutive discs.

In accordance with certain of the principles of the present invention, the objectives of the invention are in part accomplished by the provision of a sleeve opening method and apparatus by which a plurality, e.g. two, sleeves are simultaneously opened for insertion of the discs therein, and the relative positions of the plurality of sleeves in the sleeve line are maintained as elements, e.g. belts, of the conveyer are moved to allow the sleeves to open. In the preferred belt conveyor, maintenance of belt tension as the sleeves open contributes to maintaining the positions of the sleeves along the sleeve line throughout the sleeve opening and closing process. The actual opening of the sleeves is achieved by a single motion that both separates the elements of the conveyor and engages the sleeves to open them, while the bottoms of the sleeves being opened are supported and the opened edge of the sleeve is maintained facing upwardly to receive the discs.

In accordance with certain further features of the present invention, a highly efficient and effective disc inserting method and apparatus are provided which provides for rapid insertion of discs into the open sleeves. Horizontally disposed discs are rotated 90° to a vertical orientation with an arm that swings through more than 90° to present the vertically oriented discs immediately above the open discs on the sleeve conveyor that is displaced a horizontal distance form the axis of the arm. A minimum of actuators, e.g. two, are provided, in addition to vacuum chucks that pick-up the discs. One pneumatic actuator quickly swings the arm between two positions while another pneumatic actuator translates the arm vertically between two positions to pick up discs.

In accordance with other features of the present invention, a method and apparatus are provided for capturing sleeves in a belt conveyor such that the belts are moved to avoid interference with the fed sleeves and without interfering with the operation of the conveyor or other devices of the apparatus, with the mechanism to carry out these objectives being integral with the main belt tensioner. Positive stopping of the fed sleeves is provided to precisely register the fed sleeves with the transport elements, e.g. belts, of the conveyor, which positions are thereafter maintained with great accuracy as the belts move the sleeves through the stations of the apparatus. A single and preferably two position pneumatic actuator affects the operation of both movement of the stops and of the transport elements.

In accordance with other principles of the present invention a method and apparatus are provided for effectively handling spindles of discs, particularly by using a pair of slide blocks or spindle grippers to move the spindles, with the two grippers effectively cooperating to pass spindles from one gripper to the other at the same spindle location, and providing fine control of spindle placement and orientation at all spindle positions. An annular recess in the surface on which the spindles are supported. The recess accommodates dents, burrs and other deformations of the outer rim of the base of the spindles, thereby maintaining upright orientation of the spindles particularly at an elevator station at which discs are presented for removal from the spindle.

Further in accordance with principles of the present invention, provided are a high accuracy elevator and method of maintaining the top disc of a stack for transfer to an individual disc handling or processing station. The elevator operates at high speed and returns to an initial position at high speed to avoid delay of other components of the system while stacks of discs are being moved. Forks for lifting the stack of discs on the elevator are provided with a 180° open position to allow passage of spindles without interference. The elevator is fixed, with the cooperating devices moving to allow for fixed elevator components. The elevator unit is modular and controlled by its own controller to operate independently of the main controller of the apparatus, and as such, the elevator can be used independently of the other devices of the apparatus.

Further in accordance with certain principles of the present invention, there is provided a disc transfer method and apparatus for picking up and placing discs, preferably horizontally disposed, from one location to another, with a pneumatic vertical actuator and an electric stepper motor controlled rotary actuator that provides position feedback without external sensors, which can be programmed to optimally accelerate and decelerate without resort to shock absorbing devices, thereby achieving optimal operating speed without losing or damaging the discs being transferred. The transfer apparatus occupies a small amount of space, allowing closer spacing of adjacent components and increasing speed by maintaining smaller distances along the disc and sleeve paths.

Further in accordance with principles of the present invention, a method and apparatus are provided for transporting sleeves of various materials and types, utilizing a flexible conveyor that employs non-stretchable gear belts of the timing belt type, which can accept sleeves fed in a horizontal orientation and which can rotate the sleeves to a vertical orientation at which they can be loaded with discs. The conveyor has a positive stepper motor feed and firmly holds the sleeves in place between opposed pairs of belts that are driven simultaneously to control and maintain the positions and spacing of the sleeves and to advance the sleeves through the stations of the sleeve line with high accuracy.

Additionally in accordance with certain principles of the present invention, a method and apparatus are provided for rejecting sleeves that are improperly marked or misloaded. Such sleeves are removed quickly by fingers held at rest close to the sleeve line that close and descend to pull the rejected sleeve downwardly from its position in the grip of the belts. A device for performing the rejection of the sleeves is small, inexpensive and virtually invisible in the system.

Further, in accordance with other principles of the present invention, an indexing table is provided for transport of the discs through their processing stations that employs a method and apparatus whereby optimal acceleration and deceleration of rotatable supports at high speed is achieved by a motor that utilizes a hollow fixed shaft to support the table, and uses a rotatable housing to carry the supports around the shaft. The shaft is used as a conduit for pneumatic and electrical lines to components distributed around the table, while the setup of the table and number of positions around the shaft at which stations can be located is variable and configurable.

These and other objectives of the present invention can be appreciated form the following detained description of the drawings in which:

BRIEF DESCRIPTION OF THE DRAWINGS

FIG. 1A is an illustration of the disc reject station of FIG. 1.

FIG. 2 is a top plan view of the sleeve hopper and sleeve metering apparatus of FIG. 1.

FIG. 3A is a side view as seen on line 3A—3A of FIG. 2.

FIG. 3B is a view similar to FIG. 3A showing the feed belts opened for receiving a sleeve.

FIG. 4 is a schematic isometric view of the sleeve feed belts illustrating the sleeves being turned 90° from a horizontal to vertical attitude.

FIG. 5 is a schematic illustration of the drive for the sleeve feeding belts.

FIG. 11A–11D are sequential views of the positioning means for accurately positioning incoming disc at their respective pick-up and discharge stations.

FIG. 12 is a view seen on line 12—12 of FIG. 11A.

FIG. 13 is a cross-sectional view taken on line 13—13 of FIG. 12.

FIG. 14 is a schematic cross-sectional view illustrating the concepts of the disc elevator used to maintain the uppermost disc at a pick-up height.

FIG. 15 is a cross-sectional view taken on line 15—15 of FIG. 14.

DETAILED DESCRIPTION OF THE PREFERRED EMBODIMENT

Figure 1:
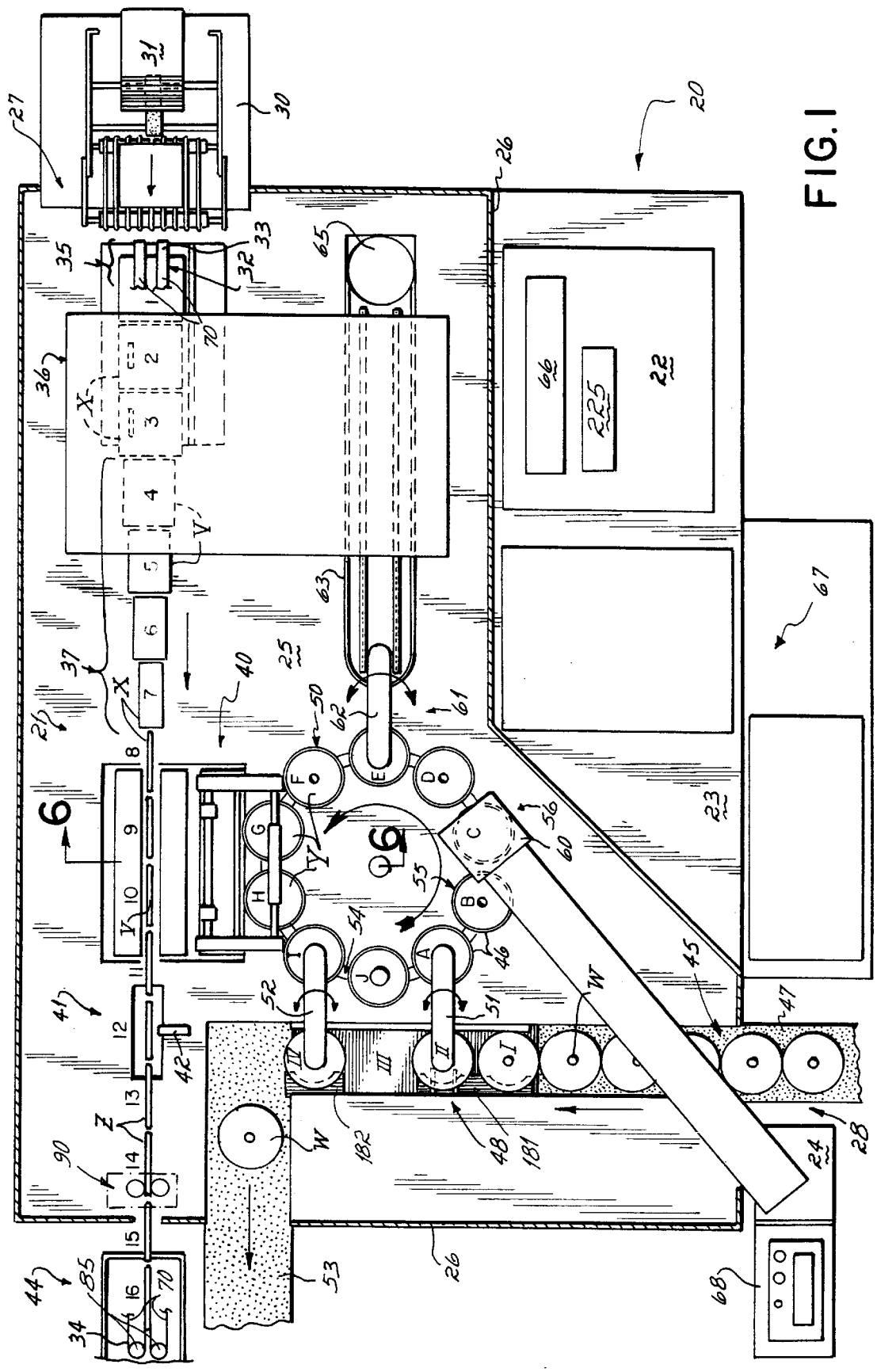
FIG. 1 a top plan view of a disc sleeving and serializing apparatus according to one preferred embodiment of the present invention.

A compact disc marking and packaging apparatus 20 according to the preferred embodiment of the present invention is illustrated in FIG. 1. The apparatus 20 includes a disc marking and sleeving assembly 21, a control module 22 containing programmable controllers that are programmed to control the operation of the disc marking and packaging assembly 21, a programmable user interface 23 that is programmed to communicate commands and input data from a machine operator and machine and job status information to the machine operator, and a laser printing module, power supply and control 24.

The disc marking and sleeving assembly 21 includes a base unit 25 that houses and supports devices for performing operations on various articles W–Z, and includes devices for handling and marking sleeves X, for marking compact discs Y, for handling the discs Y, individually and on spindles W, for loading the sleeves X with the discs Y to form compact disc packages Z, and for offloading the packages Z from the apparatus 20. The devices include motors, sensors and mechanisms as described in more detail below. A protective enclosure 26 is fixed to and stands upwardly from the base 25 and surrounds the components of the assembly 21 to protect the operator and others from injury from the moving components of the assembly 21 and to protect the discs Y and the components contacting the sleeves X and discs Y from particulate and other contamination. The marking and sleeving assembly 21 further includes a sleeve transport system 27 that extends into, through and out of the enclosure 26, and a disc transport system 28 that also extends into, through and out of the enclosure 26. The various devices referred to above are positioned along one or both of the transport systems 27 and 28 to operate on sleeves X, discs Y, disc and sleeve packages Z and disc spindles W that are being transported thereby.

The sleeve transport system 27 includes, at the upstream end thereof, a sheet feeder 30 of a type suitable for sequentially feeding a series of emptysleeves X from a stack 31 onto a belt conveyor 32. Preferably, the sheet feeder 30 is capable of feeding sleeves X of various types and sizes used for the packaging of CD-ROM discs Y of the various types of sleeves X in current use. Such a suitable sheet feeder 30 is, for example, C350-35M manufactured by Longford Equipment International Ltd. of Scarborough, Ontario, Canada. The sheet feeder 30 is capable of feeding sleeves of a wide variety of types, including sleeves of paper, chipboard, clear polyethylene, for example, and sleeves marketed under the trademarks Romvelope, DADC Quick Sleeve; Quick Sleeve with window, the Tyvek Sleeve, and others. The sheet feeder 30 is capable of operating under different parameters to accommodate various types of sleeves, and includes a memory that can be programmed with sets of parameters for each of the various sleeve types. The sheet feeder 30 will accept a signal that selects the sleeve type. In addition, the sheet feeder accepts a trigger signal to which it responds by feeding a sleeve X onto the conveyor 32 and generates feedback signals to indicate that a feeding cycle is complete or that the feeder 30 is ready to accept another trigger signal.

The belt conveyor 32 extends from its upstream end 33 immediately downstream of the sheet feeder 30 to its downstream end 34, the portion of the belt conveyor 32 between its upstream and downstream ends 33 and 34 having been removed from FIG. 1 for clarity. The belt conveyor 32 is preferably formed of stepper motor driven opposed cogged belts, of the timing belt type, between which the sleeves X are gripped and held in place by pressure and friction so that they will not slip with respect to the belts unless external force is deliberately applied to them. As such, the sleeves X, once fed to the belt conveyor 32 by the sheet feeder 30 remain in position on the belts of the belt conveyor 32 and advance with the belts sequentially through a plurality of precisely defined and equally spaced sleeve positions 1–16 as the belt conveyor 32 is indexed. When the conveyor 32 is indexed, sleeves X are carried along the conveyor 32, position to position from the upstream end 33 toward the downstream end 34 of the conveyor 32. Any one of the sleeve positions 1–16 that is occupied by any of the individual sleeves X is thus determinable by recording the position of any such sleeve X and counting the number of indexing cycles of the conveyor 32 since the position was recorded. The cycle count may be derived from a count of the cogs of the timing belts, or by measuring the angular motion of geared wheels that drive or are driven by the belts, or preferably, by counting drive pulses to or feedback pulses from the stepper motor driving the belts of the conveyor 32.

Of the stations located along the sleeve conveyor 32, located at sleeve position 1 is a sleeve capture station 35. At the sleeve capture station 35, the belt conveyor 32 receives and registers each sleeve X fed from the sheet feeder 30. At the next sleeve position, sleeve position 2, a sleeve labeling station 36 is located. At the sleeve labeling station 36 a serialized or otherwise uniquely marked label is applied to the sleeve X located thereat. The labeling station 36 includes a label printer and applying device that is mounted on a transversely slidable support tray (not shown) for facilitating ease of access for changing label supply rolls and other servicing. The location of the labeling device on the slidable support tray is adjustable both longitudinally and transversely of the conveyor 32. From approximately sleeve position 4 through sleeve position 8, is located a sleeve uprighting station 37 at which the belts of the belt conveyor 32 are redirected from a horizontal orientation to a vertical orientation to impose a 90° rotation to the sleeves X, thereby bringing the open edge of the sleeves X to the top for loading the sleeves X with discs Y.

The loading of sleeves X with discs Y is carried out at a sleeve opening and loading station 40 located at sleeve positions 9 and 10 along the belt conveyor 32. At sleeve positions 9 and 10 two discs Y are simultaneously loaded into two adjacent sleeves X on the belt conveyor 32 to form two sleeved CD packages Z. Located at sleeve position 12 is a sleeve checking and reject station 41 at which a capacitive sensor 42 senses the presence or absence of a disc Y in the sleeve X to determine whether the package Z is complete or defective due to the absence of contents. A suitable sensor 42 is KG2008FRKG manufactured by Effector of Germany. At the checking and reject station 41, If the sleeve X of the package Z is determined to be empty, the empty sleeve X will be ejected from the belt conveyor 32. Complete packages Z formed of a sleeve X loaded with a disc Y will be moved further downstream by the belt conveyor 32 and offloaded from the belt conveyor 32 at an offloading station 44 located at sleeve position 16. At the offloading station 44, the packages Z are caused to fall to a horizontal orientation onto an offloading conveyor (not shown) that advances intermittently, in response to the detection of a sleeve being deposited upon it, so as to cause the packages Z to overlap from 80 to 90% on each other in shingle fashion on the offloading conveyer. Sleeves can also be kept in single fashion with the belt conveyor 32 in continuous motion.

The disc transporting system 28 that brings the discs Y to the loading station 40 for loading into the sleeves X includes a spindle transport 45, for transporting spindles W either loaded with discs Y or empty through the assembly 21, and an individual disc transport 46.

The spindle transport 45 includes an infeed conveyor 47 formed of a moving horizontal belt for conveying loaded spindles W into the enclosure 26 of the assembly 21. The spindle transport 45 also includes a disc transfer station 48 that receives spindles W from the infeed conveyor 47 and at which discs Y are unloaded from the spindles W and transferred to a ten position turntable 50 of the individual disc transport 46. Individual discs Y from the turntable 50 may, as an alternative to being loaded into sleeves X at the loading station 40, be transferred back onto spindles W at the disc transfer station 48. The transfer of discs Y at the disc transfer station 48 between the spindles W and the turntable 50 is carried out by rotary transfer arms of the individual disc transport 46. The transfer arms are 180° bidirectionally oscillating arms and include a spindle unloading arm 51 and a spindle loading arm 52. The spindle transport 45 also includes a an outfeed conveyor 53 also formed of a horizontal belt for conveying spindles W, either loaded with discs Y or empty, from the transfer station 48 to the outside of the enclosure 26.

The turntable 50 includes ten individual disc positions A–J at each of which a disc Y may be supported on a carousel 54, and through which discs Y may be sequentially moved as the turntable 50 is indexed by rotation of the carousel 54 in 36° steps. The first position A of the turntable 50 is a loading station at which discs transferred by the spindle unloading arm 51 are received on the carousel 54 of the turntable 50. At location B is optionally located a disc reader station 55, such as a laser optical reader for reading coded optically readable information, such as a bar code label, identifying the content of the disc Y at the disc reader station 55. Located at disc position C of the turntable 50 is a disk marking station 56 at which are located the output optics of a neodymium YAG laser 60 arranged so as to direct a laser beam of controlled intensity and width, and of 1064 nanometer wavelength, toward discs Y at location C on the turntable 50. The laser 60 is the laser printing module 24 which provides it with power, cooling and control. At disc location E on the turntable 50 is located a disc reject station 61. When a disc Y reaches location E, which has been designated by a device at a prior position such as B or C as a reject, a third transfer arm 62, similar to the unloading and loading arms 51 and 52, and an air-bed conveyor 63 are activated, and the arm 62 then selectively transfers the rejected disc Y from location E of the turntable 50 onto an air-bed conveyor 63. On the air-bed conveyor 63, a pneumatically controlled ejection finger 64, as illustrated in FIG. 1A, is activated in response to the detection of the deposit of the rejected disc Y onto the air-bed conveyor 63, to kick the rejected disc Y horizontally and longitudinally along the air-bed conveyor 63 toward a receptacle 65 at the discharge end of the air-bed conveyor 63. Disc locations G and H of the turntable 50 present discs Y at the sleeve opening and loading station 40 where discs from location G and H, respectively, may be simultaneously loaded into sleeves X at sleeve locations 9 and 10 on the sleeve transport system 27. Disc location I of the turntable 50 presents discs Y that have not been loaded into sleeves X at the sleeve opening and loading station 40 to the spindle loading arm 52 at the transfer station 48.

The control module 22 contains primarily the programmed logic controllers 66 implement a software program that operates the devices described above. The user interface 23 includes a general purpose digital computer 67, preferably having at least the equivalent of a 33 mhz Intel 486 microprocessor, monitor and keyboard. The computer 67 implements a software program that displays information to the operator, accepts commands from the operator, communicates with the controller 66, keeps track of the progress of work, including the serial numbers being applied and the individual discs Y and sleeves X along the transport systems 27 and 28, and downloads information to a further computer 68 provided in the laser printer 24, which implements a software program for controlling laser in the generation and application of the marks to be applied to discs Y at the disc marking station 56.

The belt conveyor 32 of the sleeve transport system 27, according to the preferred embodiment of the present invention, moves individual sleeves X sequentially through each of the positions 1–16 with a high degree of accuracy. In this embodiment, the belt conveyor 32 includes two pairs of no-stretch endless belts 70 that trap and hold the sleeves X between them and are synchronously and simultaneously fed in a positive mechanical manner to move the sleeves precisely from position to position. Preferably, the belts 70 are flexible steel cord reinforced timing-type cog belts such as 32TK5/3750 BFX manufactured by Breco-Flex of Eatontown, N.J.

The upstream ends of an upper pair of the belts 70 are illustrated at the upstream end 33 of the belt conveyor 32 at the capture station 35 in FIG. 1. As is illustrated in more detail in FIGS. 2–5, the belts 70 at the upstream end 33 of the belt conveyor 32 at the capture station 35 include left and right belts 70A and 70B, respectively, which form the upper pair of belts, and belts 70C and 70D, which form the lower pair of belts. As used herein, the directions "left" and "right", when applied to a conveyor or other a workpiece path, refer to directions viewing the conveyor or path in a downstream direction. The lower right belt 70D is illustrated in FIGS. 3A and 3B, but is obscured by the upper right belt 70B in FIG. 2. The lower left belt 70C is obscured by lower right belt 70D in FIGS. 3A and 3B and by upper right belt 70A in FIG. 2, and therefore is not illustrated at the upstream end 33 of the belt conveyor 32. The belts 70 are nonstretchable, cogged belts of the timing-belt type, and have steel reinforced longitudinal cords (not shown) embedded therein to maintain the longitudinal dimensional stability of the belts 70. The outer surfaces of the belts 70 are high friction rubberized surfaces. A plurality of equally spaced cogs 71 extend transversely across the backs of the belts 70, as illustrated schematically in FIGS. 3A and 3B. At the capture station 35, the sleeves are received from the sheet feeder 30 having an open edge V facing toward the left.

At the upstream end 33 of the belt conveyor 32, the belts 70 of the conveyor 32 have a horizontal orientation to receive and capture sheet fed sleeves X at the sleeve capture station 35. At this upstream end 33, the upper and lower pairs of the belts 70 respectively extend around upper and lower geared idler wheels 73 and 74, respectively, which are rotatably mounted on horizontal shafts 75 and 76, respectively, carried by a moveable support assembly 77 for the upper shaft and a fixed support 77A for the lower shaft, the supports 77, 77A being mounted on a belt tensioning plate 78 fixed to the top of the base 25. The belt tensioning plate 78 is longitudinally adjustable relative to the base 25 by a pair of belt tension adjustment screws 79 carried by an transverse rib 80 fixed to the top of the base 25.

Downstream of the capture station 35, beyond the labeling station 36, the belts 70 are redirected from a horizontal orientation to a vertical orientation at the uprighting station 37, as illustrated in FIG. 4. In the vertical orientation, the belts 70 present an upwardly facing open side of the belt conveyor 32 that exposes in an upward facing orientation the open edges V of the sleeves X for loading of the discs Y. At the upstream end of the uprighting station 37, the belts 70 extend across a pair of cogged idler rollers 83, which maintain the belts 70 in a horizontal orientation through the capture and labeling stations 35 and 36. At the downstream end of the uprighting station 37, the belts are directed around a pair of vertically extending cogged idler rollers 84, which cause a 90° twist to be imposed in the belts 70, placing the upper belts 70A and 70B on the right and the lower belts 70C and 70D on the left of the conveyor 32, with the belts 70A and 70C on the top and belts 70B and 70D on the bottom. It should be noted that, in FIG. 4, only the forward moving flights of the belts 70 that engage the sleeves X are illustrated for simplicity. In the uprighting station 37, the sleeves X progressively rotate from horizontal to vertical as they are indexed through sleeve positions 4–8.

With reference to FIG. 5, at the upstream 34 of the belt conveyor 32, the belts 70 also extend around a pair of cogged driver rollers 87, 88. four offloading belts 70E are driven by rollers 87, 88 and extend around idler rollers 85, rotatably mounted about vertical shafts 86 that are fixed to the offloading station 44, as also illustrated in FIG. 1. More specifically, immediately upstream of the offloading station 44, the belts 70 extend around a pair of cogged belt drive rollers 87 and 88 of a belt drive unit 90. The belts 70A and 70B are driven by the roller 87 while the belts 70C and 70D are driven in synchronism therewith by the roller 88. Belts 70B and 70D are respectively obscured by belts 70A and 70C in FIG. 5. Rollers 87 and 88 are synchronously driven by a timing belt 91 that extends counter-clockwise around an idler roller 92, then clockwise around a roller 93 axially connected with the roller 87, then counter-clockwise around a roller 94 axially connected with the roller 88. The belt 91 is in turn driven by a stepper motor 95. The stepper motor 95 operates in response to electrical control signal pulses from the controller 66 of the control module 22, to advance the belts 70 a fixed increment in the downstream direction of the sleeve conveyor 32 for each pulse received. As such, receipt of a given number of pulses indexes the belts 70 to move sleeves X exactly one station downstream in the sleeve transport system 27. Such indexing of the belts 70 of the sleeve conveyor 32 advances the belts 70 and each of the sleeves X carried by the sleeve conveyor 32 an amount equal to the spacing of the sleeve positions 1–16 along the sleeve conveyor 32. Such spacing is equal to the spacing of corresponding points on the sleeves X, such as the spacing 97 between leading edges 98 of the sleeves X, as illustrated in FIG. 4. The spacing 97 of the sleeves X is maintained by the friction of the belts 70, but is initially established by the precise feeding of the sleeves X onto the belts 70 by the sheet feeder 30 and the precise capture and registration of the fed sleeves X by the belts at the capture station 35, as further illustrated in FIGS. 2, 3A and 3B.

Referring to FIGS. 2, 3A and 3B, the sheet feeder 30 feeds horizontally oriented sleeves X from the stack 31 by a mechanism diagrammatically represented by feed belt 100, which advances the bottom sleeve X from the stack 31 to a pair of opposed sets of 0-ring conveyor belts 101, which in turn feed the sleeves X sequentially to the capture station 35, all in response to a feed command signal from the controller 66. While the sheet feeder 30 is fixed to the base 25 of the apparatus 20, the capture station 35 is fixed to move with the belt tensioning plate 78. The capture station 35 thus is configured to receive and precisely register fed sleeves X relative to the belts 70.

At the capture station 35, the shaft 76 that supports the lower roller 74 is fixed to the support 77A, as is a lower one of are a pair of pinch rollers 102. The shaft 75 that supports the upper roller 73 is, however, fixed to a vertically moveable support assembly 77 fixedly secured on the end of a piston rod 107 of pneumatic cylinder 108. The shaft 75 is caused to move in an arc by a link 103 that is pivotally connected to a shaft 104 on which the upper one of the pair of pinch rollers 102 is supported. The shaft 75 of the roller 73 extends through a horizontal slot 105 in the link 103 to control this arcuate movement of roller 73 to the position shown in FIG. 3B. Connected to the assembly 77 so as to be raised and lowered therewith is a sleeve stop assembly 110, that has projecting therefrom a pair of left and right vertically oriented stops 111 that rise into the path of the sleeves X between the belts 70 of the sleeve conveyor 32. The stops 111 are thus actuated by the same pneumatic cylinder 108 that actuates the separation of the rollers 73, 74. Sensors (not shown in FIGS. 2–3B) inform the controller 66 that the cylinder 108 is fully in either the capture station open or capture station closed conditions.

When the cylinder 108 is actuated, the piston rod 107 extends to raise the moveable assembly 77, thereby lifting the upstream end of the link 103, raising the shaft 75 and the roller 73 from the positions shown in FIG. 3A to the positions shown in FIG. 3B. In the position of the roller 73 shown in FIG. 3B, the rollers 73 and 74 are spaced to remove the belts 70 from interference with the feeding of a sleeve X from the sheet feeder 30, and to allow the sleeve X to be fed between the rollers 73 and 74 by the feeder 30. The belts 70 are thereby removed from the path of the sleeves X without interference with the precision setting and guidance of the belts 70. The stops 111 are also in the path of the fed sleeve X so that the sleeve X being fed from the feeder 30 advances against the stops 111 so that its leading edge 98 is located by positive stops 111 at precisely the distance 97 from the sleeve X previously fed onto the conveyor 32, which, during the feeding of the sleeve X by the feeder 30, is preferably stopped. When the fed sleeve X is registered against the raised stops 111, a sensor (not shown in FIGS. 2–3B) informs the controller 66 that a sleeve X is loaded and will be advanced to sleeve position 1 when the conveyor 32 is indexed. Thereupon, the cylinder 108 is actuated in a downward direction to lower the roller 73 and grip the fed sleeve X between the upper belts 70A, 70B and the lower belts 70C, 70D and to remove the stops 111.

Figure 6:
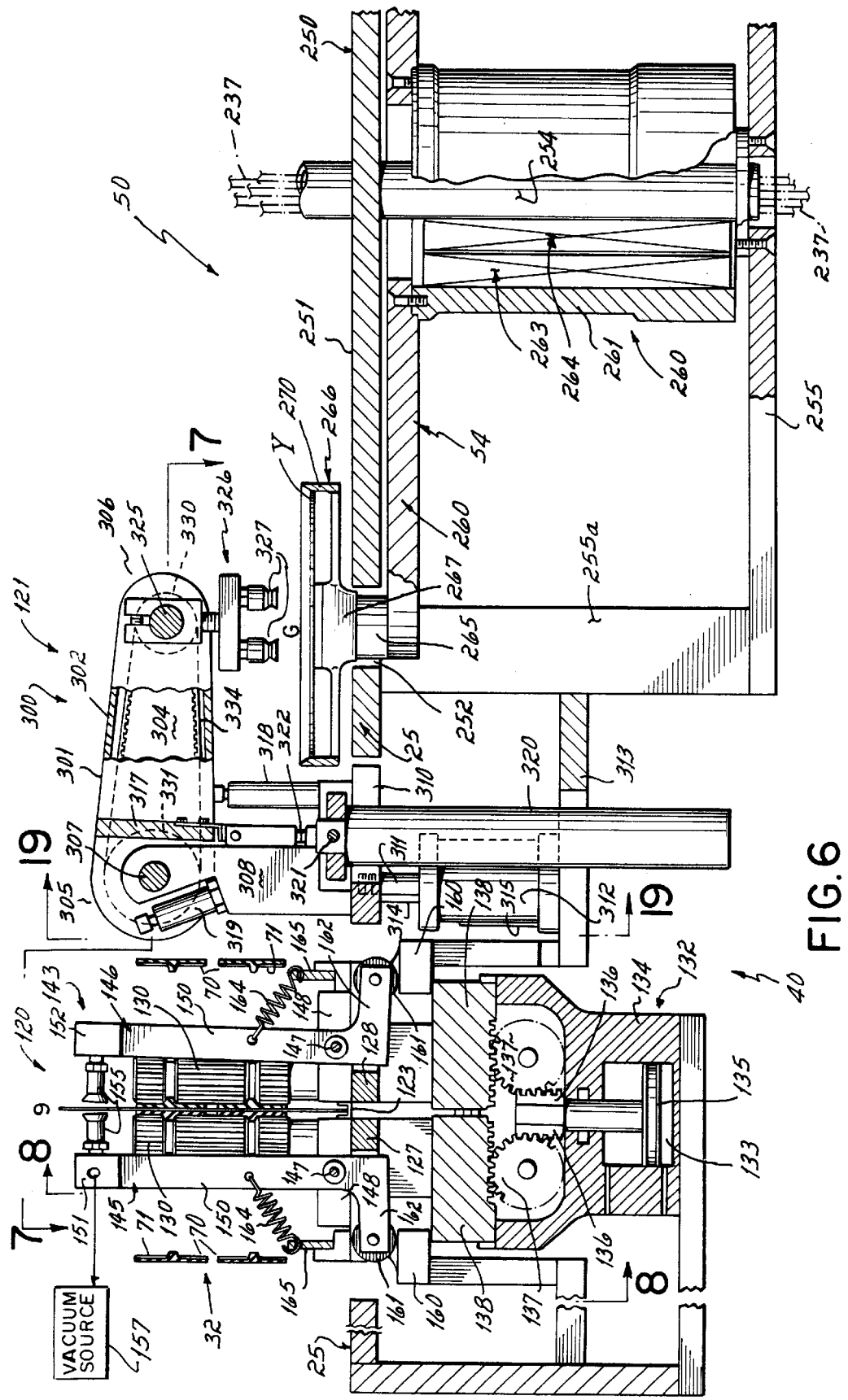
FIG. 6 is a cross-sectional view taken on line 6—6 of FIG. 1 illustrating the sleeve opening and load station.
Figure 7:
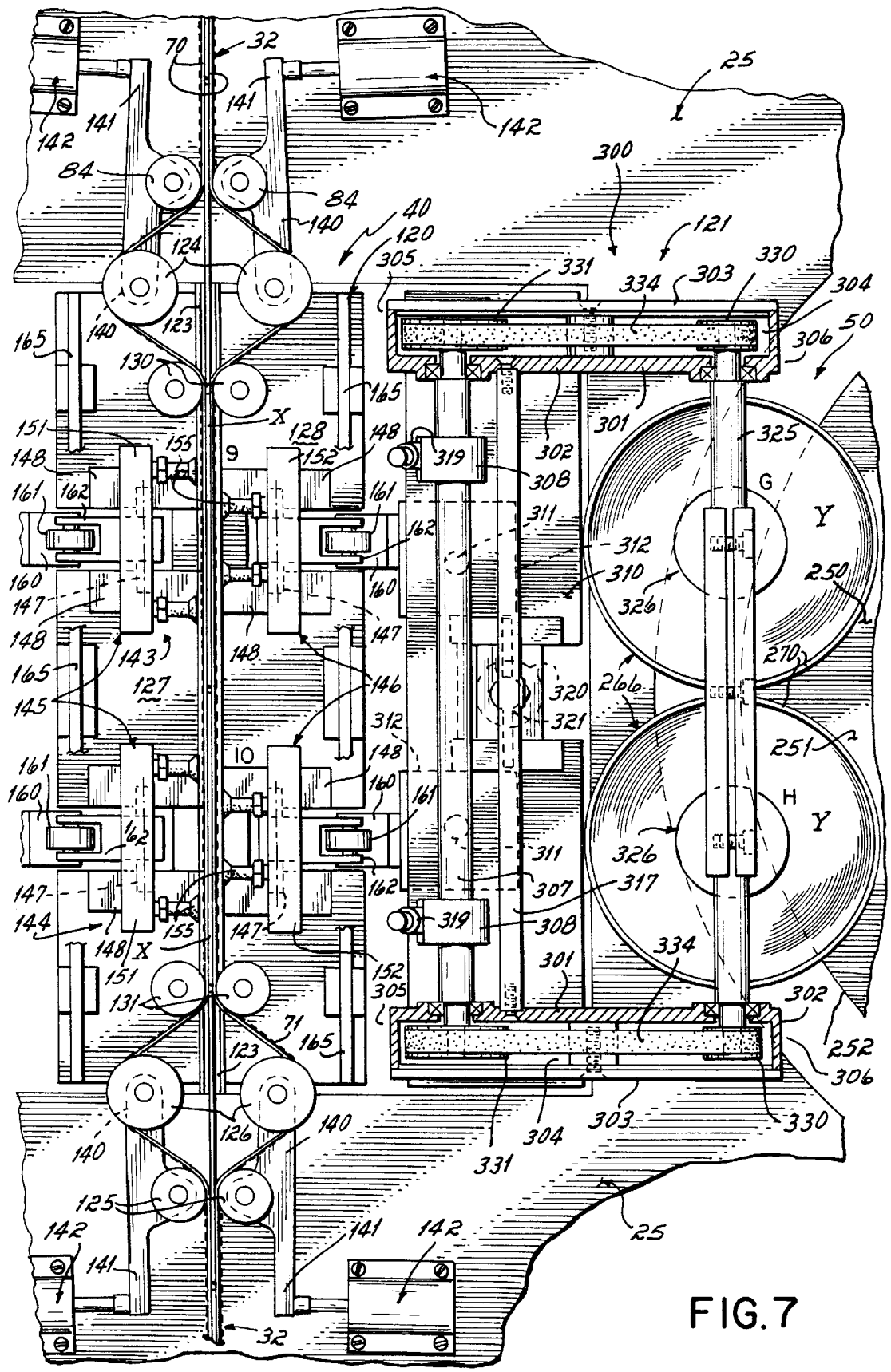
FIG. 7 is a top view of the sleeve opening and load station as seen on line 7—7 of FIG. 6.

The sleeves X that are fed from the sheet feeder 30 and captured and precisely located on the belt conveyer 32 at the capture station 35 are sequentially advanced from position to position until, after each has been labeled at labeling station 36 and reoriented to bring their open edges V to the tops in the uprighting station 37, they are loaded with discs Y at the loading station 40. The loading station 40, being located at a juncture of the sleeve transport system 27 and the disc transport system 28, includes a sleeve opening station 120 and a disc flipping station 121, as illustrated in FIGS. 6 and 7. The sleeve opening station 120 of the loading station 40 primarily opens sleeves X that are held by the belts 70 of the belt conveyor 32 when occupying conveyor positions 9 and 10, and is further illustrated in FIG. 8.

According to one feature of the preferred embodiment of the present invention, the sleeve opening station 120 and the disc flipping station 121 are constructed to operate in cooperation to open and load with discs Y two sleeves X at a time. The concept of providing for the simultaneous loading of multiple sleeves X allows the use of a gravity disc loading operation, which may take 0.2 seconds just to drop Y into an opened sleeve X and which will be substantially slower than other operations of the sleeve transport and disc transport systems 27 and 28, thereby optimizing the throughput of the apparatus 10 and the productivity of the disc marking and sleeving operation to one package per second or better.

Figure 8:
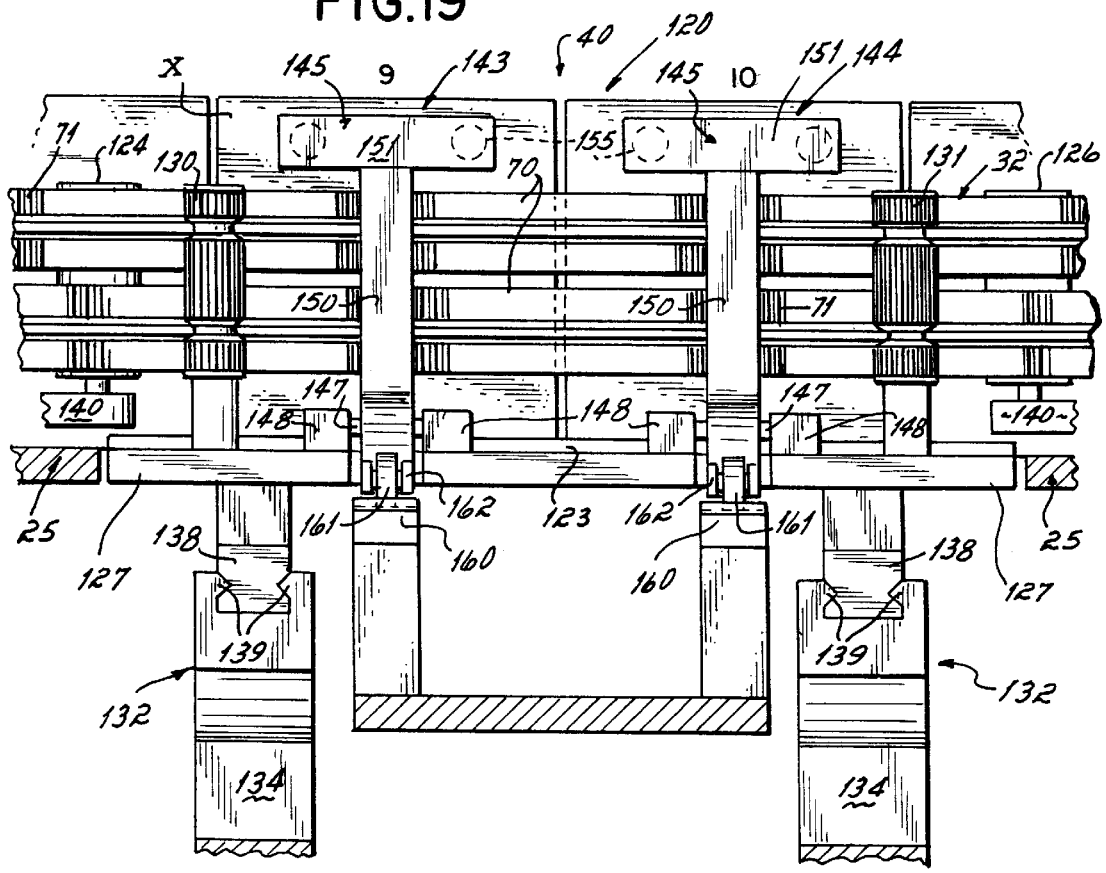
FIG. 8 is a cross-sectional view of the sleeve opening station looking from the rear as seen on line 8—8 of FIG. 6.

Referring to FIGS. 6–8, there is provided a slotted track 123 that extends longitudinally through the loading station 40 at sleeve positions 9 and 10 to support the bottom edges of the sleeves X. The sleeve opening station 120 shares a pair of idler rollers 84 with the sleeve uprighting station 37 of FIG. 4, which guide the advancing flights of the belts 70 above and parallel to the track 123. Another pair of idler rollers (not shown), comparable to the pair of rollers 84, is also provided adjacent the rollers 84 to guide the returning flights of the belts 70 at the transition from the downstream end of the uprighting station 37 to the upstream end of the loading station 40, in line with the track 123. A pair of rollers 125 similar to the pair of rollers 84 guide the advancing flights of belts 70 at the downstream end of the loading station 40. A further pair of idler rollers (not shown), comparable to the pair of rollers 125, is provided adjacent the rollers 125 to guide the returning flights of the belts 70 at the downstream end of the loading station 40, in line with the track 123. The pairs of rollers 84 and 125 are rotatably mounted on vertical shafts that are fixed to and stand upwardly from the base 25 of the assembly 21 approximately adjacent sleeve positions 8 and 11 respectively on the belt conveyor 32.

A pair of plates 127 and 128 are provided on respective right and left sides the track 123 in the vicinity of sleeve positions 9 and 10 on the conveyor 32. The plates 127 and 128 are slidably mounted with respect to the base 25 for transverse movement, perpendicular to the conveyor 32. Two pair of idler gear rollers 130 and 131 are provided at the upstream and downstream ends of the opening station 120, one roller of each pair being rotatably mounted on a vertical shaft upstanding from a different one of the plates 127 and 128. The rollers 130, 131 are positioned to engage cogs 71 on the backs of the advancing flights of the belts 70. The rollers 130, 131 normally maintain the belts 70 between them at sufficiently close spacing to maintain nonsliding contact with the sleeves X moved by the belts.

During a disk loading operation at the loading station 40, however, the plates 127 and 128 move apart, each carrying with it one of the rollers 130 and 131 of each pair. As the rollers 130, 131 of each pair move apart, the belts 70 separate allowing sufficient space between the belts 70 for the sleeves X to be opened and discs Y inserted in the opened sleeves X, while the bottom edges of the sleeves X that are located at sleeve positions 9 and 10 remain supported by the track 123. The transverse movement of the plates 127 and 128 is achieved by the simultaneous actuation of a pair of parallel gripper devices 132, one located approximately in line with each of the sleeve positions 9 and 10. Each of the devices 132 includes a pneumatic cylinder 133 in the base 134 of the device 132 that is fixed to the base 25 of the apparatus 20. The cylinder 133 contains a piston 135 that, in response to a pneumatic signal, vertically moves a pair of racks 136 fixed thereto to drive a pair of pinions 137 that transversely move pair of horizontal racks 138 fixed to the bottoms of the to the plates 127 and 128 to move them in precise equal amounts in opposite directions, guided by transverse bearing slides 139. Sensors (not shown in FIGS. 6–8) are provided to inform the controller 66 that the plates 127 and 128 have moved to either fully opened or fully closed positions. The parallel gripper devices may, for example, be of the RP series type manufactured by Robohand Automation Accessories of Monroe, Conn. and marked with U.S. Pat. No. 4,874,194.

The transverse movement of the plates 127 and 128 allows the belts 70 to separate and release the sleeves X at the sleeve positions 9 and 10. To prevent a slackening of the belts 70 when releasing of this sleeve X occurs, two pairs of take up rollers 124 and 126 are provided, one pair 124 at the upstream end of the loading station 40 between the rollers 84 and 130, and one pair 126 at the downstream end of the loading station 40 between the rollers 125 and 131. Each of the rollers 124 and 126 is positioned to contact the frictional outside face of the advancing flights of the belts 70 and is rotatably mounted on a vertical shaft on remote end of a lever 140. The levers 140 are each pivotally mounted on the shafts of one of the rollers 84 and 125. Each of the levers 140 has an actuating arm 141 that is linked to an output shaft of the piston of a pneumatic cylinder 142. Each of the cylinders 142 actuates to an extended condition simultaneously with the actuation of the cylinders 133 that move the blocks 127 and 128 apart and returns to a retracted condition when the plates 127 and 128 move together, but are timed to maintain constant tension on the belts 70 as the plates 127 and 128 open and close. The actuation of the cylinders 142 exerts sufficient force on the actuating arms 141 to urge the take-up rollers 124 and 126 against the belts 70 so as to take-up slack in the belts 70 due to the outward movement of the rollers 130 and 131.

While the separation of the plates 127 and 128 and related components spreads the bands 70 and thereby allows the sleeves X to be opened, the force for opening the sleeves X at the positions 9 and 10 is applied by pneumatic suction gripper assemblies 143 and 144 at each of the respective sleeve positions 9 and 10. Each of the gripper assemblies 143 and 144 includes two T-shaped gripper support elements 145 and 146 respectively located on the right and left sides of sleeves X situated on the track 123. The elements 145 and 146 of the assemblies 143 and 144 are each pivotally mounted on a longitudinal shafts 147, each of which is supported at each of its opposite ends by pillow blocks 148 fixed to the plates 127 and 128. Each of the T-shaped elements 145 and 146 is formed of a central vertical member 150 and respective right and left top cross member 151 and 152. The cross members 151, 152 are integrally formed at the top of the vertical member 150 of each of the T-shaped elements 145 and 146. Each of the cross members 151, 152 carries a pair of suction cups 155 that are connected in pneumatic communication with a selectively actuatable vacuum source 157 The cups 155 form vacuum chucks that grip the opposite sides of a sleeve X located at the positions 9 and 10 and separate the sides of the sleeve X, thereby opening the slot V in the top edge of the sleeve X. The cups 155 on the cross members 151 of the right elements 145 of both assemblies 143 and 144 are spaced at the outer ends of the cross members 151, while the cups 155 on the cross members 152 of the left elements 146 of both assemblies 143 and 144 are more closely spaced from each other than are the cups 155 on the right side cross members 151. This staggering of the cups 155 on the opposite cross members 151 and 152 prevents the cups 155 from locking together when sleeves of thin, porous or highly flexible material are being loaded.

Figure 6A:
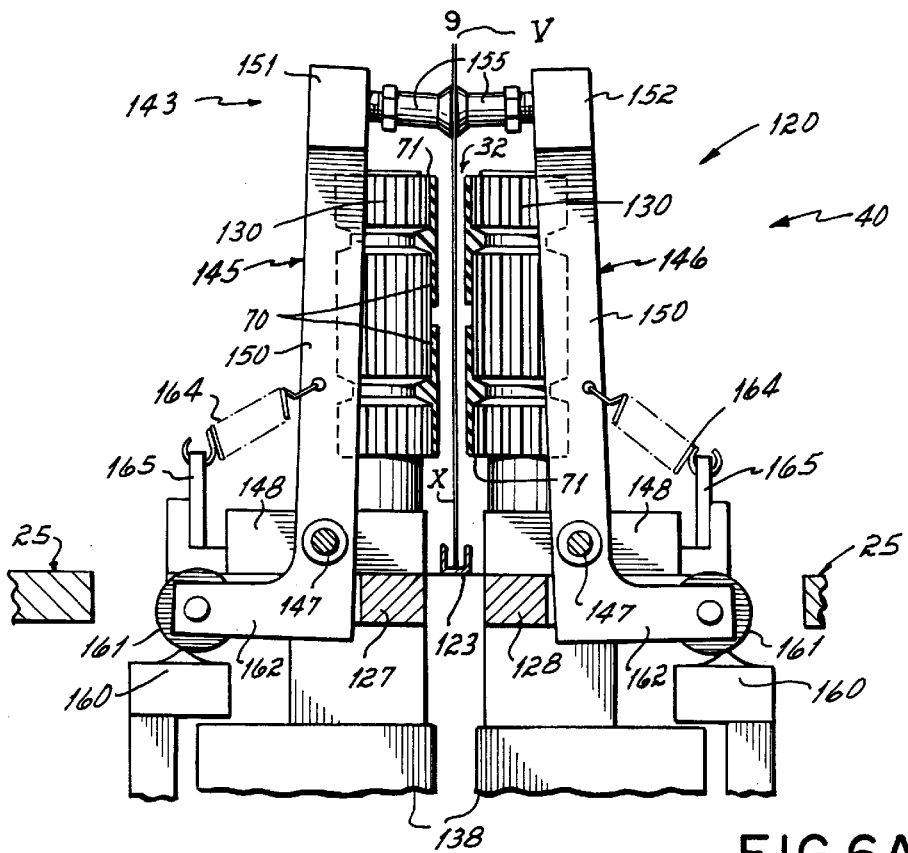
FIG. 6A is a view similar to the left side of FIG. 6 illustrating the initial opening sequence for a sleeve at the sleeve opening and load station.
Figure 6B:
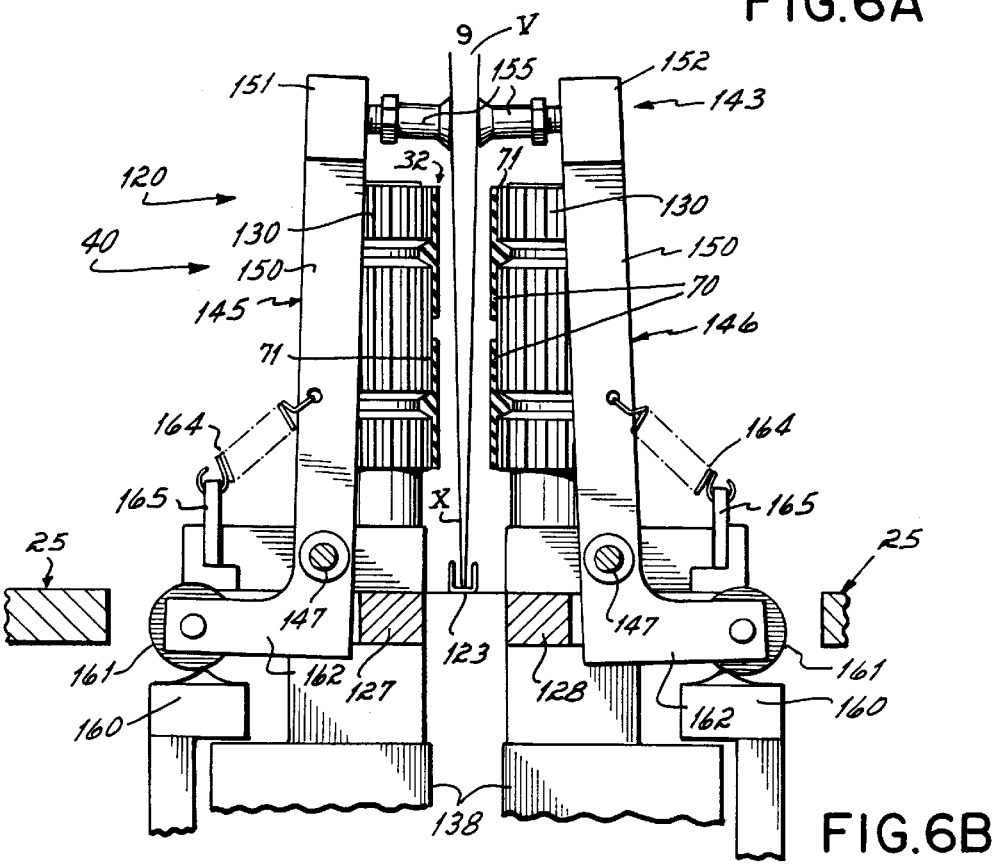
FIG. 6B is a view similar to FIG. 6A illustrating an intermediate position of the opening sequence.

As best illustrated in FIGS. 6A, 6B and 7, the suction gripper assemblies 143 and 144 (not shown in FIGS. 6A, 6B) operate in cooperation with the separation of the belts 70 that occurs with the outward movement of the plates 127 and 128 and are driven by the same parallel gripper device 132. The assemblies 143 and 144 so operate by moving with the movements of the plates 127 and 128 on which the elements 145 and 146 are respectively mounted, but the elements 145 and 146 have the additional motion of momentarily moving toward each other to grip the sleeve X that lies between them with the suction cups 155. Then the elements 145 and 146 rock back on the separating plates 127 and 128, pulling with them the sides of the sleeve X as the plates 127 and 128 continue to move apart. Such synchronized operation of the gripping elements 145 and 146 and the belts 70 is achieved by stationary cams 160 fixed with respect to the top of the base 25. The cams 160 are positioned in the paths of cam followers 161 carried by foot members 162 integrally formed with and extending downwardly and outwardly from the bottoms of the vertical members 150 of the T-shaped elements 145 and 146.

When the sleeves X are closed and held between the belts 70, the relative configuration of the gripper elements 145 and 146 is as illustrated in FIGS. 6 and 7. So configured, the cam followers 161 cause the vertical members 150 to rock inwardly as illustrated in FIG. 6A, when the plates 127 and 128 are initially moved apart, thereby bringing the cups 155 against the sides of the sleeve X, whereupon the vacuum source is actuated by a gripper signal from the controller 66 to grip the sleeve sides. With the sides of the sleeves X engaged by the cups 155, the plates 127 and 128 continue to move apart and the cam followers 161 move down on the cams 160, as illustrated in FIG. 6B, to move the cross members 151 and 152 apart faster than the movement of the plates 127 and 128. This motion causes the opening of the top edge V of the sleeve X in the station. This outward motion of the cross members 151 and 152 continues until the cups 155 are approximately directly above the belts 70, as illustrated in FIG. 6E, where they are most widely spaced. During the movement of the grippers, the cam followers 151 are urged against the surfaces of the cams 150 by tension springs 164 that are stretched between the centers of the vertical members 150 and brackets 165 fixed to the blocks 127, 128.

While the sleeves X are being opened as illustrated in FIGS. 6, 6A, 6B and 6E, discs Y will have been moved by the disc flipping mechanism 121 through positions illustrated in FIGS. 6, 6C, 6D and 6E, as is explained in detail below following the description of FIGS. 16 and 17. The result of the operation of the disc flipping mechanism 121 is to present two discs Y in the vertical planes of the sleeves at sleeve positions 9 and 10, directly above their open top edges V. The loading of the opened sleeves X is thereby achieved by the dropping, under the force of gravity alone, of the two discs Y that are held by the disc flipping station 121 from the position illustrated in FIG. 6E, through the open edges V of the sleeves X and into the sleeves X at sleeve positions 9 and 10 in the sleeve opening station 120. When the discs Y have been loaded into the sleeves X, the gripper devices 132 are actuated to move the gripper elements 145 and 146 of each gripper assembly 143 and 144 back together to the position illustrated in FIG. 6, while the vacuum on the cups 155 is released.

After the sleeves X at the sleeve positions 9 and 10 have been loaded with discs Y, the packages Z that are formed thereby are moved by the indexing of the belt conveyor 32. When the packages Z reach sleeve position 12 at which the sleeve reject station 41 is located, the capacitive sensor 42 generates a signal that is interpreted by the controller 66 to determine the presence or absence of a disc Y in the sleeve X at sleeve position 12. If it is determined that the sleeve X at sleeve position 12 is empty, the empty sleeve is inconspicuously ejected from the conveyor 32 by a sleeve reject mechanism 170 illustrated in FIGS. 9 and 10.

Figures 9, 10:
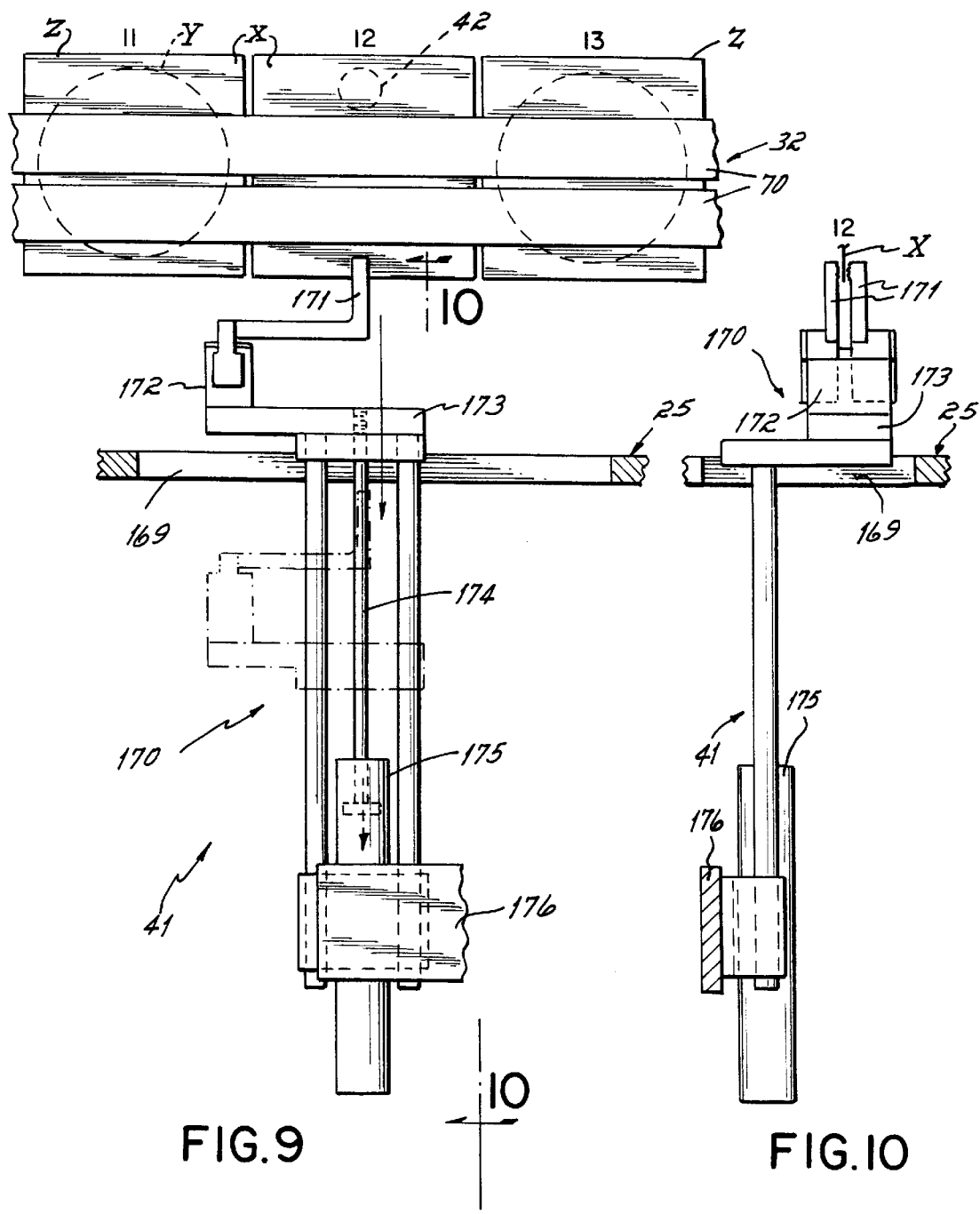
FIG. 9 is a cross-sectional view as seen from the rear of the "empty sleeve" eject station.
FIG. 10 is a view seen on line 10—10 of FIG. 9.

Referring to FIGS. 9 and 10, the sleeve reject mechanism 170 presents a small footprint, occupying a narrow space beneath the top surface of the base 25 below sleeve position 12. It operates quickly to engage an empty sleeve in sleeve position 12 and to pull the sleeve X downwardly, through a narrow longitudinal slit 169 in the top of the base 25, directly below the belts 70. The sleeve reject mechanism 170 is virtually invisible as configured and placed. The sleeve reject mechanism 170 includes an inexpensive mechanism having a pair of fingers 171, illustrated in their normally open standby positions extending through the slit 169 such that the bottom edge of a sleeve X lies between the tips of the fingers 171 that project above the upper surface of the base 25. The fingers 171 are mounted on opposite ends of a pneumatic clamping cylinder 172 that is actuatable by a signal from the controller 66. The clamping cylinder 172 is, for example, a GP Series Parallel Gripper as manufactured by the Rotary Actuator Division of Parker Fluidpower of Wadsworth, Ohio. The clamping cylinder 172 is mounted on a platform elevator 173 that is carried on the upper end of a piston shaft 174, which is illustrated in its normally raised position in FIGS. 9 and 10, of a cylinder 175 fixed to a frame 176 mounted to the base 25. The sleeve ejection operation is initiated in response to a signal from the controller 66 that is generated in response to the combination of a signal from a sensor (not shown in FIGS. 9 and 10) detecting the presence of a sleeve X in sleeve position 10 and a signal from the sensor 42 indicating that no disc Y is present in a sleeve X at sleeve position 12. The initiation of the sleeve ejection operation begins with the actuation of the cylinder 172 to close the fingers 171 on the empty sleeve X in the sleeve position 12. Then the cylinder 175 is actuated to pull the platform elevator 173 downward to carry down the fingers 171 and remove the empty sleeve X from the belts 70. The downward pulling of the sleeve X overcomes the friction between the belts 70 and the empty sleeve X at the sleeve position 12. The empty sleeve X is then dropped, by opening of the fingers 171, into a sleeve reject receptacle (not shown).

The disc transport system 28 includes several subassemblies that, according to certain embodiments of the present invention, cooperate to move and mark discs Y and to load the discs Y into the sleeves X at the loading station 40. These subassemblies include the spindle transport 45 that positions spindles W between the infeed conveyor 47 adjacent the disc transfer station 48 at which discs Y are unloaded from spindles W and transferred to the individual disk transport 46, illustrated in FIG. 1.

The spindle transport 45 includes a spindle shift mechanism 180 that includes two independently moveable gripper blocks 181 and 182, illustrated in their most common operating positions in FIGS. 11A–11D. Gripper block 181 is a double gripper block that is shown holding two disc bearing spindles W against the fixed side rail 183 of a polished horizontal metal track 184 on which the spindles W can freely slide. The gripper block 181 has a pair of arcuate recesses 185 and 186 formed therein that conform to the curvatures of the rims of the spindle bases 188. The spindle W being held in the first recess 185 is located in a full spindle standby position I on the track 184, while the spindle W being held in the second recess 186 is located in located in a spindle unloading position II on the track 184. The second gripper block 182 shown is holding one empty or partially empty spindle W at a spindle reloading position IV on the track 184. Between the spindle positions II and IV is an empty spindle storage position III at which no spindle is shown in FIGS. 11A and 11D. Further illustrated in FIGS. 11A–11D are the infeed and outfeed conveyors 47 and 53 in their deactivated or stationary conditions. The infeed conveyor 47 is activated by the controller 66 in response to a sensor (not shown in FIG. 11A) at the upstream side of spindle position I on track 184 to run only when and as long as no spindle W is present at spindle position I. Similarly, the outfeed conveyor 53 is activated by the controller 66 in response to a sensor (not shown in FIG. 11A) along the outfeed conveyor 53 to run only when and as long as a spindle W is present on the outfeed conveyor 53.

The double gripper block 181 is moveable in the longitudinal direction parallel to the track 184 and in the transverse direction across the track 184. From the positions of the blocks 181 and 182 illustrated in FIG. 11, the controller 66 responds to the presence of an empty spindle W at spindle location II by shifting the block 181 downstream such that the first recess 185 moves spindle W from a first position I at the full spindle standby position adjacent the discharge end of the infeed conveyor 47 to a second position II while the second recess 186 of the block 181 that moves empty spindles W from the second position II to a third position III at which it is temporarily stored, as illustrated in FIG. 11B. When the movement of the spindle W from spindle position I is sensed, the controller 66 runs the infeed conveyor 47 until a spindle W of discs Y is advanced to spindle position I, as also illustrated in FIG. 11B.

If and when a spindle W at spindle reloading position IV is full as determined within the PLC logic, and there is a spindle W located at spindle storage position III, as in FIG. 11B, the second gripper block 182 retracts transversely away from the spindle at position IV, then shifts upstream parallel to the track 184, then advances transversely to engage the spindle at position III in the recess of block 182, as illustrated in FIG. 11C. Then the block 182 shifts downstream along the track 184 to move the spindle W from spindle position III to spindle position IV, pushing with the engaged spindle W the spindle from spindle position IV onto the outfeed conveyor 53, thereupon actuating the outfeed conveyor 53 to carry the spindle W thereon away, as illustrated in FIG. 11D.

The components of the spindle shift mechanism 180 that accomplish the motions illustrated in, and described above in connection with, FIGS. 11A–11D are illustrated in FIGS. 12 and 13. Referring to FIGS. 12 and 13, the mechanism 180 includes two rodless longitudinal motion cylinders 189 and 190, and two conventional transverse motion cylinders 191 and 192, each for each of the gripper blocks 181 and 182, respectively. The rodless cylinder 189 is slidably mounted on a pair of longitudinal rails 193 fixed to the apparatus base 25 and oriented parallel to the track 184. Each of the rails 193 has an adjustable stop 194 at each of the opposite ends thereof. Fixed to the top of the rodless cylinder 189 is the transverse cylinder 191 the rod 191A of which is fixed to the block 181. A pair of transverse rails 195 extend from the block 181 and through brackets 195A fixed to the ends of cylinder 191. So arranged, the actuation of the longitudinal cylinder 189 in either direction moves the block 181 longitudinally in that direction, while the actuation of the transverse cylinder 191 in either direction moves the block 181 transversely in that direction. The rodless cylinder 190 is similarly slidably mounted on a pair of longitudinal rails 196 fixed to the apparatus base 25 and oriented parallel to the track 184. Each of the rails 196 has an adjustable stop 197 at each of the opposite ends thereof. Fixed to the top of the rodless cylinder 190 is the transverse cylinder 192 the rod 192a of which is fixed to the block 182. A pair of transverse rails 198 extend from the block 182 and through brackets 198A fixed to the ends of cylinder 192. So arranged, the actuation of the longitudinal cylinder 190 in either direction moves the block 182 longitudinally in that direction, while the actuation of the transverse cylinder 192 in either direction moves the block 182 transversely in that direction.

At both ends of the paths of the rodless cylinders 189–192 on their respective rails a sensor (not shown in FIGS. 12–13) that informs the controller 66 when the cylinders 189–192 are at either end of their travel. In addition, at position II as illustrated in FIG. 11B, there is provided an annular groove 200 to prevent nicks, dents or burrs on the bottom outer rim of the spindle bases 188 from tipping or angulating the spindle rod 201 of the spindles W on the tracks 184, thus allowing more precisely vertical maintenance of central spindle rods 201 that stand upwardly from the centers of the bases 188 of the spindles W.

Figure 16:
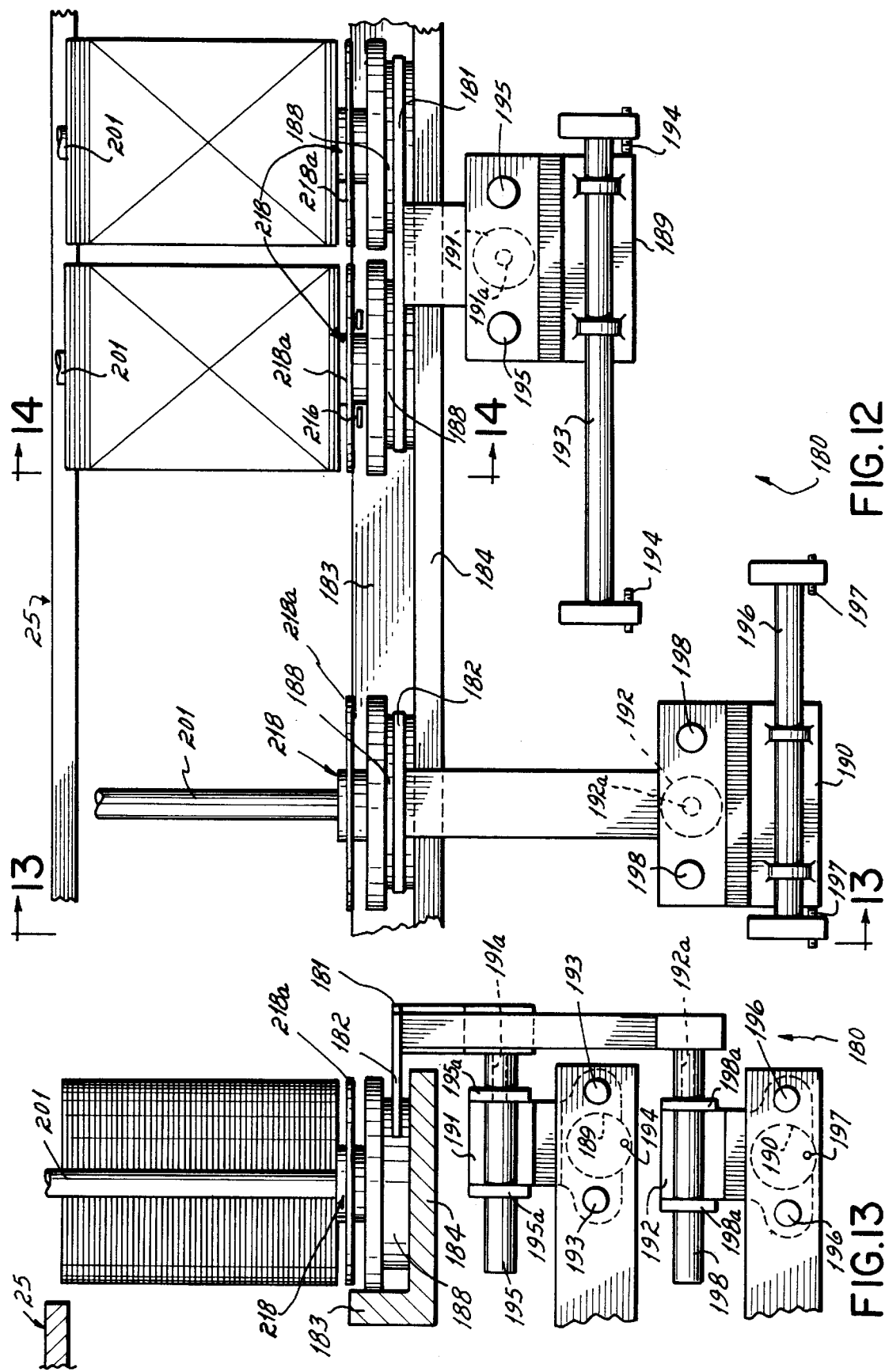
FIG. 16 is a view somewhat like FIG. 14 (but from the opposite side) showing the elevator maintaining the proper height of top disc pickup and showing the structure of the pickup mechanism.
Figure 17:
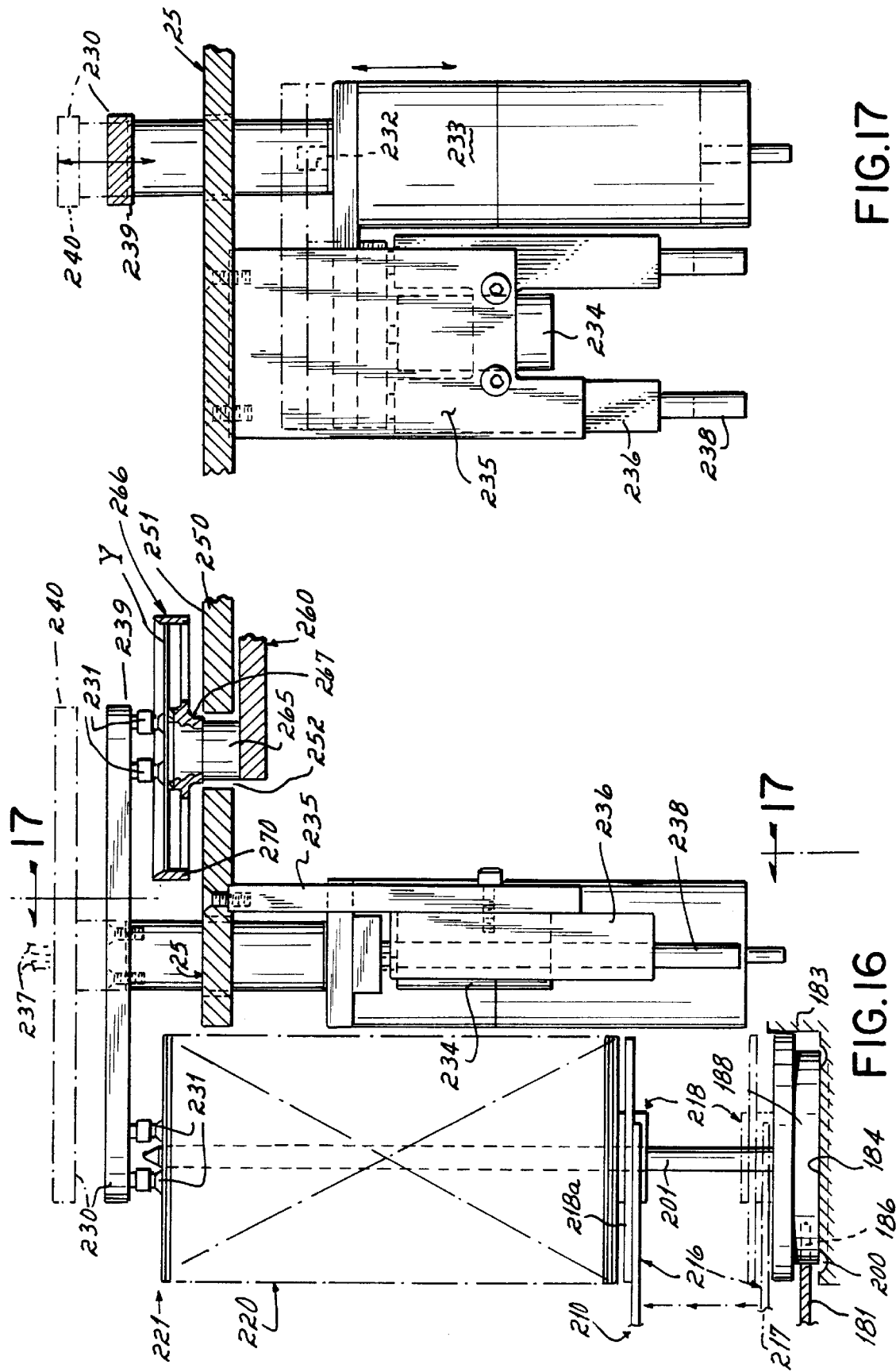
FIG. 17 is a cross-sectional view taken on line 17—17 of FIG. 16.

A further subassembly, a disc stack elevator 210, is provided to facilitate transfer of discs Y from spindles W at spindle position II to the disc unloading arm 51, as is illustrated in FIG. 16. The elevator 210 remains in a fixed position on the base 25. It includes a vertically moveable carriage 211 slidably mounted in a rotatable vertical ball screw track 212 connected to the output shaft of a stepper motor 214. The carriage 211 is supported on the track 212 through a ball nut 215. The carriage is also guided against rotation about the track 212 by a pair of vertical rails 213 (only one of which is shown) fixed relative to the base 25. The carriage 211 has a pair of pivotal arms 216 that pivot between retracted positions 216A, illustrated in FIG. 15, in which both arms are aligned and oriented parallel to the track 184 to provide clearance for spindles W to pass. The arms also have an extended positions 216B, perpendicular to the track 184, for lifting a stack 220 of discs Y on the central rod 201 of the spindle W located at the spindle position II. When the block 181 and the spindle W therein is being moved into position adjacent the elevator 210, the arms 216 are maintained in their retracted positions 216A. The arms 216 are mounted on a pneumatic actuator 219, mounted on the elevator carriage 211, that swings the arms 216 between their retracted positions 216A and their extended positions 216B in response to a signal from the controller 66. Such an actuator may, for example, be of the GP Series type as manufactured by the Rotary Actuator Division of Parker Fluidpower of Wadsworth, Ohio. Sensors (not shown in FIG. 14) are provided to signal the controller 66 that the arms 216 are either fully in positions 216A or 216B.

Figure 18:
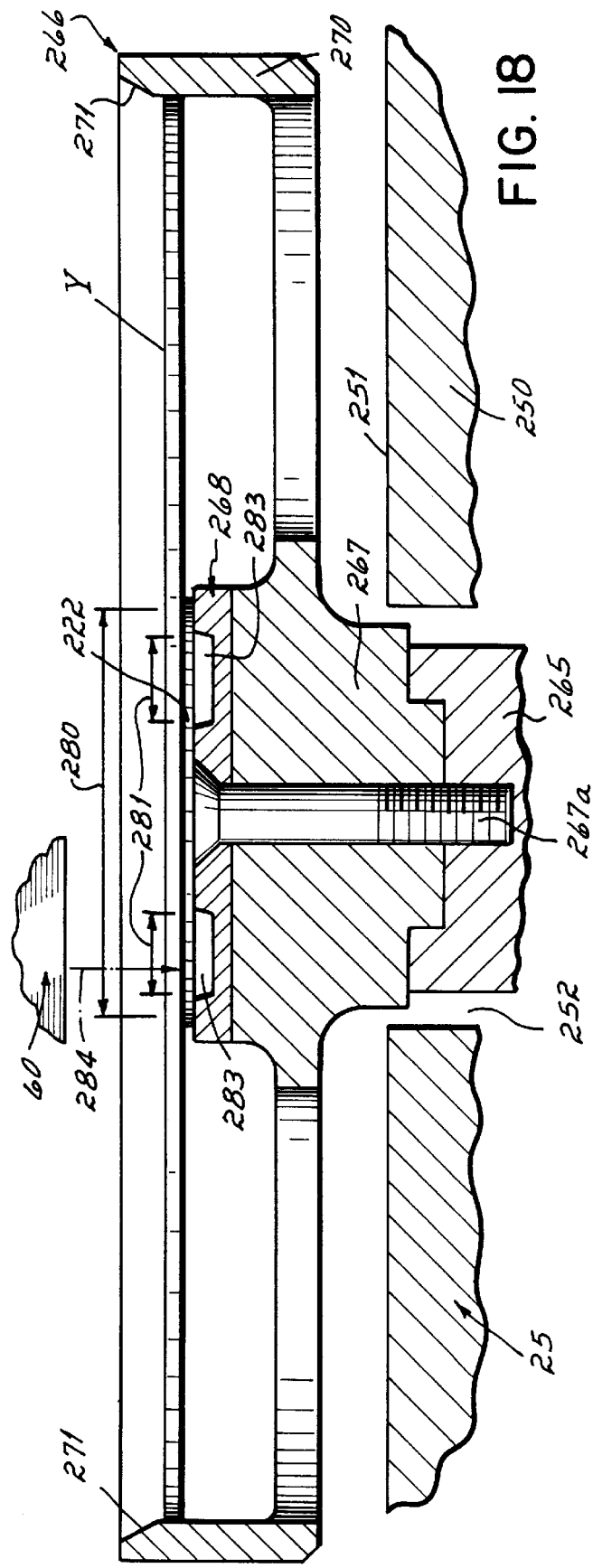
FIG. 18 is an enlarged cross-sectional view of a disc positioned in a disc holder, both being located beneath a laser at the disc marking station.

The carriage 211 has a high speed return for moving it to its lowermost position 217, as illustrated in FIG. 14. In this lowermost position 217, the arms 216, when moved from their retracted positions 216A to their extended positions 216B, will move over the base 188 of a spindle W at the spindle position II and approximately beside a hub 218 at the juncture between the base 188 of the spindle W and its central spindle rod 201. The elevator carriage 211, from this position 217, is elevated under the controlled operation of the stepper motor 214, in response to pulse signals from the controller 66, to raise a stack 220 an amount equal to one disc thickness per pulse or fixed number of pulses until the disc Y at the top of the stack 220 is in a transfer position 221 for pickup by the unloading arm 51 as illustrated in FIG. 16. When raising the stack 220, the tips of the arms 216 are closely adjacent the hub of a stacking ring 218 slidable on spindle rod 201 of the spindle W, and contact the lower face of a flange 218A of the stacking ring 218. As seen in FIG. 18, the central hub 222 of the disc Y is slightly raised so that discs Y when stacked have slight spaces between their flat surfaces. By lifting the discs Y using this stacking ring 218 with flange 218A, the arms 216 do not contact and possibly scratch the bottom surface of the lowermost disc Y of the stack 220.

The elevator 210 has its own controller 225 located in the control cabinet 22 (FIG. 1). The controller 225 causes the elevator to always locate the topmost disc Y on the stack 220 at the transfer position 221, and while the spindles W are being shifted by movement of the block 181 to replace an empty spindle W with one carrying discs Y, to retract the arms 216, lower the elevator carriage 211 to the lower position 217, and re-extend the arms 216 when at the bottom position 217 of the stack 220. In this way, disc Y at the top of the stack 220 is positioned with high accuracy. Further, to facilitate removal of discs Y from the top of the stack 220, an air jet is provided adjacent the elevator 210 to direct air at the discs Y at and near the topmost position 221 to promote separation of the discs Y for pickup.

Further disc moving subassemblies include the rotary disc pickup and placement arms that form three portions of the individual disc transport 46. These arms include the disc unloading arm 51 and the disc loading arm 52 at the disc transfer station 48, and the transfer arm 62 at the disc reject station 61. Each of these transfer arms is similar, and the details of the arms are therefore described for the unloading station 51 only.

Referring to FIG. 16, the disc unloading arm 51 includes a symmetrical transfer arm 230 having a pair of vacuum chucks, each formed of a set of vacuum suction cups 231, located at opposite ends of the arm 230. The arm 230 is pivotally mounted about a shaft 232 of a bi-directional stepping motor 233 so as to be capable of oscillation through 180°. The oscillation of the arm 230 is accomplished by actuation of the high speed stepper motor 233 controlled by pulses from the controller 66 so as to move as rapidly as possible between the two 180° positions, with the maximum acceleration and deceleration that can be achieved without causing loss of discs Y held by the vacuum chucks that are formed of the suction cups 231. As such, no shock absorbing stops are required. The stepper motor 233 is of the type that provides its own feedback, eliminating the need of external sensors, to determine the orientation of the arm 230 and provide such information to the controller 66, including information of whether the arm 230 is in either of the extreme clockwise or counter-clockwise positions. Such information identifying the which of its extreme positions the arm 230 is in is useful in coordinating the motion of two arms positioned close together, such as arms 51 and arms 52, to avoid collisions of the discs Y when being carried thereby. The shaft 232 is also vertically shiftable by actuation of a pneumatic cylinder 234 mounted to the base 25 by a vertically depending plate 235 and guide bushing 236. A pair of guide rods 238 move vertically through bushing 236 maintaining the proper position of the transfer arm 230. The lowermost position 239 is the position in which the arm 230 is illustrated in FIG. 16, wherein the suction cups 231 vacuum chucks can engage discs Y at the transfer position 221 of the stack 220 and is co-planar with the release position of a disc Y into the disc holder 266. The uppermost of the vertical positions 240 of the arm 230 is that illustrated in phantom in FIG. 16 is the rest position as well as the transfer position at which the 180° oscillation of the arm 230 is affected by the operation of the stepper motor 233. Sensors (not shown in FIG. 16) are provided to inform the controller 66 that the arm is in its upper and lower positions 240 or 239. The unloading arm 51 so constructed occupies a small amount of space. Vacuum supply lines 237 for suction cups 231 are connected to the arm 230 at the center of the top of the arm 230, and communicated through the center of the turntable 50, as described below. As stated, the arm 230 is fixed to the base 25 upon a removable mount 235 that retains its proper adjustment when the arm 230 is removed, thus preserving the setting of the position of the arm 230 during disassembly and reassembly.

The suction cups 231 that form the vacuum chucks on the ends of the transfer arm 230 of unloading arm 51 remove the topmost discs Y from a spindle W located at the spindle unloading position II of the spindle transport 45 and deposits them at individual disc position A on the turntable 50, as illustrated in FIGS. 1 and 16. The turntable 50 is formed of a non-rotating circular tabletop 250, that is coplanar with the top surface 251 of the base 25 and disposed concentrically in a larger circular opening in the base top surface 251 to define a continuous annular slot 252. The tabletop 250 is rigidly mounted to the base 25 by depending posts 255A which support a lower frame 255. A concentric hollow cylindrical tubular post or shaft 254 is supported on the frame 255 and fixed to the base 25, as illustrated in FIG. 6. The hollow shaft 254 provides a conduit for routing pneumatic tubes and electrical lines to connect with moving and other components from above, such as the pneumatic line 237 to the motors of the transfer arms 230. The turntable 50 further includes a ten position carousel 260 that is mounted to the housing 261 of a stepper motor 262. The housing 261 of the motor 262 carries the motor armature 263 and is mounted to rotate about a stator 264 fixed to the tabletop support post 254.

The carousel 260 includes 10 upstanding posts 265 that are mounted at 36° intervals around the periphery thereof to which are secured ten disc holders 266 rigidly mounted in the carousel 260. Each disc holder has a post 267 or central hub depending therefrom which seats in a recess in post 265 and is fixedly secured by a flat head machine screw. The diameter of the slot 252 is such that the disc holders or supports 266 are spaced from each other by a distance equal to the spacing of the sleeves X on the belt conveyor 32, which distance is, for example, 130 mm for 120 mm compact discs Y. The supports 266 are fixed to the wheel 265 and the posts 267 are dimensioned to fit through the slot 252 so that the supports are disposed in a circle above the tabletop 250 and the top surface 251 of the base 25, and generally in the same horizontal plane as the uppermost disc position 221 of the elevated stack 220 at spindle position II. The holders 266 include a central horizontal disc support ring 268 on which the ring 222 of the disc Y rests. The holders 266 further include an outer rim 270 that extends above the hub support 268 so that the rim 270 centers the discs Y deposited by the suction cups 231 of the arm 230 of the unloading arm assembly 51 on the support 266. The centering is facilitated by an inwardly tapered edge 271 on the inside of the upper edge of the rim 270.

The motor 262 is of an inside-out type, such as motor type Dynaserv manufactured by Compumotor Division of Parker of Rohnert Park, Calif. The motor 262 is preferably capable of high speed operation and of variable acceleration and deceleration settings, as well as being set to variable index positions. The carousel 260 of the turntable 50 is controlled by the controller 66 to index the supports 266, and the discs Y carried thereby, progressively through the disc positions A through J in a counter clockwise direction. In normal operation where discs Y are serialized and deposited into sleeves X at the loading station 40, the discs Y enter the turntable at disc position A and are removed either at disc position G or disc position H. Rejected discs Y are removed from the turntable 50 at disc position E. Where discs Y are marked and returned to spindles W, rather than loaded into sleeves X, such discs Y are removed from the turntable at disc position I. Accordingly, discs Y should not be found at disc position J.

Disc position B may have located there the optional disc reading station 55. At the disc reading station 55, the a laser reader may be employed to read, for example, an arcuate bar code that is often printed around the hub of the disc Y identifying the work recorded on the disc. If a disc Y bearing the wrong work is identified, a signal is communicated by the reader to the controller 66 so that such disc Y will be transferred to the reject conveyor 63 when such disc Y reaches the disc reject station 61 at disc position E on the turntable 50. In the event that several consecutive discs Y are detected as being of a similar wrong content for the serialization job being run, the controller 66 will conclude that a wrong spindle W is being unloaded at spindle station II and will suspend the job, informing the operator of the conclusion it has made.

At disc position C on the turntable 50, the discs Y on the supports 266 of the carousel 260 will be indexed into the disc marking station 56. The disc marking station 56 has located thereat the output end of the neodymium-YAG laser 60, the computer control 68 of which is programmed to write, in response to instructions from the operator interface computer 67, a serial number or other marking upon the disc Y at the station 56. Preferably, the laser 60 is of a type such as Lightwriter SP manufactured by Lumonics Corporation of Camarillo, Calif. The laser 60, when properly set, is most effective in writing a three-dimensional, non-removable high resolution black marking on the clear optical grade polycarbonate material. Such settings preferably include laser beam dot diameter of 0.01 cm, a power level of approximately 25 W, a pulse rate of 4250 pulses/second, a lamp driving current of 32.5 amps, and a line speed of 7.5 inches/second. The result produces approximately 300–600 dots per inch, preferably about 550 dots per inch, and an essentially continuous line. Seam overlap is set at about 25%. If the power settings are too low, such as below 25 amps of lamp driving current, the marking may be too faint or not appear at all. If the power settings are too high, burning of the disc, or at least the upper surface of the disc may occur and the marking may be blurred. Such settings, with the 1064 nanometer wavelength of the YAG laser, produce a carbonized-appearing mark, which resembles interstitial blade spheres throughout the disc when magnified. Such a laser 60 contains in its controls 68 sufficient intelligence to detect errors in the marking process that may cause mismarking of the disc Y at the marking station 56. When this occurs, information is passed from the laser control 68 through the user interface computer 67 to the controller 66 to cause rejection of the mismarked disc Y when it reaches the disc reject station 61.

The details of the disc support 266 of the carousel 260 that cooperate with the laser 60 can be appreciated from FIG. 18, which illustrates a disc Y at the marking station 56 generally centered within the rim 270 of a disc support 266 of the carousel 250. The hub ring 222 of the disc Y supports the disc on the disc support ring 268 of the disc support 266. A central hub portion 280 of the disc Y of clear plastic lies within the ring 222 and contains an annular area 281 upon which the marking by the laser 60 is to be made. The disc support ring 268 of the support 266 in the area beneath the annular area 281 is recessed to provide space 283 below the area 281 for the beam 284 of the laser 60 to exit the disc hub 280 and be dissipated instead of being reflected back into the disc hub 280 or absorbed to overheat or burn the disc support ring 268 of the support. Burning of the support 268 can release contaminates onto the disc Y, which is not generally acceptable. The recess or space 283 may be of the form of an annular slot entirely through the hub 268 or, as illustrated, be recessed a distance of, for example 2.2 mm, or, preferably 10 mm or more. Where merely recessed, the hub is formed of a material such as a dull polished aluminum. Such a material does not reflect a focused laser beam at the frequency of the neodymium-YAG laser back to the disc with sufficient power to mark the disc, and otherwise resists melting or burning by conducting heat from and diffusing the beam. If, over a period of time heat conduction deteriorates the support ring 268, the screw 267A is removed and the ring 268 is easily replaced by a new one without replacing the entire disc holder 266.

Properly marked discs Y are loaded into correspondingly marked sleeves X at the loading station 40. The discs Y are carried to the loading station 40 as the turntable 50 is indexed to bring two adjacent marked disc bearing supports 266 to disc positions G and H. When two marked discs Y are present at disc positions G and H that the controller 66 determines correspond to two adjacent sleeves X that are at, or are being advanced to, sleeve positions 9 and 10 respectively, the disc flipping 121 is activated to pick-up the discs Y from disc positions G and H and present them in a vertical orientation immediately above the sleeve positions 9 and 10 on the belt conveyor 32, as illustrated in FIG. 6E. The construction of the mechanisms and other components of the disc flipping station 121 will be understood by reference to FIGS. 6, 6C–6E, 7 and 19.

Figure 19:
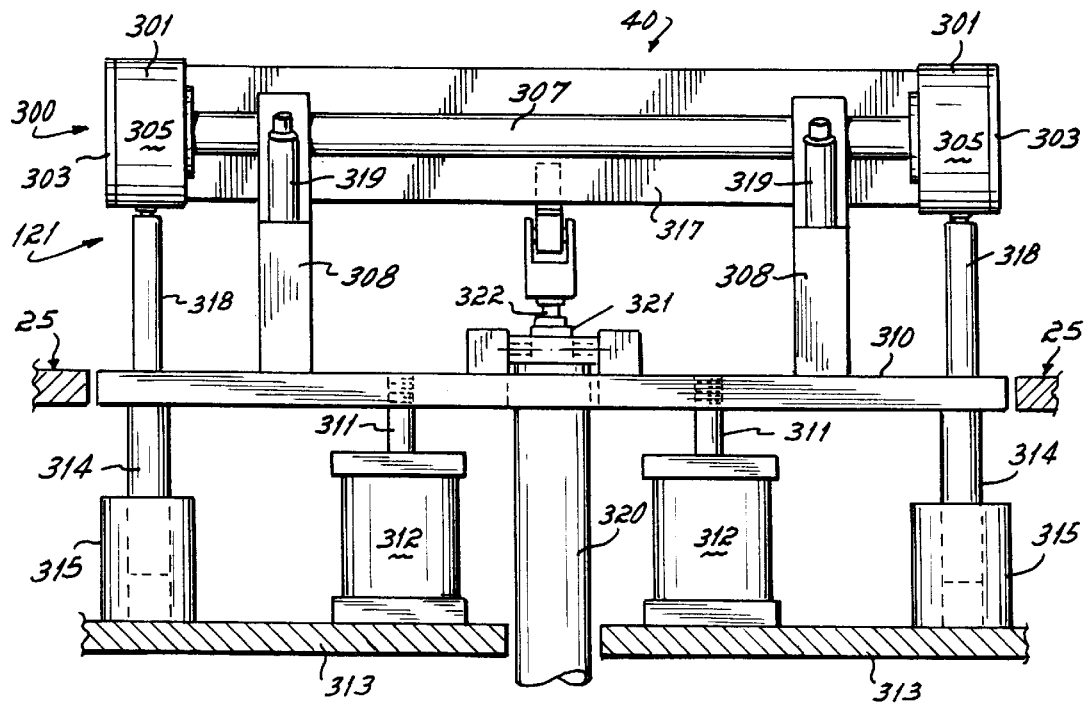
FIG. 19 is a cross-sectional view of the disc flipping area viewed from the rear as seen on line 19—19 of FIG. 6.

The disc flipping station 121 is the portion of the loading station 40 at which discs Y are transferred from the disc positions G and H of the turntable 50 to sleeve positions 9 and 10 on the belt conveyor 32. Referring to FIGS. 6, 7 and 19, the disc flipping station 121 has located thereat a disk flipping mechanism 300 mounted on the base 25 between the turntable 50 and the belt conveyor 32. The mechanism 300 includes a pair of rocker arms 301 each formed of a hollow outer guard 302 having an open side that is covered by a removable plate or cover 303 enclosing belt cage 304 within. The rocker arms 301 are similar in shape, each having a large end 305 and a small end 306. The arms 301 are each pivotally mounted at their large ends 305 to a transverse shaft 307 that extends parallel to the belt conveyor 32 and is supported on a pair of spaced stands 308 on a flat pedestal 310. The pedestal 310 is in turn rigidly supported on top of two rods 311 of a pair of pneumatic cylinders 312 that are rigidly mounted to upstand vertically from a frame member 313 fixed to the base 25. The pedestal 310 is guided by rods 314 that are rigidly connected to the bottom of the pedestal 310 and extend vertically downward through guideways in guide bushings 315 mounted on the frame member 313, to maintain a horizontal orientation as the cylinders 312 are actuated between a raised position in which the pedestal 310 is level with the top surface 251 of the base 25 and a lowered position (see FIG. 6C) at which the pedestal 310 is below the top surface 251 of the base 25.

The guards 302 of the arms 301 are interconnected by a horizontal rigid bar 317 so that the arms 301 retain the same orientations and pivot around the shaft 307 together. The arms 301 are free to rotate on the shaft 307 through an angle of approximately 120°, from a horizontal orientation at which the arms each rest upon a bumper or damper 318 mounted on the pedestal 310 and an elevated inclined orientation at which the bar 317 rests upon a further pair of bumpers or dampers 319 that are mounted on the posts 308 that are in turn mounted on the pedestal 310. The dampers 318 and 319 cushion the impact of the motion of the arms 301 about the shaft 307 as the arms 301 are moved by the actuation of a cylinder 320 that is pivotally connected at its upper end 321 to the pedestal 310 and that has the end of a piston rod 322 thereof pivotally connected to the center of the bar 317. The lower end of the cylinder 320 extends through a cutout in the frame member 313 and is free to move beneath it. Both the cylinders 312 and the cylinder 320 have sensors (not shown in FIGS. 6, 7 or 19) that signal to the controller 66 that they are in their fully extended or fully retracted positions.

The small ends 306 of the arms 301 are interconnected by a circular rod 325 that is pivotally connected to each of the guards 302. Rigidly connected to the rod 325 are a pair of vacuum chucks 326, each located so as to align vertically with the centers of a corresponding one of the disc holders 266 when at the respective disc positions G and H, and each including a plurality of suction cups 327. All of the suction cups of the apparatus 10 are connected through vacuum lines and individual control valves to a vacuum supply. Each also is connected to a source of positive back pressure that will be applied on the cups whenever the vacuum is released to speed the release of discs Y carried thereby. The rod 325 and the shaft 307 each have sprocket wheels 330 and 331 respectively fixed to the opposite ends thereof which are interconnected by an endless cogged belt 334 and all housed within the cages 304 contained within the guard members 302. Each of the wheels 330 and 331 has gear teeth spaced the same distances there around, with the circumference of the wheels 331 being larger than the circumferences of the wheels 330 by a ratio of 7:4, or an amount such that, as the arms 301 are rotated counter-clockwise about the shaft 307 by an angle of 120°, the vacuum chucks 306 rotate clockwise around the rod 325 by an angle of 90°.

When discs Y are presented by the turntable 50 at disc positions G and H for loading into sleeves at the loading station 40, the mechanism 300 will be in or approaching the position and orientation illustrated in FIGS. 6, 7 and 19. When a signal is received from the controller 66 to pickup and present discs Y to the sleeves X at the sleeve opening station 121, the cylinders 312 are actuated, moving the pedestal 310 and the components mounted thereto downward to the positions illustrated in FIG. 6C. This downward motion is sufficient to bring the cups 327 of the vacuum chucks 326 into engagement with the discs Y at the disc positions G and H, whereupon the suction is applied to the cups 327 and the discs Y are thereby picked up from the holders 266 at positions G and H. When this disc pickup has been accomplished, the cylinders 312 are oppositely actuated to raise the pedestal 310, along with the arms 301, vacuum chucks 325 and discs Y, while simultaneous with this motion, the cylinder 320 is actuated by the controller 66 and begins to extend to partially rotate the arms 301 and discs Y to the positions and orientations to the positions illustrated in FIG. 6D. The cylinder 320 then continues to extend further rotating the arms 301 and the discs Y to the positions and orientations illustrated in FIG. 6E, with the discs Y immediately above, and in the planes of, sleeves X at the sleeve opening station 120 of the loading station 40.

In the event that options have been set to mark the discs Y but not load them into sleeves X at the loading station 40, the discs Y will be indexed on the turntable 50 beyond the disc positions G and H to disc position I, where they are unloaded from the turntable 50 onto spindles W at spindle position IV by the unloading arm 52, which functions in a manner similar to arm 51. When the arm 52 is in use, the controller 66 keeps track of which of the extreme angular positions, clockwise or counter-clockwise, that the arms 51 and 52 are in. To prevent collision of disc Y being transferred simultaneously by the two arms 51 and 52, the controller 66 takes steps to prevent the arm 52 from transferring a disc Y between the disc position I and the adjacent spindle position on its side that faces the other arm (toward the arm 51) while the arm 51 is doing the same on its side facing the other arm (arm 52). Rather than merely delaying the motion of the arm 52 to allow arm 51 to pass, which might have to be repeated in each cycle substantially slowing the apparatus 10, the controller 66 causes a one time delay during which the arm 52 is rotated to its opposite position, thereby synchronizing its motion with that of arm 51. As such, minimal time is lost.

The control of the apparatus 20 is based on the concept of allowing various mechanisms and subsystems to operate independently and asynchronously, beginning their motions as soon as the possible, with a central controller coordinating the flow of information needed for the subsystems to function together. As a result, the speed and throughput of the apparatus is optimized. The apparatus control architecture is set forth in a general form in the block diagram of FIG. 20, in which the highest level controller, the user interface computer 67 is shown interconnected with the main hardware controller, which is the programmed logic controller 66, through serial ports by a communications link 401. Both the interface computer 67 and the controller 66 are similarly interconnected through serial ports by communications links 402 and 403, respectively.

In addition, six special purpose controllers 404–409 are interconnected to inputs and outputs of the controller 66. These include three transfer head controllers 404–406 that control the stepper motors 233 of the respective transfer arms, the spindle unloading arm 51, the reloading loading arm 52 and the disc reject arm 61. The additional controllers also include a sleeve line stepper motor controller 407, a disc turntable stepper motor controller 408, and an elevator controller 409.

The sleeve line stepper motor controller 407 controls the stepper motor 95 of the belt conveyor 32 while the disc turn table stepper motor controller 408 controls the motor 262 of the turntable 50. The stepper motor controllers 404–408 control the feeding of pulses to the respective motors 233, 95 and 262 in response to destination commands from the main controller 66. In addition, the controllers receive feedback signals from the motors that report the positions of the motors, and pass certain ultimate position and condition signals to the controller 66. The main purpose of the controllers 404–408 is to handle the commands necessary to accurately move the devices driven by the motors 233, 95 and 262, and to accelerate and decelerate at levels selected as the fastest without losing or damaging the discs.

The three transfer arm controllers 404–406 pass to the controller 66 two binary signals, one indicating whether the arm was last in the extreme clockwise or extreme counter-clockwise positions, and another indicating that the arm is presently between extreme positions, which is interpreted to mean that the arm is moving. The sleeve and disc line controllers 407 and 408 each pass to the controller 66 only one binary signal designating whether the line is in the process of being indexed or is moving, or whether the line has completed indexing and is not moving.

The sixth controller, the elevator controller 409, controls the operation of the elevator stepper motor 214 and also the operation of the pneumatic cylinder 219 that extends and retracts the stack lifting fingers or arms 216 that are mounted on the elevator carriage 211. The elevator controller 209 receives and responds to one primary binary signal from the controller 66, which is a bit indicating that a spindle W loaded with at least one or more discs Y is in position at the elevator 210. Such a spindle W will occupy spindle position II on the track 184, with the slide block 181 clamping the spindle against the side rail 183. The elevator controller 409 responds to this signal by extending the forks or arms 216 with the carriage located at the lowermost position 217, and then lifts the stack 220 of discs Y until the uppermost disc Y of the stack 220 is in the uppermost or unloading position 221 on the spindle W. The elevator controller 409 returns two binary signals to the controller 66, one indicating whether or not there is a disc Y in the uppermost or unloading position 221 and one indicating whether the spindle is empty of discs Y. When the spindle W that the elevator 210 has been operating on is empty, the controller 409 causes fingers 216 to retract to their retracted positions 216A and the elevator carriage 211 to lower to the lowermost elevator position 217 to await a further command from the controller 66 indicating that a new spindle W bearing discs Y has arrived. The elevator controller 409 will also respond to other signals from the controller 66, including, for example, a binary signal indicating that the job is completed or terminated, and that the elevator carriage 211 and arms 216 may home, even though not empty of discs Y, so that the spindle may be moved away.

Figure 20:
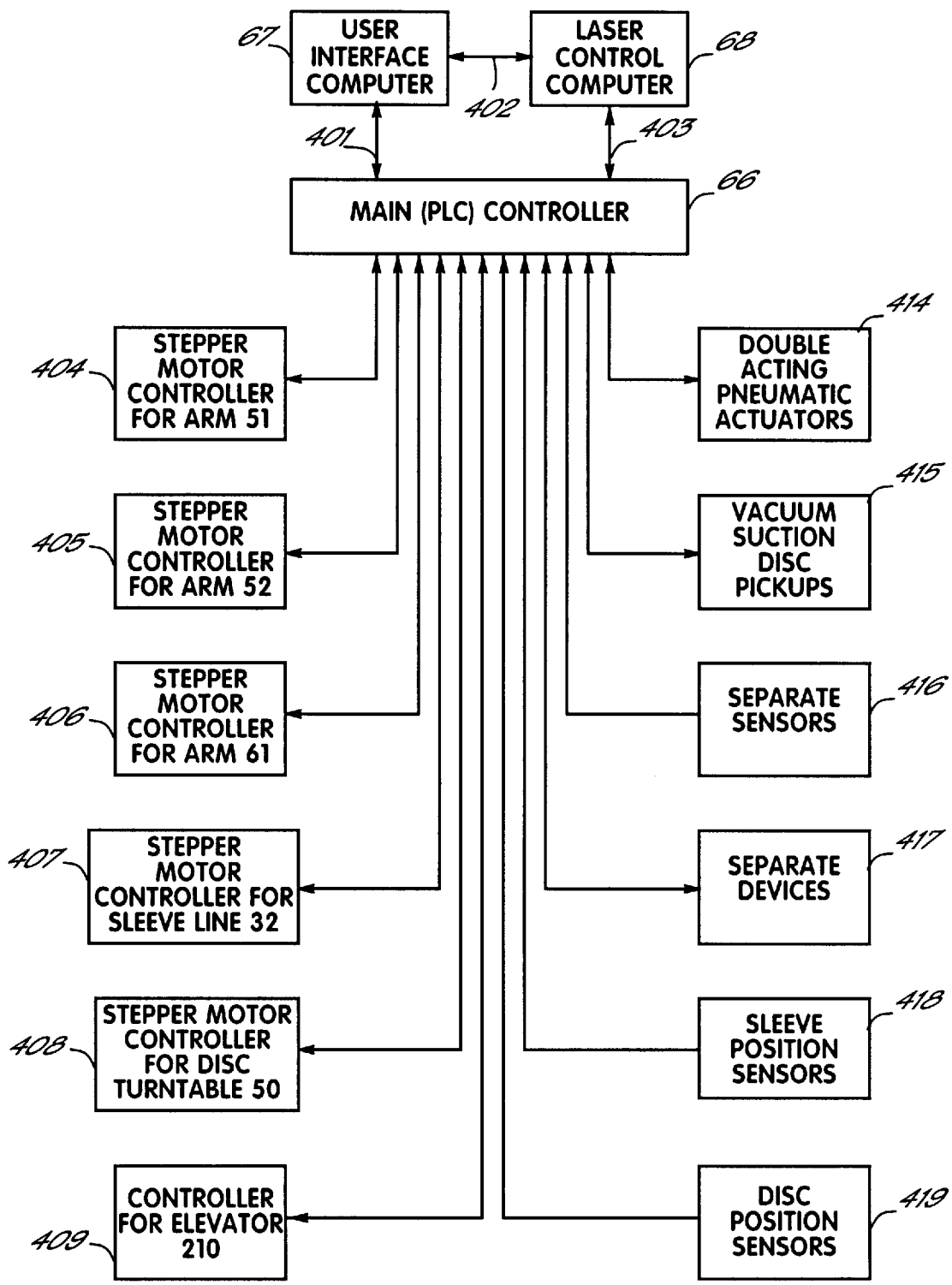
FIG. 20 is a block diagram illustrating the architecture of the programmed controllers of the apparatus of FIG. 1.

Also connected to output of the controller 66 are a plurality of pairs of binary signal lines connected to the inputs of solenoids (not shown) that control air to the double acting pneumatic cylinders of the system, represented collectively by the block 414 of the diagram of FIG. 20, to actuate the cylinders between opposite positions. Each of these actuators is provided with a pair of binary signal lines that feed back to the controller 66 that the actuators are in one of their two extreme positions. Such actuators include, for example, the cylinder 108 of the capture station 35, the longitudinal and transverse action cylinders 189–192 that move the slide blocks 181 and 182, the cylinders 172 and 175 that affect the gripping and pulling of the rejected sleeves at the sleeve reject station 41, the pickup and flipping cylinders 312 and 320 that transfer discs Y to sleeves X at the disc pickup station 121, the sleeve opening and belt tensioning cylinders 133 and 142 that spread the belts 70 and open sleeves X at the sleeve opening station 120, and the head raising and lowering cylinders 234 that raise and lower the spindle unloading and loading and disc rejecting transfer arms 51, 52 and 61, respectively.

Also connected to outputs of the controller 66 are solenoids (not shown) that separately control the application of vacuum to suction cups, collectively represented by the block 415 in FIG. 20, including the cups 231 of each of the heads of the transfer arms 51, 52 and 61, to the suction cups 155 of each of gripper assemblies 143 and 144 of the sleeve opening station 120, and the cups 327 of each of the vacuum chucks 326 of the disc flipping station 121. Each of the lines to the cups 231, 155 and 327 are provided with vacuum sensors that are connected to inputs of the controller 66 to indicate when the respective sets of cups have in fact picked up a disc, which, as the vacuum cups inlets are blocked by the discs that are picked up, causes a measurable increase in the vacuum on the lines near the cups.

Additional inputs and outputs of the controller 66 include controlled devices, collectively represented by block 416 in FIG. 20, including the sheet feeder 30 that responds to a binary signal from the controller 66 calling for the feeding of a sleeve, the labeler 36 that responds to a binary signal from the controller 66 to label a sleeve X located at sleeve line position 3, the infeed conveyor 47 that responds to a binary signal from the controller 66 to advance and transport spindles W toward the spindle unloading station 51, the outfeed conveyor 53 that responds to a binary signal from the controller 66 to advance and transport spindles W out of the assembly 21, the offload air jet at offload station 44 that blows packages Z to a horizontal orientation in an overlapping shingled arrangement when the emerge from the sleeve conveyor 32, the offload conveyor at offload station 44 that responds to a signal from the controller 66 to advance shingled packages Z out of the assembly 21, the airbed conveyor 63 that activates in response to a signal from the controller 66 to supply an airflow to transport rejected discs Y from the reject station 61, and the kicker solenoid 64 that responds to a binary signal from the controller 66 to impart horizontal momentum to a rejected disc Y along the conveyor 63 at the reject station.

Further, inputs are provided on the controller 66 that are connected to other individual sensors, generally represented by the block 417 in FIG. 20, including the sleeve empty sensor 42, a sensor at spindle station I that informs the controller that another loaded spindle W is required at the elevator 210, a sensor at the upstream end of the outfeed conveyor 53 informing the controller 66 that a spindle W may be transported from the assembly 21, and a sleeve feed sensor for informing the controller 66 that a sleeve X from the sheet feeder 30 has been fed to the capture station 35. In addition, one sleeve presence detection sensor, designated collectively by block 418 in FIG. 20, is provide at each of the sleeve positions 2–16 along the sleeve conveyor 32, or at least at each such position at which some operation is to be performed requiring the presence of a sleeve X. Further, one disc presence detection sensor, designated collectively by block 419 in FIG. 20, is provided for each of the ten positions A–J around the turntable 50.

The controller 66 also is provided with outputs for downloading information to the controls of the labeling station 36 that will enable it to print serialized labels in the proper sequence, or to otherwise communicate the serialized information to the labeler. A further output is provided for the downloading from the controller 66 to the sheet feeder 30 information to set or select parameters relevant to different types of sleeves that may be fed. Additionally, a separate output may be provided, or the serial communications link 403 may be used, to communicate laser firing commands to laser 60. The link 403 is generally used to download information to the laser computer 68 for the proper generation of the graphics of the marking being printed by the laser 60, and for tracking of the serialization of the markings in the proper sequence.

Figure 21:
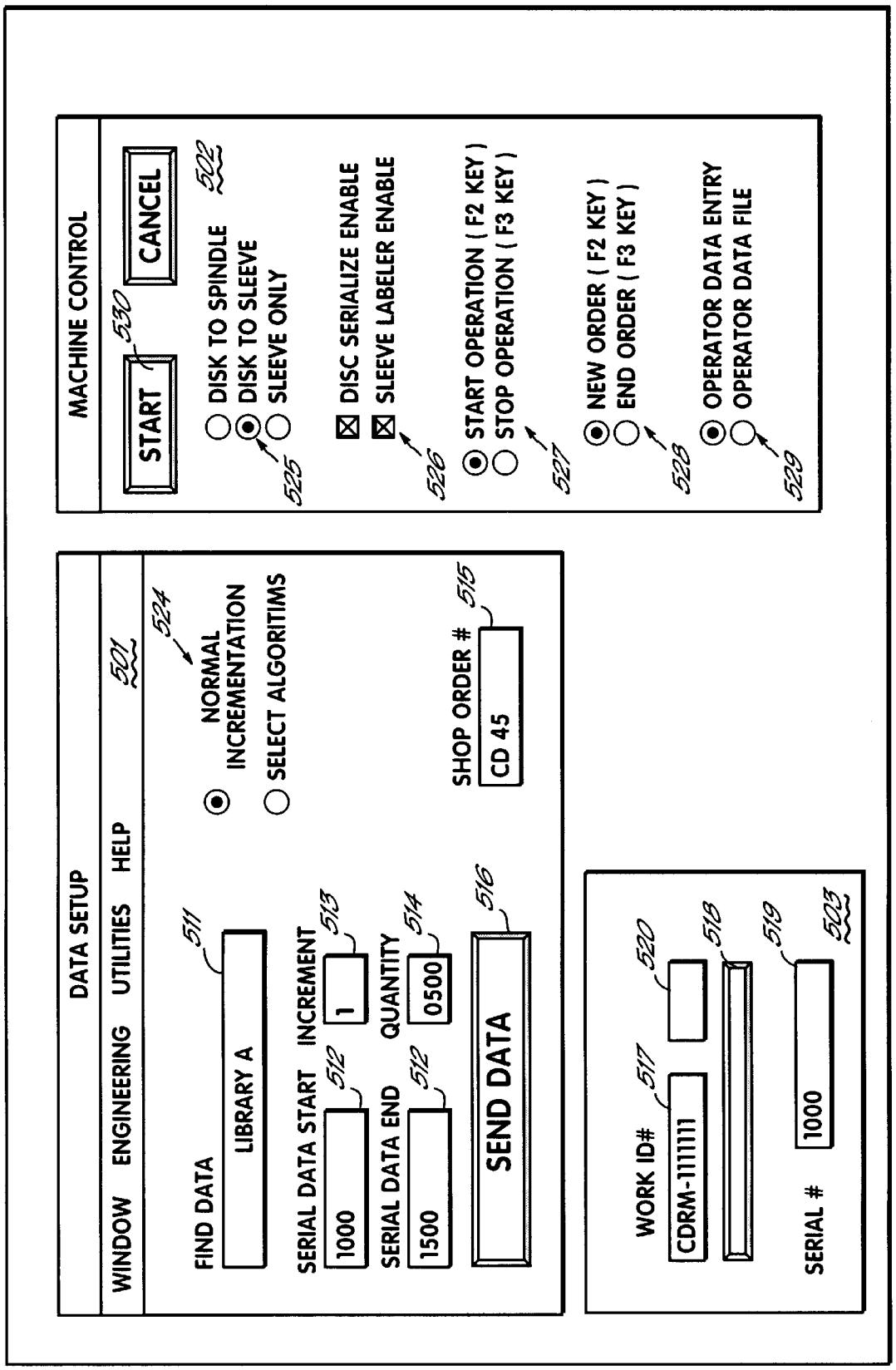
FIG. 21 is a diagram of a display of the main menu or screen of the operator interface controller of the apparatus of FIG. 1.

The controller 66 is provided with memory locations and logic for controlling the serialization of discs Y and sleeves X and for matching serialized discs Y with correspondingly serialized sleeves X and loading the matched discs Y into the corresponding sleeves X to form the serialized disc packages Z. The serialization logic and process described in conjunction with the programming and use of the interface computer 67, which sets up and monitors the serial numbers being applied. An example of a suitable program for the interface computer 67 is set forth in Appendix A to this application. FIG. 21 is an illustration of the main computer screen 500 of the interface computer 67, which is displayed when the computer is powered up. The screen 500 is divided into three windows, including a main or data setup window 501, a machine control window 502 and a product status window 503.

The main window 501 includes five text boxes 511–515 into which an operator enters data for the control of a serializing and sleeving operation and one text box that displays calculated information to the user. In the first box 511, the operator enters fixed data characters that are to appear at the beginning of the label to be printed on the sleeves and/or to be marked on the discs. In FIG. 21, these are "LIBRARY A", as an example. Then the user enters into second box 512 the beginning number to be printed on the first disc and/or sleeve of the job. In the example, this is the number "1001". As a result, the first disc or sleeve of the job will be marked "LIBRARY A 1001". In the third field 513 the operator enters the increment, which is 1 in the example. As a result of this entry, the second, third, etc., serial numbers printed will be 1002, 1003, etc. In the fourth box 514, the operator enters the quantity of discs and/or sleeves to be serialized in the current job, the job number for which the operator enters in the fifth box 515. As a result of the entries in boxes 512–514, the software of the computer 67 calculates the ending serial number that will appear on the last disc or sleeve to be serialized, which is 1100.

The operator may then send the data by clicking on a SEND DATA command button 516 provided. This results in the opening of the window 503 which requires the operator to enter, in a text box 517, a Work ID Number in a text box 517 that identifies the subject matter of the CDs being serialized. The operator, upon entering the ID number, clicks on the command button 518, which runs a routine that looks up the ID number to determine if any prior discs of that ID number have been serialized, and if so, to inform the operator of the last serial number effectively issued for that disc type by displaying that last number in text box 519. If the starting number entered by the operator in box 511 would result in duplication, or if some other error or comment needs to be noted, a code is presented to the operator in box 520. Upon completion of the current job or order, a database is updated to record the serial numbers used and to update the looked up information provided operators in connection with future jobs.

As an alternative to the direct incrementing of the serial numbers, as set forth in the example above, window 501 presents options to the operator as set forth at 521 of the window 501. The operator is presented with the options of either selecting incremental numbering or numbering in accordance with a particular algorithm. Such an algorithm may be provided by a customer desiring to reduce the likelihood that an unauthorized user may guess a serial number by establishing authorized numbers in only those that satisfy the algorithm. If this option is selected, a list of customer algorithms, which will have been provided by the customer and entered into the interface computer 67 during a setup mode, will be displayed to the operator for selection.

The window 502 provides the operator with options for running the job. If closed, the window 502 can be reopened by selecting the window 502 from a pull down menu (not shown) under the Window bar menu in window 501. On the machine control window 502, the operator can select, form the option list 525, the options of (1) running discs only and reloading the discs onto spindles by way of the reloading station 52, of (2) running both discs and sleeves and loading the serialized discs to sleeves at the loading station 40, which is the most important option provide by the apparatus 20, or of (3) running only sleeves. Using check list 526, the operator may serialize either discs or sleeves or both. The operator may use an option list 527 to either start or stop the operation, which functions may be implemented directly by presses of function keys F2 and F3, respectively. Similarly, the operator may specify, from option list 528, a new order or end an order at any time, , which functions may be implemented directly by presses of function keys F4 and F5, respectively. Further, the operator may specify, from option list 529, whether the data will be entered from the keyboard of the interface computer 67 by the operator, through the use of the window 501, or be called up from a customer data file, a list of selections for which will be displayed to the operator. The operator may execute the selected functions by clicking on the START command button 530 or may cancel the settings by clicking on the CANCEL command button 531.

When orders or jobs are started, serialization data sent by clicking on the SEND DATA command button 516 is sent over the serial communication link 402 to the laser control computer 68, over the serial communication link 401 to the main controller 66, and from there to a memory in a controller built into the labeling station 36. As the jobs or orders are run, the controller 66 keeps track of sequential numbers, from 1 to the Quantity value entered through text box 514, corresponding to the discs and sleeves of the order. The controller 66 does so by writing the numbers to shift registers and shifting the numbers through positions in the shift registers that correspond, respectively, to sleeve positions 2–16 and disc positions A–I, respectively in the sleeve conveyor 32 and turntable 50, as the sleeves X and discs Y are shifted through the lines. The shift registers can be understood best by referring to a utility window, illustrated in FIG. 22, that the operator uses to monitor the shifting and serialization operations.

Figure 22:
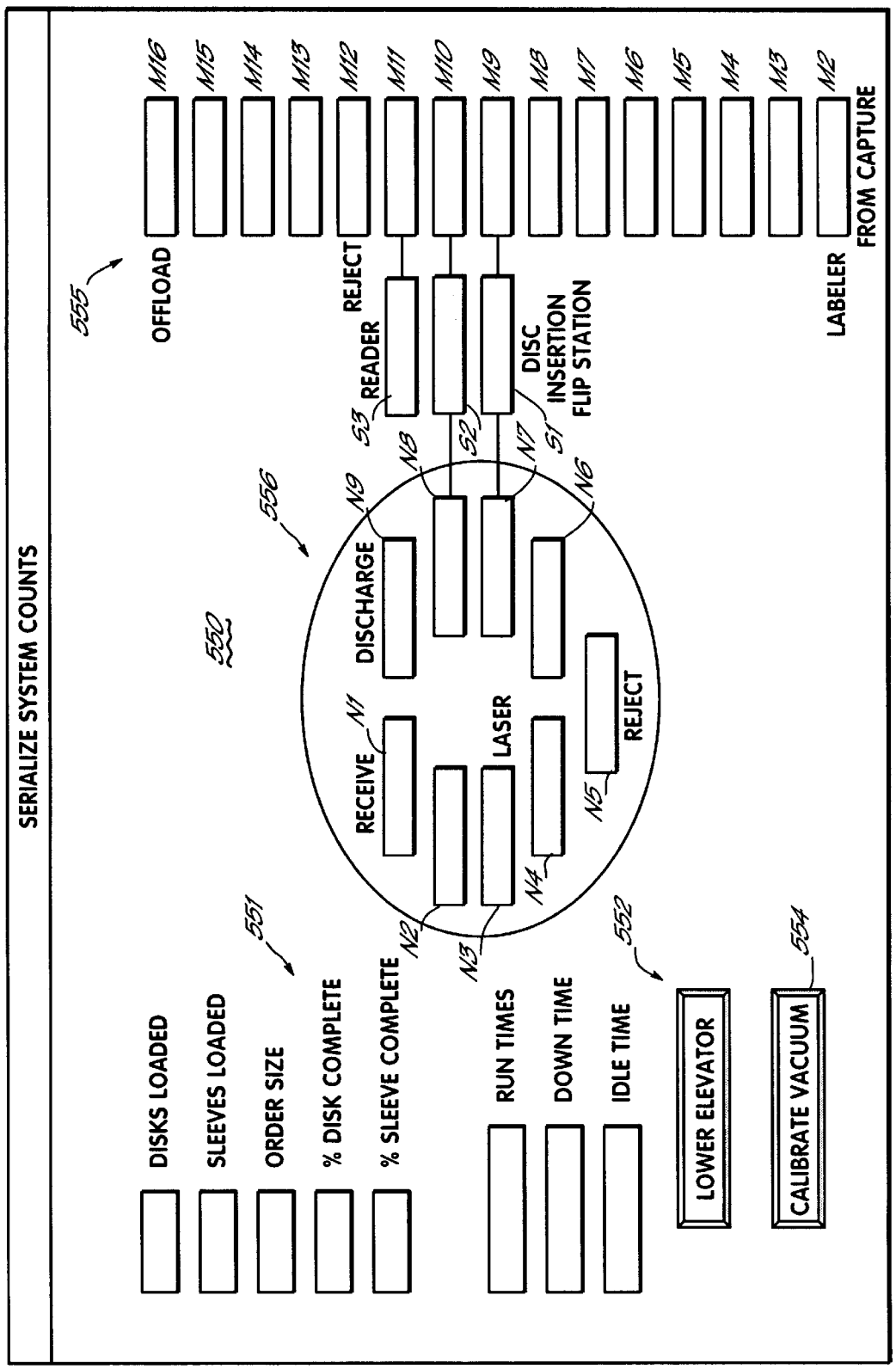
FIG. 22 is a diagram of a monitoring screen of the interface controller of the apparatus of FIG. 1.

As illustrated in FIG. 22, such a utility window, a SERIALIZER SYSTEM COUNT window 550, may be provided with text boxes 551 to display various data to the operator to monitor job progress, and may provide various command buttons 552 to the operator to manually alter or perform various functions or process steps. The window 550 is provided with a column 555 of fifteen text boxes M2–M16 corresponding to the first through fifteenth positions of a fifteen position shift register in the memory of the controller 66. Each of the positions of the shift register, hereinafter referred to by the designation for the corresponding text box on the form 550, corresponds to one of the sleeve positions 2–16 along the sleeve or belt conveyor 32. Position 2 is the first position on the conveyor 32 at which a sleeve X could be found bearing a serial number, since position 2 is the label printing station 36. No position in the shift register and no text box on the form or window 550 is provided for sleeve position 1, the capture station 35, because no numbered sleeve will be found at that position.

When a job begins, the shift registers will be blank, or more precisely, will contain an invalid number, such as 99999, which may be assigned to represent an empty sleeve position, with 99999 being above the largest Quantity number that will be accepted in the box 514. Then, when a sleeve that has been fed to the capture station 35 is indexed to the labeling station 36 at sleeve position 2, a blank or a number 0 will be entered into register location M2. Then, as the first serial number, in the example "1001", is printed on a label and the label is applied to the sleeve X at position 2, a "1" is entered into register location M2. As the line is shifted, the numbered sleeve moves to position 3 and the number "1" is shifted to register location M3, whereupon the next serial number "1002" is applied to a sleeve X that would have been fed into position 2 and the number "2" will be entered into register location M2.

A second shift register is provided in the memory of the controller 66 having nine memory locations corresponding to nine positions A–I of the turntable 50. A further table 556 of ten text boxes N1–N9 is provided in a circular array corresponding to the ten positions of the second register. The locations of the register will hereinafter be referred to by the designations of the corresponding positions in the table 556. No register and table locations are provided corresponding to disc position J because discs will only appear at this location by error, which will trigger a fault condition that will halt the process and inform the operator. Further, while serialized discs cannot appear at disc positions A and B, since the laser marking device 60 is located at position C, register positions N1 and N2 are provided to record fault conditions and the presence or absence of discs Y at positions A and B, which would be of interest to the system.

The shift register for the discs Y functions similar to the register for the sleeves X, with the first number, for example "1001" being marked on the disc at position C and the number "1" entered into table position N3. The number "1" is then shifted to location D and then the next number "1002" is marked on the next disc Y brought into position C as the number "2" is entered into table position N2. The entering of numbers into table location M1 and N3 progresses as each sleeve X and disc C are labeled, and the numbers are progressively shifted through locations M2–M16 and N4–N7, -N8 or -N9, depending on options, as the sleeves X and discs Y are shifted on their respective conveyors 32 and 50. Generally, it is not necessary that there be any coordination between the timing of the marking of the sleeves and discs or the shifting of the sleeves and discs on their respective conveyors. What is important is that the discs taken from positions G and H by the flipping station 121 have serial numbers respectively corresponding to those on the sleeves 9 and 10 when the discs Y are inserted into the sleeves X. The serial numbers of the discs picked up from locations G and H are monitored by a pair of memory variables, displayed to the operator in a pair of text boxes S1 and S2 on form 550, representing the serial numbers of discs being held in the gripper assemblies 143 and 144. A further text box S3 is provided on form 550 to display the output of an optional bar code reader that may be located along the sleeve conveyor 32, preferably at sleeve position 11. Such a reader may be used where the serial numbers applied to the sleeves X at the label station 36 are bar coded as well as marked with human readable characters. A bar code reader upstream from the sleeve reject station 41 can provide information for rejecting an erroneously labeled sleeve X. In addition, such a bar code reader can be set to read preprinted codes on the sleeves such as would be preprinted on the sleeve to identify the product.

Whenever the performance of a job on the apparatus terminates prematurely, or if and when a malfunction occurs, the operator can use the information in the window 550 to restart the job at the correct place, and remove from the system all erroneous discs Y and sleeves X that can cause confusion.

The control program of the main controller 66 and the operation of the apparatus 20 under the control of the programmed controller 66 are best considered in the context of the actions of an operator in communicating with the controller 66 and the physical actions of the various components of the apparatus 20 in response to the controller 66. As described above, the operator will first set up the job to be run on the interface computer 67.

Before the job is run, the apparatus 20 will be run through a calibration routine that sets the pneumatic pressures and signal levels and homes the mechanical components to their rest or standby positions. This can be accomplished from the interface computer 67, such as by clicking on the CALIBRATE command button 554. The operator either will have placed, or will then place, a supply of blank sleeves X in the stack 31 of the sheet feeder 30 and also place several spindles W of discs Y on the infeed conveyor 47. Generally, with the order quantity of 500 as specified in the example above, at least five fully spindles W will be required to hold the five hundred discs Y required for the job. The discs will all be copies of the same data file, program or other digital information product to be serialized and packaged.

The operator will signal the apparatus to start by sending the command from the interface computer 67 by clicking on the START button 530, whereupon all necessary data will be communicated from the interface computer to the laser computer 68 and the controller 66 providing the parameters to perform the job.

Figure 23:
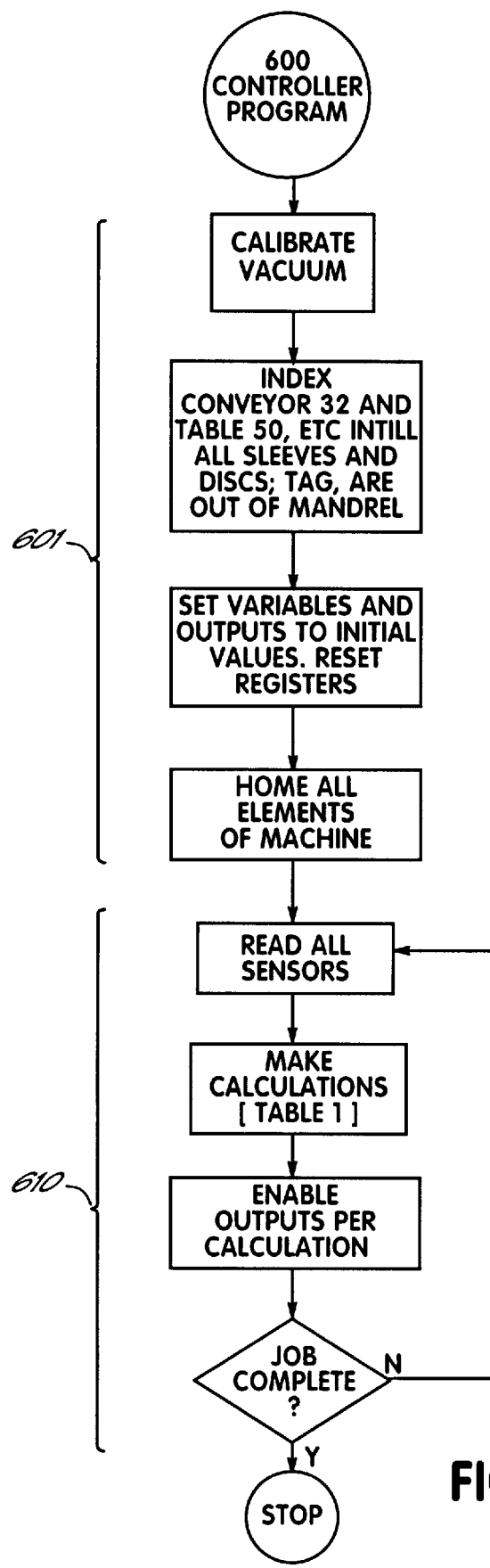
FIG. 23 is a flowchart of main flow of the program of the controller of the apparatus of FIG. 1.

When the start signal is received by the controller, the controller 66 executes a routine 600, an example of which is illustrated in the flowchart of FIG. 23. The routine 600 begins with a start-up routine 601. Upon such start-up, the belt conveyor 32 of the sleeve line and the disc turntable will be indexed to remove what spindles W, sleeves X, discs Y, or completed packages Z, if any, may still be in the machine from a previous run. Thus, before the job is started, the inputs to the controller 66 from all sensors will indicate that no workpieces are present at any of the positions 1–16 or A–I, and that all cylinders, motors and other actuators are in their initial positions. If no sleeves X are in the hopper or stack 31 on the sheet feeder 30, the operator will be informed by a signal from the controller 66, at the operator interface 67, to load the sleeves X.

Also before the running of the job starts, initial settings are made and the registers are set to keep track of the sleeves and discs and their serial numbers as they proceed through the apparatus 20. Generally, the shift register positions will be set to indicate that no discs Y or sleeves X are present, and the starting serial number, increment and count will be loaded into the appropriate memory locations in the main controller 66 and the laser computer 68.

Following the start-up portion of the program, the controller 66 repeatedly executes the main loop 610, also illustrated in the flowchart of FIG. 23, until the job is completed or otherwise terminated. The structure of this main loop 610 is such that the controller 66 optimizes the performance of the apparatus 20 by allowing each of the separate devices to proceed asynchronously to perform their functions once the conditions precedent to those functions is met. The devices also move as far as possible in their cycles and then await the appearance of cooperating elements of other devices so as to avoid unnecessary waiting by one device for another.

As illustrated generally in the flowchart of FIG. 23, in each cycle of the main loop 610, the controller 66 first performs the step 615 of checking all of its inputs, then performs the step 620 of making all of its calculations based at least in part on the inputs, deciding what outputs to trigger in the process. Then the program performs the step 630 of generating the output signals in accordance with the results of the calculations and decisions. Then, unless one of the decisions has been to exit the loop and terminate or suspend the operation of the apparatus 20, the program loops to the beginning of its cycle. The maximum time for execution of each cycle of each cycle of this main loop 610 is in the order of milliseconds or less, and is many times faster than the fastest operation of the devices being controlled, and fast enough to insure that no device must wait any noticeable amount of time for the main loop to cycle.

With the checking of the sensors in step 615, values are set in the memory of the controller 66, which, in addition to calculated values and data from the interface computer 67, are the basis for the calculation and decision making step 620, which is illustrated further in the table or chart of Table 1.

TABLE 1

| CONDITIONS | RESULT VARIABLE | VALUE |
| --- | --- | --- |
| No spindle at position I & <br> END OF JOB = FALSE & optionally <br> No spindle for less than maximum time | INFEED | ON |
| A spindle at position I or <br> END OF JOB = TRUE, or optionally, <br> No spindle for maximum time | INFEED | OFF |
| A spindle on outfeed conveyor | OUTFEED | ON |
| No spindle on outfeed conveyor | OUTFEED | OFF |
| A sleeve at position 16 | AIR JET | TIMED ON |
| A sleeve at position 16 | OFFLOAD | TIMED ON |
| Slide 1 clamped & <br> Slide 1 at right & <br> Empty spindle or no spindle <br> at position II | SLIDE 1 LEFT <br> SLIDE 1 RIGHT | ON <br> OFF |
| Slide 1 clamped & <br> Slide 1 at left | SLIDE 1 UNCLAMP <br> SLIDE 1 CLAMP | ON <br> OFF |
| Slide 1 unclamped & <br> Slide 1 at left | SLIDE 1 RIGHT <br> SLIDE 1 LEFT | ON <br> OFF |
| Slide 1 unclamped & <br> Slide 1 at right & <br> (Spindle at position I or, optionally, <br> INFEED = OFF) | SLIDE 1 CLAMP <br> SLIDE 1 UNCLAMP | ON <br> OFF |
| Slide 2 clamped & <br> Slide 2 at left <br> A spindle at position III | SLIDE 2 CLAMP <br> SLIDE 2 UNCLAMP | ON <br> OFF |
| Slide 2 unclamped & <br> Slide 2 at left | SLIDE 2 RIGHT <br> SLIDE 2 LEFT | ON <br> OFF |
| Slide 2 unclamped & <br> Slide 2 at right & <br> A spindle at position III | SLIDE 2 CLAMP <br> SLIDE 2 UNCLAMP | ON <br> OFF |
| Slide 2 clamped & <br> Slide 2 at right & <br> Spindle at position III | SLIDE 2 LEFT <br> SLIDE 2 RIGHT | ON <br> OFF |
| A sleeve at position 2 (label station) & <br> Sleeve at position 2 is unlabeled & <br> Belt conveyor not moving & <br> LAST SLEEVE = FALSE | LABELER | TRIGGER |
| SLEEVE # > QUANTITY | LAST SLEEVE | TRUE |
| LABELER TRIGGER | LABEL HEAD DOWN <br> LABEL HEAD UP | ON <br> OFF |
| Label head down | LABEL | ON |
| Label printed | LABEL HEAD UP <br> LABEL HEAD DOWN <br> REGISTER M2 <br> SLEEVE # | ON <br> OFF <br> SLEEVE # <br> INCREMENT |
| A disc at position C & <br> Disc at position C is unmarked & <br> Table not moving & <br> END OF JOB = FALSE | LASER <br> REGISTER N3 <br> DISC # | TRIGGER <br> DISC # <br> INCREMENT |
| DISC # > QUANTITY | END OF JOB | TRUE |
| Sleeve line not moving & <br> Sleeves CLOSED & <br> ((Empty sleeves at positions 9 & 10) or <br> ((empty sleeve at positions 9 or 10) & <br> (& single disc inserting conditions exist))) | SLEEVE OPEN <br> TENSION <br> VACS <br> SLEEVE CLOSE | ON <br> ON <br> ON <br> OFF |
| Sleeves OPEN & <br> Sleeve in Vac A or B & | SLEEVE CLOSE <br> VACS | ON <br> OFF |
| Disc(s) dropped into sleeves | TENSION <br> SLEEVE OPEN | DELAY OFF <br> OFF |
| A disc at station E & <br> N5 = REJECT & <br> Table not moving & <br> Reject Arm UP & <br> Reject Arm not moving | REJECT DOWN <br> REJECT UP | ON <br> OFF |
| A disc at station E & <br> N5 = REJECT & <br> Reject arm DOWN & <br> Reject arm CW | VAC A | ON |
| A disc at station E & <br> N5 = REJECT & <br> Reject arm DOWN & <br> Reject arm CCW | VAC B | ON |
| Reject arm DOWN & <br> ((Reject arm CW & disc in VAC A) or <br> (reject arm CCW & disc in VAC B)) | REJECT UP <br> N5 <br> REJECT DOWN | ON <br> Empty <br> OFF |
| Reject arm UP & <br> (Reject arm CW & disc in VAC A) | REJECT CCW <br> REJECT CW | ON <br> OFF |

TABLE 1-continued

| CONDITIONS | RESULT VARIABLE | VALUE |
|---|---|---|
| Reject arm UP & | REJECT CW | ON |
| (Reject arm CCW & disc in VAC B) | REJECT CCW | OFF |
| Reject arm UP & | REJECT DOWN | ON |
| ((Reject arm CW &disc in VAC B) or | AIRBED | ON |
| (reject arm CCW & disc in VAC A)) | REJECT UP | OFF |
| Reject arm DOWN & | KICKER | DELAY PULSE |
| ((Reject arm CCW & disc in VAC A) or | VAC A | OFF |
| (reject CW and VAC B = ON)) | or VAC B | OFF |
|  | AIRBED | DELAY OFF |
| No disc at station A & | UNLOAD DOWN | ON |
| Table not moving & | UNLOAD UP | OFF |
| Unload Arm UP & | (spindle to table) |  |
| Unload Arm not moving |  |  |
| Disc at top elevator position |  |  |
| No disc at station A & | VAC A | ON |
| Unload arm DOWN & |  |  |
| Unload arm rotated CCW |  |  |
| No disc at station A & | VAC B | ON |
| Unload arm DOWN & |  |  |
| Unload arm CW |  |  |
| Unload arm DOWN & | UNLOAD UP | ON |
| ((Unload arm CW & disc in VAC A) or | UNLOAD DOWN | OFF |
| (unload arm CCW & disc in VAC B)) |  |  |
| Unload arm UP & | UNLOAD CCW | ON |
| (Unload arm CCW & disc in VAC A) | UNLOAD CW | OFF |
| Unload arm UP & | UNLOAD CW | ON |
| (Unload arm CW & disc in VAC B) | UNLOAD CCW | OFF |
| Unload arm UP & | UNLOAD DOWN | ON |
| ((Unload arm CW & disc in VAC A) or | UNLOAD UP | OFF |
| (unload arm CCW & disc in VAC B)) & |  |  |
| Table not moving & |  |  |
| No disc at position A |  |  |
| Unload arm DOWN & |  |  |
| ((Unload arm CW & disc in VAC A) or | VAC A | OFF |
| (unload arm CCW and disc in VAC B) | or VAC B | OFF |
| Load arm CCW & | CONFLICT | TRUE |
| Unload arm CCW |  |  |
| Load arm CW | CONFLICT | FALSE |
| or |  |  |
| Unload arm CW |  |  |
| A disc at station I & | LOAD DOWN | ON |
| Table not moving & | LOAD UP | OFF |
| Load Arm UP & | (disc to spindle) |  |
| Load Arm not moving |  |  |
| Spindle at position IV & |  |  |
| Slide 2 at left & |  |  |
| Conflict = FALSE |  |  |
| A disc at station I & | LOAD CW | ON |
| Table not moving & | LOAD CCW | OFF |
| Load Arm UP & |  |  |
| Load Arm not moving |  |  |
| Spindle at position IV & |  |  |
| Slide 2 at left & |  |  |
| Conflict = TRUE |  |  |
| A disc at station 1 & | VAC A | ON |
| Load arm DOWN & |  |  |
| Load arm CW |  |  |
| A disc at station I & | VAC B | ON |
| Load arm DOWN & |  |  |
| Load arm CCW |  |  |
| Load arm DOWN & | LOAD UP | ON |
| ((Load arm CW & disc in VAC A) or | & N9 | EMPTY |
| (load arm CCW & disc in VAC B | LOAD DOWN | OFF |
| Load arm UP & | LOAD CCW | ON |
| (Load arm CW & disc in VAC A) | LOAD CW | OFF |
| Load arm UP & | LOAD CW | ON |
| (Load arm CCW & disc in VAC B | LOAD CCW | OFF |
| Load arm UP & | LOAD DOWN | ON |
| ((Load arm CW & disc in VAC B) or | LOAD UP | OFF |
| (load arm CCW & disc in VAC A)) |  |  |
| Load arm DOWN & |  |  |
| ((Load arm CCW & disc in VAC A) or | VAC A | OFF |
| (load arm CW & disc in VAC B)) | or VAC B | OFF |
| ((Discs at positions G and H) or | PLATFORM DOWN | ON |
| ((disc at position G or H) & | PLATFORM UP | OFF |
| (single disc inserting conditions exist))) |  |  |
| Table not moving & |  |  |

TABLE 1-continued

| CONDITIONS | RESULT VARIABLE | VALUE |
|---|---|---|
| Vacs A and B = OFF | | |
| Platform = UP | | |
| Flip Arm = DOWN | | |
| Platform DOWN & | VAC A | ON |
| No discs in Vacs A or B & | S1 | N7 |
| A disc at position G | N7 | EMPTY |
| Platform DOWN & | VAC B | ON |
| No discs in Vacs A or B & | S2 | N8 |
| A disc at position H | N8 | EMPTY |
| Disc in Vac A or B & | PLATFORM UP | ON |
| Platform DOWN | PLATFORM DOWN | OFF |
| Disc in Vacs A or B & | FLIP UP | ON |
| Platform UP | FLIP DOWN | OFF |
| No discs in Vacs A or B & | FLIP DOWN | ON |
| Flip Arm UP | FLIP UP | OFF |
| Disc in Vacs A or B & | VACS A & B | OFF |
| Flip Arm UP & | S1 | EMPTY |
| Sleeves OPEN & | S2 | EMPTY |
| (S1 = M9) & (S2 = M10) | | |
| Machine in sleeve mode & | CAPTURE OPEN | ON |
| Machine in run mode & | CAPTURE CLOSE | OFF |
| Capture Station CLOSED & | | |
| No sleeve at position 1 | | |
| Capture = OPEN & | FEED | PULSE |
| No sleeve in capture station & | | |
| No FEED = PULSE within last 0.1 sec. & | | |
| Capture Station OPEN | | |
| (Fed sleeve at capture station stops | CAPTURE CLOSE | ON |
| or | CAPTURE OPEN | OFF |
| 5 sec since last BELT INDEX) | | |
| Sleeve in position 12 & | FINGER CLOSE | ON |
| No disc in position 12 & | FINGER OPEN | OFF |
| Fingers OPEN & | | |
| Sleeve rejecter UP & | | |
| Belts not moving | | |
| Fingers CLOSED & | SLEEVE REJECT DOWN | ON |
| Sleeve rejecter UP | SLEEVE REJECT UP | OFF |
| Fingers CLOSED & | FINGER OPEN | ON |
| Sleeve rejecter DOWN | FINGER CLOSE | OFF |
| Fingers OPEN & | SLEEVE REJECT UP | ON |
| Sleeve rejecter DOWN | SLEEVE REJECT DOWN | OFF |
| Machine in run mode & | SLEEVE DRIVE | INDEX |
| Machine in a sleeve mode & | $M_I$ | $M_{I-1}$ |
| Capture closed & | M1 | EMPTY |
| Sleeves closed & | SLEEVE LINE | MOVING |
| Print head up & | | |
| No unlabeled sleeve at position 2 & | | |
| No empty sleeves at positions 9 & 10 & | | |
| No rejected sleeve at position 12 & | | |
| ((A sleeve in capture station) or | | |
| (a sleeve in a position 1-16)) & | | |
| Sleeve drive not moving | | |
| Machine in run mode & | TABLE DRIVE | INDEX |
| Machine in a disc mode & | $N_I$ | $N_{I-1}$ |
| Load arm UP & | N1 | EMPTY |
| Unload arm UP & | TABLE | MOVING |
| Reject arm UP & | | |
| Platform UP & | | |
| No disc at position I & | | |
| A disc in a position A–H & | | |
| ((End of job) or | | |
| (No rejected disc at position E & | | |
| No unmarked disc at position C & | | |
| ((No disc at positions G or H) or | | |
| (not in disc-to-sleeve mode)))) | | |
| ELEVATOR CONTROLLER: | | |
| Elevator at rest & | FORK CLOSE | ON |
| Fork open & | FORK OPEN | OFF |
| Loaded spindle at position II & | | |
| Slide 1 clamped and on right | | |
| Fork closed & | ELEVATOR | GO UP |
| No disc at elevator top position & | | |
| Job not at end | | |
| (Job at end | FORK OPEN | ON |
| or | FORK CLOSE | OFF |

TABLE 1-continued

| CONDITIONS | RESULT VARIABLE | VALUE |
|---|---|---|
| Empty spindle at position II) & Fork closed (Job at end or Empty spindle at position II) & Fork open | ELEVATOR | GO TO REST |

Table 1 is a simplified list of the ladder logic code of the controller 66, which is reproduced in Appendix B to this application. The code for controllers 404–409 us reproduced in Appendix C. In executing this code, the microprocessor of the controller 66 continually cycles, reading inputs from sensors and the interface computer 67, and calculates variables that will define the states of the outputs to the components of the apparatus 20. The variables representing the settings of the outputs that are to be made are listed in the center column of the table of Table 1. The left column of the table lists the conditions which, if determined by the microprocessor of the controller 66 to be met, will cause the listed variables to be set to the respective value listed in the right column of the table.

Most times that the main loop 610 executes a cycle, there will be no changes in the conditions sensed or read, and thus no change in the respective output variable settings. In many of the loop executions, probably on the average of one in every ten milliseconds, the conditions will change so as to require a change in the value of usually one, but sometimes more of the output variables. Such a change will cause the actuation of a cylinder in the its opposite direction, the beginning of the motion of a stepper motor, the turning on or off of a vacuum chuck, etc. This is illustrated in the following description of a typical job sequence of the apparatus 20.

In such a typical job operation sequence, the main loop 610 will be executed. Typically, in their initial conditions, the sensors will report that all vacuums chucks are off, that all disc transfer arms are up and not moving, that neither the table 50 nor the belt conveyor 32 is moving, that the spindle and outfeed conveyors are not moving, that the sleeve opening station 121 is closed and the platform and flip arm of the disc flipping station 122 are in their normal rest positions, that no discs Y or sleeves X are in any of the positions A–J or 1–16 or in the capture station, and that no spindles W are present in the spindle transport 45. Then, as the logical calculations set forth in Table 1 are made, certain output variables will be changed.

The controller 66 will determine that no spindle W is at position I of the spindle transport 48 and will turn the INFEED variable from OFF to ON. The controller 66 will also send a signal to the elevator controller 409 indicating that a disc Y is needed at the top position 221 of the elevator 210. Slide block 181 or SLIDE 1, will be unclamped, that is retracted, and at the right, but because INFEED has been set to on, SLIDE 1 will await a spindle at position I before clamping. Similarly, slide block 182 or SLIDE 2, will be to the right and unclamped, but with no spindle W in spindle position III, SLIDE 2 sill not move. The preferred embodiment of the method of the present invention is embodied in the apparatus 20 operated in the disc-to-sleeve mode, with both discs Y and sleeves X of each package Z being marked with corresponding serial numbers. Thus, the controller will find the capture station 35 to be CLOSED with no sleeve X in the capture station. Therefore, the CAPTURE OPEN output variable will be turned from OFF to ON while the CAPTURE CLOSED output variable will be turned from ON to OFF. The main loop 610 will then enable the outputs in accordance with the output variables that were set, turning on the infeed conveyor 47 and actuating the cylinder 108 to open the capture station 35.

The main loop 610 continues to cycle until sensed conditions change. Generally, the infeed conveyor 47 will start to move spindles W filled with discs Y toward spindle position I. This would involve, for example, five one hundred disc spindles for a five hundred disc job, that is, wherein the variable QUANTITY will equal 500. Probably, the first change in conditions to be detected will be the sensing of the arrival of the piston of cylinder 108 at its fully extended position signaling the opening of the capture station 35. When this occurs, as there will be no sleeve X at the capture station 35 on this first occasion, the FEED variable will be set to PULSE. Then, when the outputs are enabled at the end of the controller 66 cycle, a trigger pulse will be sent to the sheet feeder 30 to cause it to feed the first unmarked sleeve X onto the upstream end 33 of the conveyor 32.

Next, the controller 66 will probably sense the arrival of the leading edge 98 of a sleeve X at the stops 111. If none is detected within 0.1 seconds from the pulsing of the feeder 30, another pulse will be sent. If a sleeve X has been fed, the feeder 30 will ignore the second pulse. When the presence of a sleeve X is detected at the stops 111, or if no sleeve X is detected within 5 seconds, as may occur at the end of a job, the CAPTURE CLOSE variable is set to ON and the CAPTURE OFF variable is set to OFF. A variable MO is set to the code for a blank sleeve, for example 99998, to indicate that a blank sleeve X is present in the capture station 35. At the end of the controller cycle, this causes pneumatic control signals to the cylinder 108 to reverse the cylinder 108, lowering the stops 111, the roller 103 and the top flight of the belts 70 at the capture station 35, and closing the capture station on the fed sleeve X.

Next will probably be sensed the closing of the capture station 35, as cylinder 108 is determined to be in its fully retracted condition. Thereupon, with a sleeve in the capture station 35, the capture station closed and no other sleeves X in the conveyor 32, the SLEEVE DRIVE variable will be set on or to INDEX. At the end of the controller cycle, this will cause a trigger to be sent to the belt drive 90, through the sleeve line motor controller 407, to cause the belts 70 of the conveyor 32 to index, thereby moving the sleeve X from the capture station to position 1 on the conveyor 32. The controller 407 will return a signal indicating that the belts are MOVING. In a subsequent cycle of the controller 66, when the controller detects that the SLEEVE LINE variable has been changed from MOVING to STOPPED, the values in the shift register 555 will be shifted. Since there are no serial number values at this early stage in the run of the job, the position sensors will be interpreted and EMPTY values set in all registers positions except sleeve position 1, which will detect and record that a BLANK sleeve was received from the capture station 35.

At any time during the cycling of the controller 66 through the main loop 610, activity may be detected in the disc transport system 28, starting with the arrival at a spindle at position I. Until then, however, the sleeve transport system 25 will continue to operate. The above described sequence by which a sleeve X was fed from the feeder 30 to the capture station 35 will be repeated. After a further indexing of the conveyor, the controller 66 will detect an unlabeled sleeve X at the labeler station 36, which will prevent the further indexing of the conveyor 32 until the sleeve is labeled. When the sleeve line is not moving, the controller 66 will set the LABELER to TRIGGER, which will, at the end of the cycle, cause a triggering pulse to be sent to the label station 36. This causes the print head of the labeler at the label station 36 to lower, and when lowered, to print on the sleeve, or preferably to first print then lower and apply to the sleeve, a label bearing the current SLEEVE #, which will, on this first occasion, be the initial serial number entered by the operator in text box 512, whereupon a number 1 will be entered in register M2, indicating that the first serial number of the job appears on a sleeve at position 2 on the conveyor 32.

Whether or not activity occurs with the disc transport 46, the above sequence will repeat, feeding sleeves at to the capture station 35, applying sequential labels at the labeling station 36, and shifting the sleeves along the conveyor 32, until an empty sleeve X is present at position 10 of the conveyor 32. When this condition occurs, the controller 66 will set the SLEEVE OPEN variable to ON, the SLEEVE CLOSE variable to OFF, the TENSION variable to ON, and the variables associated with the vacuum chucks at the sleeve opening station 121 to ON. At the end of that cycle, the cylinder 133 of the gripper device 132 will actuate to move the supports 127 and 128 apart and the belt tensioning cylinders 142 will activate toward their extended conditions to apply tension on the belts 70 as the supports 127,128 move apart. The solenoids controlling vacuum to the vacuum cups 155 will also be activated.

When the cylinders 133 of the gripper devices 132 are in their fully open condition, however, and when the sleeve feeding, capture and labeling operations are respectively complete at the sheet feeder 30, capture station 35 and labeling station 36, nothing further will occur with the sleeve transport system 27 until there is detected the insertion of discs Y into the sleeves X at the sleeve positions 9 and 10 at the loading station 40. At this point, the shift register 555 will contain the numbers 9, 8, . . . , 2, 1 in each of the locations M2 through M10.

Normally, at sometime before a sleeve X has reached position 10, activity will occur in the disc transport system 28. First, detection of the arrival of a spindle W at the spindle position I will be detected. Scanning the ladder logic represented in Table 1, will reveal that the first procedure to be executed by the controller 66 will be the setting of the INFEED variable to OFF, thereby causing the infeed conveyor 47 to be turned off at the end of the controller cycle. This will cause, in the same cycle, the SLIDE 1 CLAMP variable to be set to ON and the SLIDE 1 UNCLAMP variable to be set to OFF, causing, at the end of the cycle, the actuation of the cylinder 191 to cause the slide block 181 to move to its clamped condition, as illustrated in FIG. 11A. This will clamp the spindle W at the spindle location I. Then, in the next subsequent cycle after the cylinder 191 is sensed as being in its fully clamped condition and at the right, where no spindle is detected in position II, the variable SLIDE 1 LEFT will be set to ON and the variable SLIDE 1 RIGHT will be set to OFF, whereupon, at the end of the cycle of the controller 66, the cylinder 189 will be actuated to slide the slide block 181 to the left, moving the loaded spindle from spindle position I to spindle position II, as illustrated in FIG. 11B.

Then, in a subsequent cycle, the absence of a spindle at spindle position I will cause INFEED to be set to ON and the infeed conveyor 47 to be energized to bring another spindle W to position I, whereupon the INFEED variable will again be set to OFF. In the next controller cycle in which this is detected, SLIDE 1 UNCLAMP will be set ON and SLIDE 1 CLAMP will be set OFF, causing the cylinder 191 to retract, retracting slide 181. Then, when this motion is complete, SLIDE 1 RIGHT will be set to ON, SLIDE 1 LEFT will be set to OFF, and the slide block 181 will be moved to the right by the actuation of cylinder 189 to the right. When the slide block 181 reaches the rightmost position, the SLIDE 1 CLAMP variable will be set to ON and the SLIDE 1 UNCLAMP variable will be set to OFF, causing the cylinder 191 to extend to cause slide block 181 to clamp the two spindles at positions I and II, as illustrated in FIG. 11A.

While the controller 66 may be programmed to allow the slide block 189 to clamp without a spindle in spindle position I when the last spindle of a job is present at position II, the preferred method is to instead provide at the end of each job two empty spindles on the infeed conveyor 47, which will facilitate the clearing of the machine at the end of the job and the setup of the next job with empty spindles in the spindle transport system 46.

This condition, when sensed, will cause the controller 66 to signal the elevator 210, which is at rest with the forks 216 open, by first setting the FORK CLOSE variable to ON and the FORK open variable to OFF, thus causing the cylinder 219 to be energized to close the forks at the bottommost position 217 of the spindle at position II. Then, in a subsequent cycle when the closing of the forks is verified, the elevator controller 409 will raise the elevator carriage 411 to repeatedly bring a disc Y to the topmost position 221, until the job is completed or the spindle is empty.

When the arrival of a disc Y at the top elevator position 221 is sensed and the sensor signal is input to the controller 66, the controller 66 will, in the cycle of its main loop 610, activate the spindle unload arm 51 by setting the UNLOAD DOWN variable to ON and the UNLOAD UP variable to OFF. This will cause the cylinder 234 of the arm 51 to activate downwardly. When the completion of this motion is sensed in a subsequent cycle of the controller 66, the controller will set the VAC variable of the chuck of at the end of the arm 51 that is over the elevator 210 to ON, causing the head to grip the disc Y at the top location 221 of the stack 220 on the elevator 210. Then, after a pressure sensor detects the engagement of the disc Y by the respective head of the arm 51, the UNLOAD UP variable is set to ON, the UNLOAD DOWN variable is set to OFF, and the cylinder 234 will thereupon be enabled to raise the crossarm 230 of the unload arm 51. The removal of the disc Y from the top position of the elevator 210 will also be sensed, causing the elevator controller 409 to raise the elevator carriage 211 until another disc Y appears at the topmost elevator position 221.

When the cross arm 230 of the unload arm 51 is detected as in the up position, the controller 66 will set one of the UNLOAD CW or UNLOAD CCW variables to ON and the other to OFF, depending on the rotary position arm 230. This variable is output to the arm controller 404 which causes the crossarm 230 of the unload arm 51 to rotate, bringing the disc toward the disc position A on the turntable 50. When the arm 51 is in the full CW or CCW position that brings the disc to position A, this position is sensed. Then, in a subsequent cycle of the controller, provided that the table 50 is not moving and there is no disc in position A, the UNLOAD DOWN variable is set to ON and the UNLOAD UP variable is set to OFF. This causes the cylinder 234 to be downwardly activated to move the crossarm 230 of the unload arm 51 down, directing the disc Y in the head onto the holder 266 at position A. When the cylinder 234 is detected as being fully down, the VAC variable for the respective head is set to OFF, causing the chuck to release the disc onto turntable position A. A detection of the disc at position A by the sensor thereat will cause the controller 66 to mark the register N1 as containing an unmarked disc Y.

With all of the arms 51, 52 and 61 are up, the platform 310 is also up, and no discs Y located at stations B–J and one disc on the table 50 at position A, the TABLE DRIVE variable is set to INDEX, which will cause a trigger signal to be sent to the table stepper motor controller 408 to rotate the carrousel 250 by 36°, bring the disc from position A to position B, whereupon the register N2 will be changed to indicate the presence of an unmarked disc thereat while the register N1 will be changed to indicate that it is empty. Then, the sequence set forth above will be repeated until a disc Y is shifted to disc position C. Detection of an unmarked disc Y at position C, while the table 50 is not moving, results in the setting of the LASER variable to TRIGGER, which causes the laser 60 to write the current DISC # to the disc at position C. Thereupon, the number 1 is written to REGISTER N3.

The above sequence continues, with the indexing of each serial numbered disc from position C and beyond being accompanied by the shifting of the contents of each register N4–N8 to reflect the serial number of the disc carried thereby. This will continue until disc number 1 is in position H, as indicated by a 1 in REGISTER N8, and disc number 2 is in position G, as indicated by a 2 in REGISTER N7. When this is sensed, and the table is not moving, the PLATFORM DOWN variable is set to ON and the PLATFORM UP variable is set to OFF. This causes the platform 310 to be lowered by the downward actuation of cylinders 312. When the cylinders 312 have lowered, in a subsequent cycle of the controller 66, the variables VAC of both vacuum chucks 326 are set to ON, whereupon the solenoids connecting vacuum to suction cups 327 will be energized, causing the chucks 326 to pickup the discs Y from locations G and H.

If there is a rejected disc Y at position E, which could be so designated by the writing of a code to a register by a reader when the disc is at position B or by the laser 60 when the disc C is at position C, then the arm 61 will pick up the disc at location C and transfer it to above the airbed 63 in a manner similar to the operation of the unload arm 51 described above. However, in addition, when the reject arm 61 is lowered with a disc Y in the head over the air bed 63 by the setting of the REJECT DOWN variable to ON and the REJECT UP variable to OFF, the airbed is also activated by the setting of the AIRBED variable to ON. Then, once the arm 61 has lowered the disc Y onto the airbed 63, a KICKER variable is set to produce a delayed pulse, and the AIRBED variable is set to turn OFF after a further delay, and the VAC variable corresponding to the head over the airbed 63 is set to OFF, to turn of the vacuum to the head and drop the disc Y onto the airbed conveyor 63. Then, after the kicker pulse delay has lapsed, the kicker 64 will momentarily actuate and kick the disc down the airbed conveyor 63 to the receptacle 65 at the discharge end thereof.

As with other components of the apparatus 20, it should be particularly noted that the arms 51, 52 and 61, once they have picked up or dropped discs, can continue to perform certain motions while other motions of other components proceed. In addition, if the controller 66 senses, when the crossarm 230 of any such arm is down to drop a disc Y, that a disc Y is awaiting pickup by the other head of the arm, then both pickup and drop operations can be carried out simultaneously by the arm, in the same controller cycle.

When there are no longer marked discs at locations G or H, and no unmarked discs at position C, as well as no rejected disc at position E, then, whenever there is either a disc at position A or the job is at the end of the run, then the table is again indexed. The above sequences are repeated as the conditions for them are met.

Figure 6C:
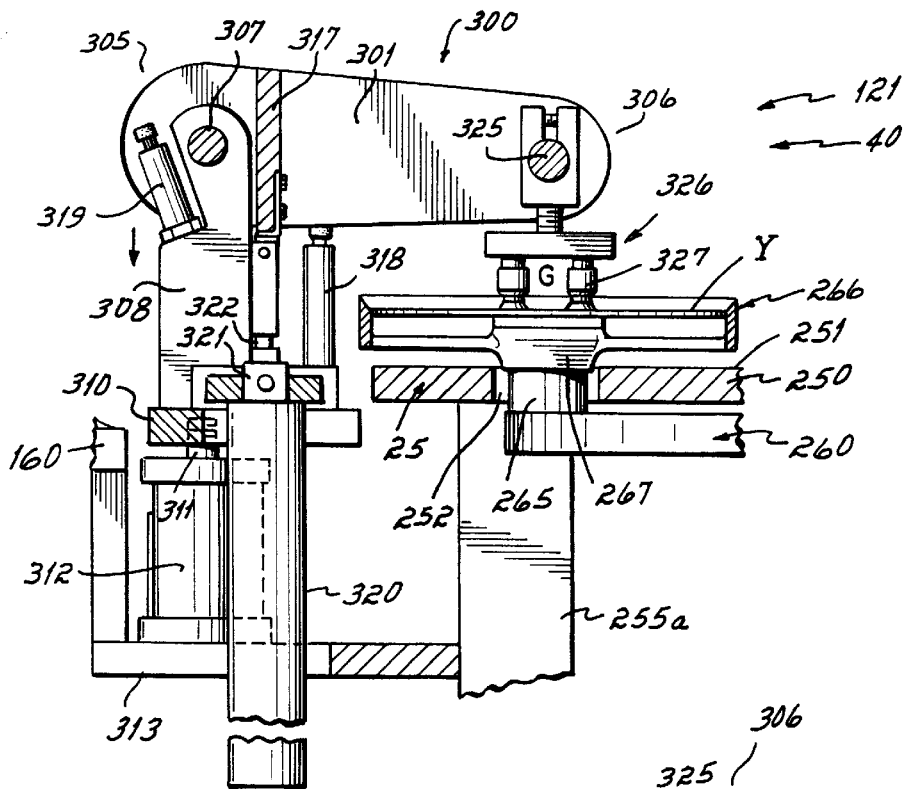
FIG. 6C is a view similar to the central area of FIG. 6 illustrating the load station area in a lowered position for disc pick-up.
Figure 6D:
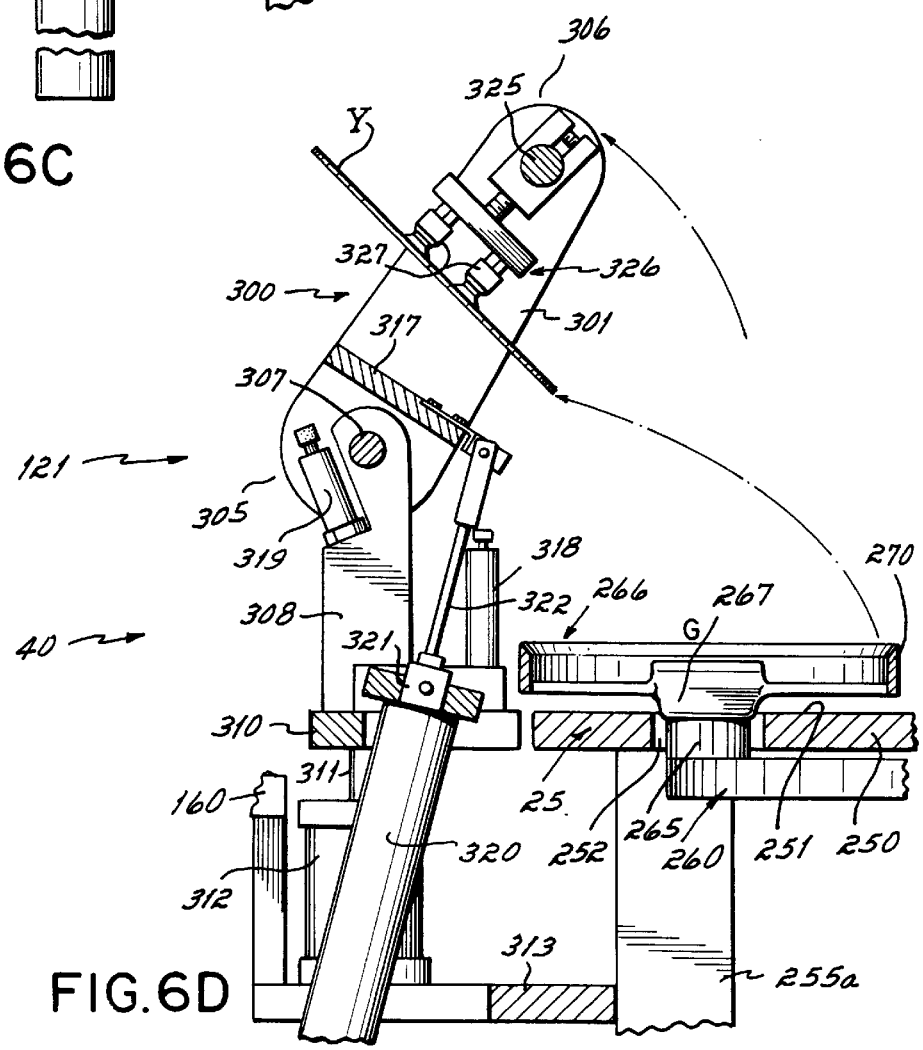
FIG. 6D is a view similar to FIG. 6C illustrating the disc in an intermediate transport position as it is swinging to the sleeve loading position.
Figure 6E:
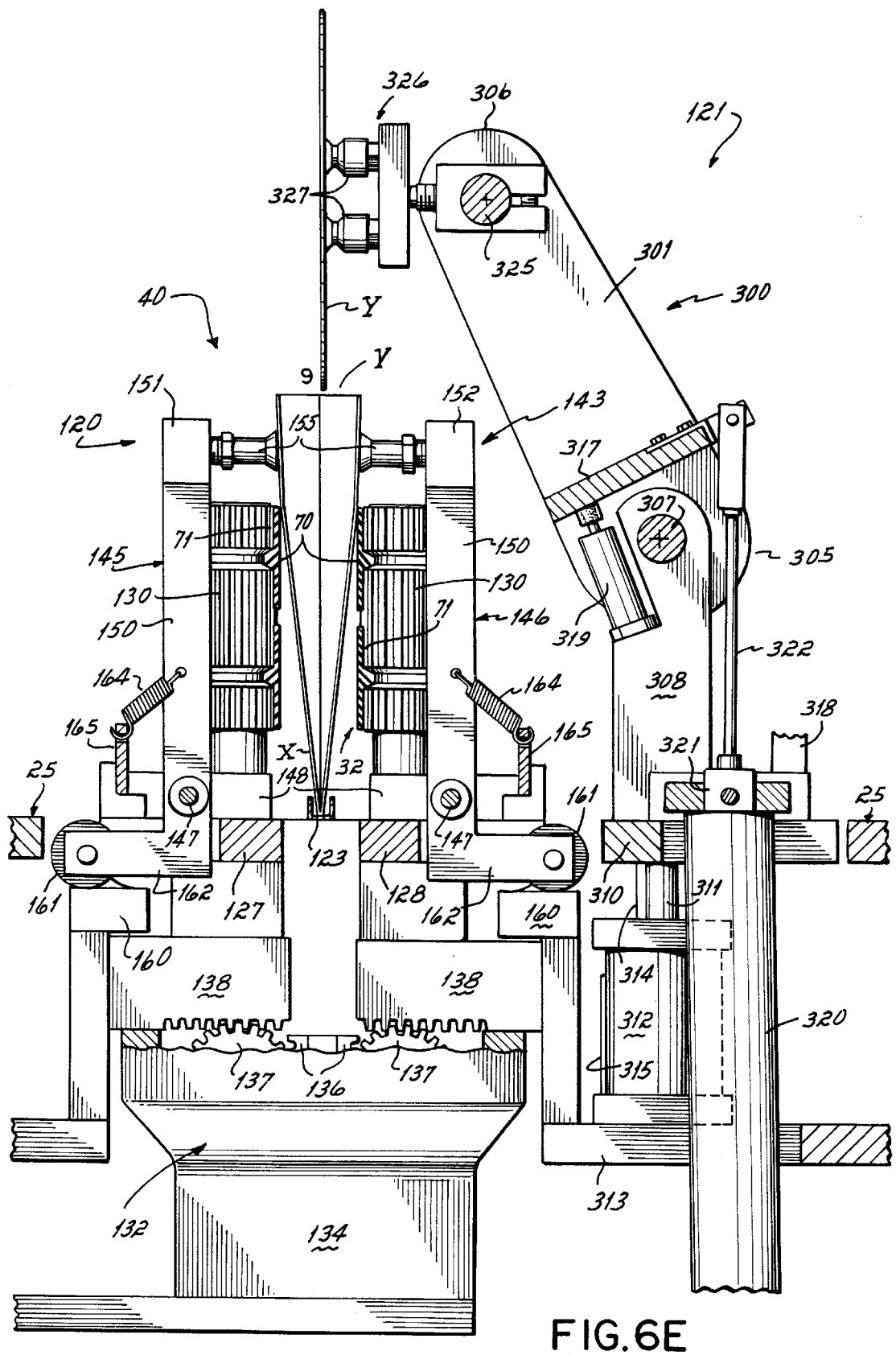
FIG. 6E is a view similar to FIG. 6 except the disc is in a position to be deposited into an open sleeve.

After discs have been picked up from disc positions G and H on the table 50 and are present in both vacuum chucks 326, with the platform 310 in the up position as illustrated in FIG. 6C, the FLIP UP variable is set to ON by the controller 66 and the FLIP DOWN variable is set to OFF. This causes the activation of the cylinder 319 to flip the assembly 300 upward through the position illustrated in FIG. 6D to the position illustrated in FIG. 6E, where the discs Y are held by the chucks 326 directly above the sleeve positions 9 and 10 of the sleeve conveyor 32. Once the position of FIG. 6E is verified by the sensor at cylinder 319, if and when two sleeves are present at positions 9 and 10 and opened at the sleeve opening station 121, and if the serial number indexes in registers S1 and S2 match the numbers in registers M9 and M10 respectively, then the vacuums on the flip arm are turned off, dropping the discs held thereby into the respectively numbered sleeves.

The operation of the disc flipping station 122 is programmed to proceed when one disc is present, such as might occur at the end of a job, when a disc or sleeve has misfed, or due to some other such condition. In such situations, the loading station may be programmed to operate to insert a disc when a disc is in position H and a sleeve is in position 10. The sleeve and disc transport systems 45 and 46 are controlled to bring a disc and sleeve to these positions even when the next location behind the sleeve or disc is unoccupied. Thereupon, a disc will be dropped into the sleeve at position 10. Other logical combinations are possible to handle unexpected or abnormal conditions, to insure that serialized discs and sleeves have matching markings. However, maintain the integrity of the order which could be compromised if the apparatus 20 is allowed to automatically correct mismatching based on an assumed cause, it is preferred that the operation stop in most cases to allow the operator to intervene and inspect the situation to determine the cause of any problem that results in such mismatching.

When discs Y are detected in the sleeves at positions 9 and 10 at opening station 121, then the SLEEVE CLOSE variable is set to ON, the SLEEVE OPEN variable is set to OFF, the TENSION variable is set to a delayed turn OFF, and the VAC variables for the opening station 121 are set to OFF. This causes the vacuum of the suction cups 155 to be turned off to release the sleeves X at the positions 9 and 10, the cylinder 133 of the gripper 132 to be actuated to close and bring the members 127 and 128 together, and the tension cylinders 142 to be deactivated, allowing the belts 70 to come together about the sleeves packages Z at the opening station 121 of the loading station 40.

The presence of closed sleeves X at the opening station 121 with discs Y that have been inserted therein will satisfy the condition of no empty sleeves at sleeve positions 9 and 10. Thus, when the other stations of the sleeve conveyor 32 are ready, the sleeve line 32 will index to bring the loaded sleeves to and through sleeve positions 11–16, by repetition of the sequences set forth above.

As sleeves index to station 12, they are checked by the sensor 42 of the sleeve reject station 41 to determine if they contain a disc. If not, the GRIPPER CLOSE variable is set to ON and the GRIPPER OPEN variable is set to OFF. This causes the fingers 171 at the sleeve reject station to close by actuation of the cylinder 172, moving from their position as indicated in FIGS. 9 and 10. When the closed gripper has been detected in a subsequent cycle of the controller 66, the cylinder 176 is signaled to pull the gripper fingers 171 and the gripped sleeve downward in response to the setting of the SLEEVE REJECT DOWN variable to ON and the SLEEVE REJECT UP variable to OFF. When the cylinder 175 is fully down, as detected in a subsequent cycle of the controller, the cylinder 171 is opened in response to the setting of the GRIPPER OPEN variable to ON and the GRIPPER CLOSE variable to OFF, causing the rejected sleeve to be dropped into a receptacle. When this condition is detected, the SLEEVE REJECT UP variable is set to ON and the SLEEVE REJECT DOWN variable is set to OFF, in a subsequent cycle of the controller 66, thereby returning the grippers to the position of FIG. 9.

After the shifting of the sleeve conveyor 32, when the presence of a sleeve is detected in position 16, an air jet is momentarily actuated which blows against the sleeve to insure it will fall. The offload conveyor 44 is then shifted a predetermined distance, for example, one inch, so that the next sleeve to be fed to the conveyor will overlap in shingle fashion on the previously offloaded sleeve.

The end of the job is determined by the controller 66 by comparing the incremented SLEEVE# or DISC# with the QUANTITY set for the job. When the QUANTITY is exceeded by either number, the corresponding sleeve or disc transport 27 or 28, respectively, is allowed to continue to cycle without the feeding of any further sleeve or disc, thereby allowing the operations needed to be performed on the remaining sleeves or discs be performed, and the discs loaded into sleeves, the resulting packages offloaded from the apparatus 20, thereby completing the job. Upon completion of the job or order, databases are updated to record the quantities or last serial numbers applied, so that the information can be checked at the start of future orders so that inadvertent duplication of serial numbers is avoided.

The above described apparatus 20 and its use are effective in serializing compact discs on which are recorded optically readable digital information, correspondingly serializing sleeves, and inserting the serialized discs into correspondingly serialized sleeves. While the laser printing device is preferably a YAG laser producing a laser beam in approximately the one micron wavelength to produce a continuous black three-dimensional mark through the clear plastic, certain aspects of the invention are advantageous when used with other types of lasers that will effectively apply marks on CDs, such as the more conventional $CO_2$ laser, which produces a mark in the form of a pattern of diffusion dots on the surface of the polycarbonate discs. The sleeve labeling device generally includes an ink impression printer, but may take another form that preferably dispenses serially marked or premarked labels that are then adhered to the sleeves. The markings may also be printed directly on the sleeves. Certain aspects of the invention will provide advantages to systems and methods in which premarked sleeves are selected at the labeling station or in which premarked discs are selected at the marking station, with the controller, by reading or otherwise tracking such markings then selecting corresponding discs and sleeves and coordinating the insertion of the correct discs in the correct sleeves.

While the preferred sleeve conveyor for the preferred embodiment of the invention is formed of a pair of opposed endless belts of generally fixed length maintained under tension and in proximity to each other to hold sleeves thereto, with the belts extending along a path through the sleeve labeling device and to the loading station, certain of the features and devices of the present invention may be advantageously employed with single belt conveyors, or other types of conveyors by which sleeves may be gripped, slid, pushed or otherwise moved through the system will derive advantage from features of the present invention. Where belts are employed, stepper motors programmed to step the belts through a series of fixed sleeve positions along the path are preferred, while, in some embodiments, other belt drives such as servo motor drives, positive indexing drives or drives with precision position feedback will nonetheless allow certain features of the present invention to be realized. Other types of sleeve conveyors can also be used with features of the invention.

With sleeve type containers popularly used for CD ROMs, a belt conveyor is preferably employed that is formed of gear driveable longitudinally-non-elastic polymeric cog-belts having a non-slip sleeve engaging surface thereon. Metal belts or belts of other sheet, braided or woven material may be found acceptable in some applications. While friction and pressure gripping opposed belts are preferred, conveyor devices with chucks, stops or positive grippers or positioners may be substituted in systems in which some but not all of the features of the present invention can be realized. The non-elastic friction gripping belts are preferred and function effectively with computer controlled stepper motor drives programmed to precisely index containers from position to position, for example, from where they are fed by the sleeve feeder through positions at which the serial markings are applied or otherwise determined or into which discs are loaded. A number of other of drive devices, such as reciprocating fluid or electric powered actuators with or without mechanical stepping linkages will be acceptable in certain applications, particularly where, instead of sleeves, aspects of the present invention are sought to be used for disc containers of other types, such as boxes or plastic hinged containers such as the type known as jewel cases in the audio CD industry. With sleeve type containers and some other types of containers, a sheet feeder type sleeve feeder or some other device for individually removing individual sleeves from a stack is also preferred.

The loading station for most embodiments of a system and method that seeks to use features of the present invention includes a fast and effective mechanism for opening one container, or for opening more than one container simultaneously. With sleeve type containers supported between belts of the conveyor at the loading station, sleeve opening is preferably achieved with a pair of opposed vacuum chucks positioned so as to engage opposite sides of a sleeve in the loading station. Other types of mechanical or fluid, electrical or other types of engaging devices will nonetheless allow certain aspects of the present invention to be advantageously realized. With belt conveyors, a belt spreading linkage separates the belts with belt tension preferably maintained. This tension maintenance may be achieved by a belt guide configuration which maintains the length of the belt path constant as the belts separate. In the preferred embodiment of the invention, additional cylinders are provided to laterally displace a portion of the belts to take-up belt slack, but other mechanical roller or other guide movements may be substituted where belt path length is not maintained as constant in the belt separating process. With the separate actuator for maintaining tension, such is preferably linked to the belt separation linkage or may be otherwise synchronized to a signal from the controller.

For systems in which the discs are inserted by gravity, by dropping the discs vertically downward into the open sleeves, which is preferred, the sleeve conveyor preferably includes structure for uprighting the sleeves, such as rotatable sleeve support platforms or rotatable arms allowing the sleeves to be fed horizontally which is also preferred. With belt conveyors this uprighting structure is preferably in the form of mechanical guides that may be fixed but preferably include pairs of rollers rotatably mounted on vertical shafts situated to guide sleeve carrying belts progressively to a vertical orientation at the loading station to support sleeves vertically with an open edge thereof facing upwardly. With sleeves or containers oriented for loading other than vertically, some but not all aspects of the present invention will be realized.

To use the sleeve conveying, orienting and opening features of the preferred embodiment of the present invention, alternative disc handling structure may be employed that includes a disc holder positionable generally above the open edge of a sleeve at the loading station and oriented to hold a disc in a vertical plane containing the sleeve at the loading station. Such structure may employ mechanical edge and hub gripping elements to positively hold the discs or tracks by which discs may be rolled or slid or otherwise translated or rotated into position for loading. Such structure should, however, employ precisely controllable release structure releasable when positioned above the open edge of the sleeve to drop the disc held thereby into the sleeve through the open edge thereof.

The sleeve feeder is preferably oriented to feed sleeves onto the conveyor in a horizontal orientation, with the sleeve conveyor including sleeve reorienting structure to differently oriented or redirect the sleeves from a horizontal orientation proximate the feeder to a vertical orientation at the loading station. Alternatively, a sleeve feeder may present individual or batches of vertically oriented sleeves that are conveyed in a vertical orientation to a disc inserting device.

A disc transport system for sequentially moving individual unmarked discs to the laser printing device and moving marked discs from the laser printing device to the loading station can take a variety of forms and still realize advantages of the sleeve handling, disc and container marking, serialization tracking and other features of the invention. In the preferred embodiment, the disc inserting portion of the disc transport system, or loading station, depending on how viewed, includes a vertically moveable platform that moves between up and down positions to pick up discs by actuation of a pneumatic cylinder. On this platform, a pivotally mounted arm is carried on the remote end of which is provided a disc holder, that is also rotatable on the arm. The arm is rotated by a second actuator through an angle of more than 90° to move the disc holder and the discs directly over the opened sleeves or other containers being loaded. The disc holder is linked to the arm so that, as the arm rotates, a disc held by the disc holder oppositely rotates from a horizontal orientation to a vertical orientation in the vertical plane above the open edge of the sleeve. The control of the rotation of the holders is preferably maintained by mechanical gearing or linkage, most preferably in the form of the cog belt and gear wheel arrangement described. However, other lever or gear devices may be employed that positively constrain the motion of the arm and disc holder components in the same way and still enjoy advantages provided by other features of the invention. Additionally, separate actuators for the arm and disc holder motion may be employed, whereupon appropriate control or motion limiters should be employed to insure that the discs end up in the proper vertical orientation over the containers to be loaded, and to insure that the discs being loaded are directed, steered or otherwise guided along a path that avoids interference with other components of the apparatus, and rapidly but without losing control of the discs.

The transfer arms of the present invention have use in a variety of disc transfer applications, where advantage can be gained from the preferred design that includes two heads at the opposite ends of a cross arm rotates on a vertical axis, preferably driven by a stepper motor programmed to optimally accelerate and decelerate, with the arm vertically shiftable between two disc positions, preferably by a two position fluid actuator. On the other hand, transfer devices and mechanisms other than the preferred transfer arms may be used in combination with other features of the present invention.

Various types of control devices such as controllers, computers or other logic devices, preferably programmable, can be used to coordinate the marking of the sleeves and discs and the operation of the sleeve conveyor, the disc transport system, the sleeve opening and disc inserting mechanism, to insure that marked discs are loaded into sleeves having corresponding serial markings, or to coordinate asynchronous operation of the various devices of the system to allow the process of serializing and loading discs and sleeves to proceed as rapidly and efficiently as the individual components can operate. While such a logic device preferably employs shift registers or other such serial information storage media corresponding to the sleeve positions, offset counters in each of the marking or loading devices can be employed, with their contents being offset by the number of steps in the conveyors between locations, each being simultaneously incremented in synchronism. Alternatively, the controller can be programmed to condition the sleeve loading operation on a match between the either tracked serial markings on discs and sleeves, or a rereading of the markings by readers located along the conveyors.

From the above description of the preferred embodiments of the invention, it will be apparent to one skilled in the art that variations and modifications can be made without departing from the principles of the invention. Accordingly, The following is claimed:

1. An apparatus for serializing compact discs having optically readable digital information recorded thereon, for correspondingly serializing sleeves therefor, and for inserting the serialized discs each into a correspondingly serialized sleeve, comprising:

a laser printing device comprising means for marking with a unique serial marking, each of a plurality of compact discs having recorded thereon an optically readable copy of a digital information product;

a sleeve labeling device set to mark a plurality of sleeves, each with one of the unique serial markings;

a loading station;

a sleeve conveyor formed of a pair of opposed endless belts of generally fixed lengths maintained under tension and in proximity to each other to hold sleeves thereto, the belts extending along a path through the sleeve labeling device and to the loading station;

a sleeve feeder located to feed unmarked sleeves onto the conveyor;

belt drive means for stepping the belts to shift sleeves held thereto through a series of fixed sleeve positions along the path to move unmarked sleeves from the sleeve feeder to the sleeve labeling device and to move marked sleeves from the sleeve labeling device to the loading station;

means for opening at least one marked sleeve supported between the belts of the conveyor at the loading station;

a disc transport system for sequentially moving individual unmarked discs to the laser printing device and moving marked discs from the laser printing device to the loading station;

means at the loading station for inserting, in the at least one opened sleeve, discs moved by the disc transport system to loading station; and a controller programmed to coordinate the marking of the sleeves and discs and the operation of the sleeve conveyor, the disc transport system, the opening means and the inserting means, to insert the marked discs each into a marked sleeve having a corresponding serial marking.

2. The apparatus of claim 1 wherein:

the sleeve opening means includes a pair of opposed vacuum chucks positioned so as to engage opposite sides of a sleeve in the loading station, a belt spreading linkage configured to separate the belts while maintaining tension thereon, and an actuator linked to the chucks and the linkage and responsive to a signal from the controller.

3. The apparatus of claim 1 wherein:

the sleeve opening means includes pairs of rollers rotatably mounted on vertical shafts situated to guide the belts in a vertical orientation at the loading station to support sleeves vertically with an open edge thereof facing upwardly, and the inserting means includes a disc holder positionable generally above the open edge of a sleeve at the loading station and oriented to hold a disc in a vertical plane containing the sleeve at the loading station, the holder being releasable when positioned above the open edge of the sleeve to drop the disc held thereby into the sleeve through the open edge thereof.

4. The apparatus of claim 3 wherein:

the sleeve feeder is oriented to feed sleeves onto the conveyor in a horizontal orientation; and the sleeve conveyor includes sets of belt guides differently oriented to direct the belts from a horizontal orientation proximate the feeder to a vertical orientation at the loading station.

5. The apparatus of claim 3 wherein:

the disc transport system includes a vertically moveable platform member and an arm pivotally mounted to the platform member and having the disc holder rotatably mounted thereon;

the platform a first actuator operable to lower the platform and thereby the disc holder to pick up a disc and the arm having a second actuator to rotate the arm through an angle of more than 90°; and the disc holder being linked to the arm so that, as the arm rotates, a disc held by the disc holder oppositely rotates from a horizontal orientation to a vertical orientation in the vertical plane and positioned above the open edge of the sleeve.

6. The apparatus of claim 1 wherein:

the disc transport system includes a vertically moveable platform member and an arm pivotally mounted to the platform member and having a disc chuck rotatably mounted thereon;

the platform a first actuator operable to lower the platform and thereby the chuck to pick up a disc and the arm having a second actuator to rotate the arm through an angle of more than 90°; and the chuck being linked to the arm so that, as the arm rotates, a disc held by the chuck oppositely rotates from a horizontal orientation to a vertical orientation.

7. The apparatus of claim 1 wherein:

the discs are formed of a polycarbonate plastic material; and the marking means includes a neodymium YAG laser operable to generate a steerable beam of light to permanently produce a contiguous marking in opaque three dimensions in the polycarbonate material.

8. The apparatus of claim 1 wherein:

the sleeve opening means includes a plurality of pairs of opposed chucks of each positioned to engage opposite sides of a sleeve in the loading station; and the inserting means includes a plurality of disc holders each positionable at the loading station to simultaneously insert a plurality of discs into a plurality of sleeves open at the loading station.

9. The apparatus of claim 1 wherein:

the sleeve conveyor includes a pair of opposed belt guides at an end of the belts adjacent the sleeve feeder and moveable toward and away from each other, and a stop moveable in synchronism with the guides to block the path when the guides are apart and out of the path when the guides are together; and the sleeve feeder is situated so as to feed sleeves onto the conveyor against the stop when the guides are apart.

10. The apparatus of claim 1 wherein:

the belts are gear driveable longitudinally-non-elastic cog-belts having a non-slip sleeve engaging surface thereon; and the belt drive means comprises a computer controlled stepper motor programmed to precisely index sleeves from a position at which they are fed by the sleeve feeder sequentially through a plurality of positions, one of which is located at the loading station.

11. The apparatus of claim 1 further comprising:

the sleeve reject station located along the path and below the belts of the conveyor;

a detector positioned adjacent the path downstream of the loading station and operative to generate a sleeve reject signal in response to the presence of an empty sleeve adjacent the sensor;

a sleeve gripper located at the sleeve reject station and having a rest position proximate the path, the gripper being operable grip a sleeve held between the belts at the sleeve reject station in response to the sleeve reject signal; and a sleeve reject actuator operatively connected to the sleeve gripper, the actuator being responsive to the sleeve reject signal to move the gripper downward and pull a sleeve gripped thereby with sufficient force to remove from the belts sleeves held by the belts.

12. The apparatus of claim 1 wherein the disc transport system includes:

a transfer arm mounted to rotate on a vertical axis, the arm having a disc pickup head thereon spaced from the axis and moveable between two disc positions when the arm is rotated;

a pneumatic vertical actuator linked to the arm and responsive to a signal from the controller to translate the arm between an upper position and a lower position on the axis to pickup and deposit a disc at one of the disc positions; and an electric stepper motor linked to the arm and responsive to a signal from the controller to accelerate, rotate, and decelerate the arm in a programmed rotational motion about the axis to move the disc pickup between the two disc positions.

13. The apparatus of claim 1 wherein the disc transport system includes:

a spindle transport and an individual disc transport;

a spindle support surface;

an elevator fixed adjacent the spindle transport and operable to lift a stack of discs, on a spindle having a circular base standing upon the spindle support surface, to a fixed vertical position for transfer to the individual disc transport; and a recessed area on the spindle support surface conforming generally to the shape and dimensions of the base of the spindle to thereby prevent irregularities in the periphery of the base of the spindle from affecting a deviation of the spindle from a vertical orientation.

14. The apparatus of claim 1 wherein the controller includes:

a plurality of information storage locations, one corresponding to each of the fixed sleeve positions from the sleeve labeling device to loading station;

the controller being programmed to store, in each of the storage locations, a code identifying the unique serial marking upon a sleeve at the corresponding fixed sleeve position, and to shift the codes through storage locations corresponding to the fixed sleeve positions through which the sleeves are shifted therethrough by the drive means;

the controller being further programmed to track the unique serial markings on discs moved by the disc transport system from the laser printing device to the loading station; and the controller being further programmed to condition the operation of the inserting means on a match between the tracked unique serial markings on discs and the codes corresponding to the discs and sleeves at the loading station.

15. An apparatus for serializing compact discs having optically readable digital information recorded thereon, for correspondingly serializing sleeves therefor, and for inserting the serialized discs each into a correspondingly serialized sleeve, comprising:

a laser disc marking device;

a sleeve labeling device;

a loading station;

a sleeve conveyor formed of a pair of opposed endless belts extending along a path through the sleeve labeling device and to the loading station;

a sleeve feeder proximate the conveyor and directed onto the conveyor;

a disc transport having a plurality of disc holders thereon moveable to and from the laser disc marking device and the loading station;

a sleeve opening device at the loading station including:

a sleeve support generally underlying and parallel to the belts of the conveyor, a pair of sets of belt guides supported on opposite sides of the sleeve support, one connected to each of the belts of the pair, and moveable toward and away from each other and the sleeve support, a pair of chucks positioned on opposite sides of the sleeve support and linked to the belt guides to move therewith, as the guides move apart, first toward and into engagement with a sleeve on the sleeve support and then apart to open the sleeve; and a disc-to-sleeve inserting unit at the loading station.

16. The apparatus of claim 15 wherein:

the chucks are vacuum chucks and offset from each other on the opposite sides of the sleeve support.

17. The apparatus of claim 15 wherein the opening device includes:

a pair of guide supports on opposite sides of the sleeve support and moveable toward and away from each other and the sleeve support, the chucks and the guides being mounted on the guide supports;

an actuator linked to move the guide supports toward and away from each other; and a cam linkage connected to the chucks to move the chucks first toward and into engagement with a sleeve on the sleeve support and then apart to open the sleeve as the guide supports move apart.

18. The apparatus of claim 15 wherein the sleeve opening device further includes:

a second pair of chucks positioned on opposite sides of the sleeve support and linked to the belt guides to move therewith, as the guides move apart, first toward and into engagement with a second sleeve on the sleeve support and then apart to open the sleeve, whereby two sleeves on the support are openable simultaneously.

19. The apparatus of claim 15 wherein:

the sleeve opening device includes pairs of rollers rotatably mounted on vertical shafts constraining the belts in a vertical orientation at the loading station, with sleeves held by the belts oriented vertically with an open edge facing upwardly, and the disc-to-sleeve inserting unit includes a disc holder moveable to and from a disc releasing position generally above the upwardly facing open edge of the sleeve at the loading station, at which position the disc holder is oriented to hold a disc in a vertical plane containing the sleeve at the loading station.

20. The apparatus of claim 19 wherein:

the sleeve feeder is oriented to feed sleeves onto the conveyor in a horizontal orientation; and the sleeve conveyor includes sets of belt guide elements oriented horizontally proximate the feeder and vertically at the loading station.

21. The apparatus of claim 19 wherein:

the disc-to-sleeve inserting unit includes a vertically moveable platform member and a transfer arm pivotally mounted to the platform member and having the disc holder rotatably mounted thereon, the platform member including a first actuator operable to lower the platform member and thereby the disc holder to pick up a disc and the transfer arm having a second actuator to rotate the arm through an angle of more than 90°; and the disc holder is linked to the transfer arm to rotate oppositely of the arm from a horizontal orientation to a vertical orientation in the vertical plane above the open edge of the sleeve.

22. An apparatus for serializing compact discs having optically readable digital information recorded thereon, for correspondingly serializing sleeves therefor, and for inserting the serialized discs each into a correspondingly serialized sleeve, comprising:

a polycarbonate plastic digital compact disc marking device comprising a neodymium YAG laser operable to generate a steerable beam of light to permanently produce a virtually continuous opaque marking in three dimensions in the polycarbonate material;

a sleeve labeling device;

a loading station;

a sleeve conveyor extending along a path through the sleeve labeling device and to the loading station;

a sleeve feeder proximate the conveyor and directed onto the conveyor;

a disc transport having a plurality of disc holders thereon moveable to and from the laser disc marking device and the loading station;

a sleeve opening device at the loading station;

a disc-to-sleeve inserting unit at the loading station; and a controller operatively connected to the laser disc marking device, the sleeve labeling device; the sleeve conveyor; the sleeve feeder; the disc transport, the sleeve opening device and the disc-to-sleeve inserting device and programmed to coordinate the insertion of serialized discs into correspondingly serialized sleeves.

23. The apparatus of claim 22 wherein:

the laser is set to produce a steerable beam of approximately 0.01 cm in diameter, at approximately 4,000 pulses/second moving at approximately 18 cm/second, with an output power of approximately 25 watts.

24. An apparatus for serializing compact discs having optically readable digital information recorded thereon, for correspondingly serializing sleeves therefor, and for inserting the serialized discs each into a correspondingly serialized sleeve, comprising:

a laser disc marking device;

a sleeve labeling device;

a loading station;

a sleeve conveyor formed of a pair of opposed endless belts extending along a path through the sleeve labeling device and to the loading station;

a sleeve feeder proximate the conveyor and directed onto the conveyor;

a disc transport having a plurality of disc holders thereon moveable to and from the laser disc marking device and the loading station;

a sleeve opening device at the loading station; and a disc-to-sleeve inserting unit at the loading station comprising a vertically moveable platform member and a transfer arm pivotally mounted to the platform member and having a disc holder rotatably mounted thereon, the platform member including a first actuator operable to lower the platform member and thereby the disc holder to pick up a disc from a disc holder of the disc transport, and the transfer arm having a second actuator to rotate the arm through an angle of more than 90°, the disc holder being linked to the transfer arm to rotate oppositely of the arm from a horizontal orientation to a vertical orientation in a vertical plane above the open edge of the sleeve.

25. The apparatus of claim 24 wherein the sleeve opening device includes:

the loading station includes a sleeve supports holding at least two sleeves thereat for loading;

at lease two pair of simultaneously operable chucks positioned on opposite sides of the sleeve supports; and the disc holder of the disc-to-sleeve inserting unit including at least two disc pickups adapted to simultaneously pickup and hold at least two discs.

26. The apparatus of claim 24 wherein:

the sleeve opening device includes pairs of rollers rotatably mounted on vertical shafts constraining the belts in a vertical orientation at the loading station, with sleeves held by the belts oriented vertically with an open edge facing upwardly, and the disc-to-sleeve inserting unit includes a disc holder moveable to and from a disc releasing position generally above the upwardly facing open edge of the sleeve at the loading station, at which position the disc holder is oriented to hold a disc in a vertical plane containing the sleeve at the loading station.

27. An apparatus for serializing compact discs having optically readable digital information recorded thereon, for correspondingly serializing sleeves therefor, and for inserting the serialized discs each into a correspondingly serialized sleeve, comprising:

a laser disc marking device;

a sleeve labeling device;

a loading station;

a sleeve conveyor formed of a pair of opposed generally non-stretchable fixed length endless belts extending along a path through the sleeve labeling device and to the loading station;

a conveyor drive operative to respond to digital signals from a controller to simultaneously move the belts in incremental steps to shift sleeves through a series of fixed sleeve positions along the path at the sleeve labeling device and at the loading station;

a sleeve feeder proximate the conveyor and directed onto the conveyor;

a disc transport having a plurality of disc holders thereon moveable to and from the laser disc marking device and the loading station;

a sleeve opening device at the loading station;

a disc-to-sleeve inserting unit at the loading station; and a controller connected to deliver digital control signals to the laser disc marking device, the sleeve labeling device; the sleeve conveyor drive, the sleeve feeder, the disc transport, the sleeve opening device and the disc-to-sleeve inserting device and programmed to coordinate the insertion of serialized discs into correspondingly serialized sleeves.

28. The apparatus of claim 27 wherein:

the sleeve conveyor includes a pair of opposed belt guides at an end of the belts adjacent the sleeve feeder, the guides being moveable toward and away from each other, the sleeve conveyor further including a stop moveable in synchronism with the guides to block the path when the guides are apart and out of the path when the guides are together; and the sleeve feeder is situated so as to feed sleeves onto the conveyor against the stop when the guides are apart.

29. The apparatus of claim 27 wherein:

the belts are gear driveable longitudinally-non-elastic cog-belts having a non-slip sleeve engaging surface thereon; and the conveyor drive comprises a computer controlled stepper motor programmed to precisely index sleeves from a position at which they are fed by the sleeve feeder sequentially through a plurality of positions, one of which is located at the loading station.

30. An apparatus for serializing compact discs having optically readable digital information recorded thereon, for correspondingly serializing sleeves therefor, and for inserting the serialized discs each into a correspondingly serialized sleeve, comprising:

a laser disc marking device;

a sleeve labeling device;

a loading station;

a sleeve conveyor formed of a pair of opposed generally non-stretchable fixed length endless belts extending along a path through the sleeve labeling device and to the loading station;

the sleeve conveyor includes a pair of opposed belt guides at an end of the belts adjacent the sleeve feeder, the guides being moveable toward and away from each other, the sleeve conveyor further including a stop moveable in synchronism with the guides to block the path when the guides are apart and out of the path when the guides are together; and a sleeve feeder proximate the conveyor and directed onto the conveyor to feed sleeves onto the conveyor against the stop when the guides are apart;

a disc transport having a plurality of disc holders thereon moveable to and from the laser disc marking device and the loading station;

a sleeve opening device at the loading station; and a disc-to-sleeve inserting unit at the loading station; and a controller connected to deliver digital control signals to the laser disc marking device, the sleeve labeling device, the sleeve conveyor, the sleeve feeder, the disc transport, the sleeve opening device and the disc-to-sleeve inserting device and programmed to coordinate the insertion of serialized discs into correspondingly serialized sleeves.

31. The apparatus of claim 30 wherein:

the conveyor includes an adjustable tension maintaining member; and the belt guides and stop are mounted on the tension maintaining member and are moveable therewith.

32. An apparatus for serializing compact discs having optically readable digital information recorded thereon, for correspondingly serializing sleeves therefor, and for inserting the serialized discs each into a correspondingly serialized sleeve, comprising:

a laser disc marking device;

a sleeve labeling device;

a loading station;

a sleeve conveyor extending along a path through the sleeve labeling device and to the loading station;

a sleeve feeder proximate the conveyor and directed onto the conveyor;

a disc transport having a plurality of disc holders thereon moveable to and from the laser disc marking device and the loading station, the disc transport including:

a transfer arm mounted to rotate on a vertical axis, the arm having a disc pickup head thereon spaced from the axis and moveable between two disc positions when the arm is rotated;

a pneumatic vertical actuator linked to the arm and responsive to a control signal to translate the arm between an upper position and a lower position on the axis to pickup and deposit a disc at one of the disc positions; and an electric stepper motor linked to the arm and responsive to a control signal to accelerate, rotate, and decelerate the arm in a programmed rotational motion about the axis to move the disc between the two disc positions;

a sleeve opening device at the loading station;

a disc-to-sleeve inserting unit at the loading station; and a controller operatively connected to the laser disc marking device, the sleeve labeling device, the sleeve conveyor, the sleeve feeder, the disc transport, the sleeve opening device and the disc-to-sleeve inserting device and programmed to coordinate the insertion of serialized discs into correspondingly serialized sleeves.

33. An apparatus for serializing compact discs having optically readable digital information recorded thereon, for correspondingly serializing sleeves therefor, and for inserting the serialized discs each into a correspondingly serialized sleeve, comprising:

a laser disc marking device;

a sleeve labeling device;

a loading station;

a sleeve conveyor extending along a path through the sleeve labeling device and to the loading station;

a sleeve feeder proximate the conveyor and directed onto the conveyor;

a disc transport having a plurality of disc holders thereon moveable to and from the laser disc marking device and the loading station, the disc transport including:

a spindle transport and an individual disc transport, a spindle support surface, an elevator fixed adjacent the spindle transport and operable to lift a stack of discs, on a spindle having a circular base standing upon the spindle support surface, to a fixed vertical position for transfer to the individual disc transport, and a recessed area on the spindle support surface conforming generally to the shape and dimensions of the base of the spindle to thereby prevent irregularities in the periphery of the base of the spindle from affecting a deviation of the spindle from a vertical orientation;

a sleeve opening device at the loading station;

a disc-to-sleeve inserting unit at the loading station; and a controller operatively connected to the laser disc marking device, the sleeve labeling device, the sleeve conveyor, the sleeve feeder, the disc transport, the sleeve opening device and the disc-to-sleeve inserting device and programmed to coordinate the insertion of serialized discs into correspondingly serialized sleeves.

34. A method of serially marking compact discs having optically readable digital information recorded thereon, of correspondingly marking sleeves for such discs and of inserting the serially marked discs into respective and corresponding ones of the correspondingly marked sleeves, comprising the steps of:

sequentially transporting a plurality of sleeves each through a plurality of sleeve positions from a supply thereof to a labeling station, then to a loading station;

sequentially transporting a plurality of compact discs which each have recorded thereon a copy of a digital information product, each through a plurality of disc positions from a supply thereof to a marking station, then to the loading station;

sequentially directing a laser beam onto each of the plurality of discs at the marking station and with the laser beam marking each with a unique serial marking;

sequentially marking each of a plurality of compact disc sleeves at the labeling station, with a unique serial marking corresponding to a unique serial marking with which a disc is marked;

asynchronously controlling the transporting and marking of the sleeves and discs so as to allow either to arrive at the loading station as fast as it can be marked and transported;

simultaneously opening a plurality of marked sleeves at the loading station;

simultaneously inserting a plurality of marked discs into a corresponding plurality of open sleeves at the loading station;

tracking in a digital memory each of the unique serial markings on sleeves and on discs through each of the respective sleeve and disc positions; and correlating with a programmed digital controller the operation of the loading station with the tracked markings such that each uniquely marked disc is inserted into a correspondingly uniquely marked sleeve.

35. The method of claim 34 wherein the sleeve transporting step includes the steps of:

feeding sleeves sequentially from the supply thereof onto a sleeve conveyor formed of a pair of opposed endless belts of generally fixed lengths and maintaining the belts under tension and in proximity to each other to hold sleeves fed thereto in fixed positions relative thereto; and stepping the belts along a path through the sleeve labeling station and the loading station; to shift sleeves held thereto through the sleeve positions.

36. The method of claim 35 wherein the sleeve opening step includes the step of:

separating the belts at the loading station while main tension thereon and simultaneously gripping opposite sides of the plurality of sleeves thereat to open the sleeves.

37. The method of claim 35 further comprising the steps of:

sensing sleeves along the belts at or at a sleeve position downstream of the loading station and generating a reject signal indicating the presence of a disc in the sensed sleeve; and forcing the sleeve from between the belts in response to the reject signal.

38. The method of claim 34 wherein the sleeve opened at the loading station are oriented vertically with an open edge facing upwardly; and the disc transporting step includes the steps of picking up a horizontally disposed disc and translating it vertically, then moving the disc through an arc of greater than 90° while rotating the disc oppositely 90°, then dropping the discs into the opened sleeves.

39. The method of claim 34 wherein the disc transporting step includes the steps of:

individually transferring horizontally disposed discs from one position to another by picking up and placing the discs by vertical double acting pneumatically driven action of a transfer arm and rotating the picked up discs in a horizontal plane by programmed electrically driven motion of a stepper motor.

40. The method of claim 34 wherein the disc marking step includes directing a beam of coherent light having a wavelength of approximately one micron and at energy and power densities and levels sufficient to form an opaque three-dimensional mark on optical grade polycarbonate material without substantially burning or melting the material.

41. An apparatus for inserting discs each into a sleeve, comprising:

a loading station;

a sleeve conveyor formed of a pair of opposed endless belts extending along a path to the loading station;

a disc transport having a disc holder thereon moveable to and from loading station;

a sleeve opening device at the loading station including:
a sleeve support generally underlying and parallel to the belts of the conveyor,
a pair of sets of belt guides supported on opposite sides of the sleeve support, one connected to each of the belts of the pair, and moveable toward and away from each other and the sleeve support,
a pair of chucks positioned on opposite sides of the sleeve support and linked to the belt guides to move therewith, as the guides move apart, first toward and into engagement with a sleeve on the sleeve support and then apart to open the sleeve; and a disc-to-sleeve inserting unit at the loading station.

42. The apparatus of claim 41 wherein:

the chucks are vacuum chucks and offset from each other on the opposite sides of the sleeve support.

43. The apparatus of claim 41 wherein the opening device includes:

a pair of guide supports on opposite sides of the sleeve support and moveable toward and away from each other and the sleeve support, the chucks and the guides being mounted on the guide supports;

an actuator linked to move the guide supports toward and way from each other; and a cam linkage connected to the chucks to move the chucks first toward and into engagement with a sleeve on the sleeve support and then apart to open the sleeve as the guide supports move apart.

44. The apparatus of claim 41 wherein the sleeve opening device further includes:

a second pair of chucks positioned on opposite sides of the sleeve support and linked to the belt guides to move therewith, as the guides move apart, first toward and into engagement with a second sleeve on the sleeve support and then apart to open the sleeve, whereby two sleeves on the support are openable simultaneously.

45. The apparatus of claim 41 wherein:

the sleeve opening device includes pairs of rollers rotatably mounted on vertical shafts constraining the belts in a vertical orientation at the loading station, with sleeves held by the belts oriented vertically with an open edge facing upwardly, and the disc-to-sleeve inserting unit includes a disc holder moveable to and from a disc releasing position generally above the upwardly facing open edge of the sleeve at the loading station, at which position the disc holder is oriented to hold a disc in a vertical plane containing the sleeve at the loading station.

46. The apparatus of claim 45 wherein:

the sleeve feeder is oriented to feed sleeves onto the conveyor in a horizontal orientation; and the sleeve conveyor includes sets of belt guide elements oriented horizontally proximate the feeder and vertically at the loading station.

47. The apparatus of claim 45 wherein:

the disc-to-sleeve inserting unit includes a vertically moveable platform member and a transfer arm pivotally mounted to the platform member and having the disc holder rotatably mounted thereon, the platform member including a first actuator operable to lower the platform member and thereby the disc holder to pick up a disc and the transfer arm having a second actuator to rotate the arm through an angle of more than 90°; and the disc holder is linked to the transfer arm to rotate oppositely of the arm from a horizontal orientation to a vertical orientation in the vertical plane above the open edge of the sleeve.

48. A method of permanently marking compact discs that are formed of a polycarbonate plastic material, the method comprising the steps of:

providing a neodymium YAG laser device operable to generate a steerable beam of light that is effective to permanently produce a virtually continuous opaque marking in three dimensions through a thickness of polycarbonate material;

providing a disc transport having a disc holder thereon moveable to and from the laser device and operable to transport a disc to and from the device;

transporting, with the disc transport, a polycarbonate compact disc having digital information recorded thereon to the laser device by holding the disc in the disc holder and moving the disc holder to the device; and operating the laser device, by directing, focusing and steering the beam of light along the pollycarbonate compact disc in the holder at the device, to produce a permanent three dimensional marking through the thickness of the disc.

49. The method of claim 48 wherein:

the operating step of setting to produce a steerable beam of approximately 0.01 cm in diameter, at approximately 4,000 pulses/second moving at approximately 18 cm/second, with an output power of approximately 25 watts.

50. An apparatus for inserting the serialized discs each into a correspondingly serialized sleeve, comprising:

a loading station;

a sleeve conveyor extending along a path to the loading station;

a disc transport having a disc holder thereon moveable to and from the loading station;

a sleeve opening device at the loading station; and a disc-to-sleeve inserting unit at the loading station comprising a vertically moveable platform member and a transfer arm pivotally mounted to the platform member and having a disc holder rotatably mounted thereon, the platform member including a first actuator operable to lower the platform member and thereby the disc holder to pick up a disc from a disc holder of the disc transport, and the transfer arm having a second actuator to rotate the arm through an angle of more than 90°, the disc holder being linked to the transfer arm to rotate oppositely of the arm from a horizontal orientation to a vertical orientation in a vertical plane above the open edge of the sleeve.

51. The apparatus of claim 50 wherein:

the loading station includes sleeve supports holding at least two sleeves thereat for loading;

at lease two pair of simultaneously operable chucks positioned on opposite sides of the sleeve supports; and the disc holder of the disc-to-sleeve inserting unit including at least two disc pickups adapted to simultaneously pickup and hold at least two discs.

52. The apparatus of claim 50 wherein:

the sleeve opening device includes pairs of rollers rotatably mounted on vertical shafts constraining the belts in a vertical orientation at the loading station, with sleeves held by the belts oriented vertically with an open edge facing upwardly, and the disc-to-sleeve inserting unit includes a disc holder moveable to and from a disc releasing position generally above the upwardly facing open edge of the sleeve at the loading station, at which position the disc holder is oriented to hold a disc in a vertical plane containing the sleeve at the loading station.

53. An apparatus for transporting differently marked sleeves for the inserting, at a loading station, of uniquely corresponding discs from a disc transport having a disc holder thereon moveable to and from the loading station having a sleeve opening device and a disc inserting device thereat comprising:

a sleeve conveyor formed of a pair of opposed generally non-stretchable fixed length endless belts extending along a path through the sleeve labeling device and to the loading station;

a conveyor drive operative to respond to digital signals from a controller to simultaneously move the belts in incremental steps to shift sleeves through a series of fixed sleeve positions along the path at the loading station;

a memory for storing information identifying each of the sleeves on the conveyor and each of the discs on the transport;

a controller connected to deliver digital control signals to and from the memory, the sleeve conveyor drive, the sleeve feeder, the disc transport, the sleeve opening device and the disc-to-sleeve inserting device and programmed to coordinate the insertion of serialized discs into correspondingly serialized sleeves.

54. The apparatus of claim 53 wherein:

the sleeve conveyor includes a pair of opposed belt guides at an end of the belts adjacent the sleeve feeder, the guides being moveable toward and away from each other, the sleeve conveyor further including a stop moveable in synchronism with the guides to block the path when the guides are apart and out of the path when the guides are together; and the apparatus further comprises a sleeve feeder situated so as to feed sleeves onto the conveyor against the stop when the guides are apart.

55. The apparatus of claim 53 wherein:

the belts are gear driveable longitudinally-non-elastic cog-belts having a non-slip sleeve engaging surface thereon; and the conveyor drive comprises a computer controlled stepper motor programmed to precisely index sleeves from a position at which they are fed by the sleeve feeder sequentially through a plurality of positions, one of which is located at the loading station.

56. An apparatus for placing sleeves at precise relative positions on a conveyor formed of a pair of opposed belts extending along a path comprising:

a sleeve feeder;

a pair of opposed belt guides located at an end of the belts adjacent the sleeve feeder, the guides being moveable toward and away from each other to move the belts at the end therewith, the sleeve conveyor further including a stop moveable in synchronism with the guides to block the path when the guides are apart and out of the path when the guides are together; and the sleeve feeder being proximate the conveyor and directed onto the conveyor to feed sleeves onto the conveyor against the stop when the guides are apart; and a controller connected to deliver digital control signals to the sleeve conveyor, the belt guides and the sleeve feeder and programmed to coordinate the feeding of sleeves onto the conveyor, the gripping of sleeves at the end between the belts of the conveyor, and the advancing of the conveyor so as to control the spacing of sleeves along the conveyor.

57. The apparatus of claim 56 wherein:

the conveyor includes an adjustable tension maintaining member; and the belt guides and stop are mounted on the tension maintaining member and are moveable therewith.

58. An apparatus for transporting compact discs comprising:

a disc transport having a disc holder thereon:

a transfer arm mounted to rotate on a vertical axis, the arm having a disc pickup head thereon spaced from the axis and moveable between two disc positions when the arm is rotated;

a pneumatic vertical actuator linked to the arm and responsive to a control signal to translate the arm between an upper position and a lower position on the axis to pickup and deposit a disc at one of the disc positions; and an electric stepper motor linked to the arm and responsive to a control signal to accelerate, rotate, and decelerate the arm in a programmed rotational motion about the axis to move the disc pickup between the two disc positions.

59. An apparatus for transporting spindles of compact discs and transferring discs between the spindles and a disc transport having a disc holder thereon comprising:

a spindle transport and an individual disc transport, a spindle support surface, an elevator fixed adjacent the spindle transport and operable to lift a stack of discs, on a spindle having a circular base standing upon the spindle support surface, to a fixed vertical position for transfer to the individual disc transport, and a recessed area on the spindle support surface conforming generally to the shape and dimensions of the base of the spindle to thereby prevent irregularities in the periphery of the base of the spindle from affecting a deviation of the spindle from a vertical orientation.

* * * * *

UNITED STATES PATENT AND TRADEMARK OFFICE
CERTIFICATE OF CORRECTION

PATENT NO. : 5,844,593
DATED : December 1, 1998
INVENTOR(S) : Proffitt et al.

It is certified that error appears in the above-identified patent and that said Letters Patent is hereby corrected as shown below:

In the Claims:

In claim 5, column 47, line 62, after "platform", insert --including--.

In claim 6, column 48, line 9, after "platform" insert --member including--, as shown in the original filed application at page 104 line 5 of claim 21.

In claim 25, column 52, line 5, after "includes", delete "a".

In claim 25, column 52, line 7, delete "lease", and insert therefor --least--; and also delete "pair", and insert therefor --pairs--.

UNITED STATES PATENT AND TRADEMARK OFFICE
CERTIFICATE OF CORRECTION

PATENT NO. : 5,844,593
DATED : December 1, 1998
INVENTOR(S) : Proffitt et al.

It is certified that error appears in the above-identified patent and that said Letters Patent is hereby corrected as shown below:

In claim 51, column 58, line 6, delete "lease", and insert therefor --least--; and also delete "pair", and insert therefor --pairs--.

In claim 36, column 55, line 44, delete "main", and insert therefor --maintaining--.

In claim 38, column 55, line 57, delete "sleeve", and insert therefor --sleeves--.

In claim 48, column 57, line 38, delete "pollycarbonate", and insert therefor --polycarbonate--.

Signed and Sealed this

Thirteenth Day of July, 1999

Attest:

Attesting Officer

Q. TODD DICKINSON

Acting Commissioner of Patents and Trademarks